United States Patent [19]
Wanke

[11] Patent Number: 5,701,248
[45] Date of Patent: Dec. 23, 1997

[54] PROCESS FOR CONTROLLING THE DRIVING STABILITY WITH THE KING PIN INCLINATION DIFFERENCE AS THE CONTROLLED VARIABLE

[75] Inventor: Peter Wanke, Frankfurt, Germany

[73] Assignee: ITT Automotive Europe GmbH, Frankfurt, Germany

[21] Appl. No.: 475,677

[22] Filed: Jun. 7, 1995

Related U.S. Application Data

[62] Division of Ser. No. 475,389, Jun. 7, 1995.

[30] Foreign Application Priority Data

| Nov. 25, 1994 | [DE] | Germany | P4441956.2 |
| Nov. 25, 1994 | [DE] | Germany | P4441957.0 |
| Nov. 25, 1994 | [DE] | Germany | P4441958.9 |
| Nov. 25, 1994 | [DE] | Germany | P4441959.7 |
| Dec. 31, 1994 | [DE] | Germany | P4447313.3 |
| Apr. 27, 1995 | [DE] | Germany | P19515053.8 |

[51] Int. Cl.[6] .................. B60T 8/32; G01P 3/44
[52] U.S. Cl. .............. 364/426.01; 364/426.028; 364/426.016; 364/426.029; 303/146
[58] Field of Search .................. 364/426.01, 426.02, 364/426.03, 426.023, 426.028; 303/139, 140, 146, 147, 148, 150, 155, 167, 186, 189; 180/197

[56] References Cited

U.S. PATENT DOCUMENTS

| 3,640,156 | 2/1972 | Mori et al. | 477/93 |
| 3,719,246 | 3/1973 | Bolt | 180/197 |
| 4,295,540 | 10/1981 | Hildebrecht | 180/271 |
| 4,542,460 | 9/1985 | Weber | 364/423.098 |
| 4,625,824 | 12/1986 | Leiber | 180/197 |
| 4,679,808 | 7/1987 | Ito et al. | 180/408 |
| 4,679,809 | 7/1987 | Ito et al. | 180/408 |
| 4,705,922 | 11/1987 | Seeger et al. | 200/61.45 M |
| 4,739,856 | 4/1988 | Inagaki et al. | 180/197 |

(List continued on next page.)

FOREIGN PATENT DOCUMENTS

| 0 081 758 | 6/1983 | European Pat. Off. . |
| 0 145 374 | 6/1985 | European Pat. Off. . |
| 0 148 349 | 7/1985 | European Pat. Off. . |
| 0 168 356 | 1/1986 | European Pat. Off. . |
| 0 180 095 | 5/1986 | European Pat. Off. . |
| 0 217 087 | 4/1987 | European Pat. Off. . |
| 0 231 025 | 8/1987 | European Pat. Off. . |
| 0 254 943 | 2/1988 | European Pat. Off. . |
| 0 265 969 | 5/1988 | European Pat. Off. . |
| 0 272 700 | 6/1988 | European Pat. Off. . |
| 0 296 756 | 12/1988 | European Pat. Off. . |
| 0 311 131 | 4/1989 | European Pat. Off. . |

(List continued on next page.)

OTHER PUBLICATIONS

"ABS von ITT Automotive", ATZ Automobilrechnische Zeitschrift, No. 11, pp. 591, Nov. 11, 1993 (with partial English translation).

Leffler, Von Heinz, "Enrwicklungsstand der ABS–integrierten BMW Schlupfregelsysteme ASC und DSC, ATZ Automobiltechnische Zeitschrift", No. 2, pp. 84–94, Feb. 1994 (with partial English translation).

*Primary Examiner*—Michael Zanelli
*Attorney, Agent, or Firm*—Thomas N. Twomey; J. Gordon Lewis

[57] ABSTRACT

A process for controlling the driving stability of a vehicle is provided. To avoid complicated models for determining the desired value of a variable characteristic of the travel behavior, which variable usually must be calculated by an expensive calculation circuit, a controlled variable is selected, which directly describes the driving stability and is compared with an actual value, which can be calculated in a relatively simple manner. An advantageous embodiment describes comparing an actual value of the variable, which can be determined in a simple manner, with a desired value. The range of tolerance of the variable is set directly by the driving stability limits. Advantageous variants pertain to the suitable scheme of calculation and the selection of a suitable range of tolerance.

16 Claims, 23 Drawing Sheets

U.S. PATENT DOCUMENTS

| | | | |
|---|---|---|---|
| 4,758,053 | 7/1988 | Yasuno | 303/165 |
| 4,760,893 | 8/1988 | Sigl et al. | 180/197 |
| 4,762,196 | 8/1988 | Harada et al. | 180/197 |
| 4,763,262 | 8/1988 | Leiber | 364/426.036 |
| 4,765,430 | 8/1988 | Schulze et al. | 180/197 |
| 4,779,696 | 10/1988 | Harada et al. | 180/197 |
| 4,794,539 | 12/1988 | Wallentowitz et al. | 364/426.01 |
| 4,805,102 | 2/1989 | Ise et al. | 364/424.046 |
| 4,805,105 | 2/1989 | Weiss et al. | 364/426.023 |
| 4,809,175 | 2/1989 | Hosaka et al. | 364/426.046 |
| 4,809,181 | 2/1989 | Ito et al. | 364/426.01 |
| 4,809,183 | 2/1989 | Eckert | 364/426.041 |
| 4,821,606 | 4/1989 | Leiber | 477/154 |
| 4,836,619 | 6/1989 | Muto | 303/173 |
| 4,841,815 | 6/1989 | Takahashi | 364/424.086 |
| 4,843,557 | 6/1989 | Ina et al. | 364/431.11 |
| 4,865,148 | 9/1989 | Marumoto et al. | 180/446 |
| 4,866,623 | 9/1989 | Ise et al. | 364/426.031 |
| 4,868,755 | 9/1989 | McNulty et al. | 364/423.098 |
| 4,872,116 | 10/1989 | Ito et al. | 364/424.051 |
| 4,882,693 | 11/1989 | Yopp | 364/424.046 |
| 4,884,651 | 12/1989 | Harada et al. | 180/197 |
| 4,898,431 | 2/1990 | Karnopp et al. | 303/146 |
| 4,902,076 | 2/1990 | Ushijima et al. | 303/146 |
| 4,922,427 | 5/1990 | Yokote et al. | 364/424.058 |
| 4,939,656 | 7/1990 | Hoashi et al. | 364/426.028 |
| 4,946,015 | 8/1990 | Browalski et al. | 477/186 |
| 4,953,650 | 9/1990 | Ohmura | 180/412 |
| 4,955,448 | 9/1990 | Ise et al. | 180/197 |
| 4,967,865 | 11/1990 | Schindler | 180/408 |
| 4,967,869 | 11/1990 | Nagaoka et al. | 180/244 |
| 4,970,650 | 11/1990 | Hashiguchi et al. | 364/426.028 |
| 4,971,164 | 11/1990 | Fujita et al. | 180/197 |
| 4,976,330 | 12/1990 | Matsumoto | 180/197 |
| 4,981,190 | 1/1991 | Nakayama et al. | 180/197 |
| 4,982,807 | 1/1991 | Hilburger et al. | 180/197 |
| 4,998,593 | 3/1991 | Karnopp et al. | 180/408 |
| 5,001,636 | 3/1991 | Shiraishi et al. | 364/424.051 |
| 5,001,637 | 3/1991 | Shiraishi et al. | 364/424.051 |
| 5,009,294 | 4/1991 | Ghoneim | 477/185 |
| 5,010,972 | 4/1991 | Ingraham et al. | 180/178 |
| 5,025,881 | 6/1991 | Poirier et al. | 180/197 |
| 5,025,882 | 6/1991 | Ghoneim et al. | 180/197 |
| 5,029,090 | 7/1991 | Kuhn et al. | 364/426.04 |
| 5,033,573 | 7/1991 | Hrovat | 180/197 |
| 5,041,978 | 8/1991 | Nakayama et al. | 364/426.029 |
| 5,046,787 | 9/1991 | Kuwana et al. | 303/144 |
| 5,051,908 | 9/1991 | Shiraishi | 364/426.019 |
| 5,069,302 | 12/1991 | Kageyama | 180/197 |
| 5,070,460 | 12/1991 | Yasuno | 364/426.023 |
| 5,070,461 | 12/1991 | Nobumoto et al. | 364/426.028 |
| 5,077,672 | 12/1991 | Nobumoto et al. | 364/426.038 |
| 5,083,631 | 1/1992 | Nakayama et al. | 180/197 |
| 5,084,821 | 1/1992 | Ohsuga et al. | 364/424.058 |
| 5,089,967 | 2/1992 | Haseda et al. | 364/426.023 |
| 5,094,127 | 3/1992 | Ishida et al. | 477/108 |
| 5,107,430 | 4/1992 | Magnino | 364/426.028 |
| 5,107,948 | 4/1992 | Yamamoto | 180/197 |
| 5,116,078 | 5/1992 | Kanazawa et al. | 280/707 |
| 5,117,934 | 6/1992 | Tsuyama et al. | 180/197 |
| 5,119,303 | 6/1992 | Struck et al. | 364/426.017 |
| 5,123,497 | 6/1992 | Yopp et al. | 180/422 |
| 5,148,884 | 9/1992 | Tsuyama et al. | 180/197 |
| 5,154,151 | 10/1992 | Bradshaw et al. | 123/481 |
| 5,155,686 | 10/1992 | Shiraishi et al. | 364/426.031 |
| 5,159,991 | 11/1992 | Tsuyama et al. | 180/197 |
| 5,162,997 | 11/1992 | Takahashi | 364/423.098 |
| 5,164,902 | 11/1992 | Kopper et al. | 364/426.021 |
| 5,168,955 | 12/1992 | Naito | 180/197 |
| 5,172,319 | 12/1992 | Shimishi et al. | 364/426.036 |
| 5,172,785 | 12/1992 | Takahashi | 180/271 |
| 5,173,859 | 12/1992 | Deering | 364/426.01 |
| 5,183,127 | 2/1993 | Kageyama et al. | 180/197 |
| 5,184,577 | 2/1993 | Kato et al. | 123/90.15 |
| 5,188,434 | 2/1993 | Ruf et al. | 303/146 |
| 5,189,617 | 2/1993 | Shiraishi | 364/424.058 |
| 5,191,953 | 3/1993 | Ito et al. | 180/197 |
| 5,197,008 | 3/1993 | Itoh et al. | 364/426.01 |
| 5,198,982 | 3/1993 | Kobayashi | 364/426.032 |
| 5,206,808 | 4/1993 | Inoue et al. | 364/426.016 |
| 5,207,483 | 5/1993 | Shimada et al. | 303/148 |
| 5,211,453 | 5/1993 | Van Zanten et al. | 303/146 |
| 5,212,640 | 5/1993 | Matsuda | 364/424.039 |
| 5,213,178 | 5/1993 | Polidan et al. | 180/197 |
| 5,224,044 | 6/1993 | Tamura et al. | 364/426.037 |
| 5,225,984 | 7/1993 | Nakayama | 364/424.045 |
| 5,228,757 | 7/1993 | Ito et al. | 303/146 |
| 5,229,944 | 7/1993 | Yasuno | 364/426.01 |
| 5,238,081 | 8/1993 | Maeda et al. | 180/197 |
| 5,243,526 | 9/1993 | Ito et al. | 364/426.036 |
| 5,255,191 | 10/1993 | Fulks | 364/424.046 |
| 5,255,192 | 10/1993 | Ito et al. | 364/426.036 |
| 5,255,193 | 10/1993 | Katayose et al. | 364/426.028 |
| 5,255,194 | 10/1993 | Schaufelberger et al. | 364/426.016 |
| 5,257,189 | 10/1993 | Asada | 364/424.085 |
| 5,257,828 | 11/1993 | Miller et al. | 180/446 |
| 5,258,912 | 11/1993 | Ghoneim et al. | 364/424.052 |
| 5,259,476 | 11/1993 | Matsuno et al. | 180/197 |
| 5,261,503 | 11/1993 | Yasui | 180/446 |
| 5,262,950 | 11/1993 | Nakayama | 364/424.045 |
| 5,262,952 | 11/1993 | Tsuyama et al. | 364/426.033 |
| 5,265,019 | 11/1993 | Harara et al. | 364/424.051 |
| 5,265,020 | 11/1993 | Nakayama | 364/424.045 |
| 5,265,693 | 11/1993 | Rees et al. | 180/197 |
| 5,265,694 | 11/1993 | Yamashita | 180/197 |
| 5,265,945 | 11/1993 | Yamashita et al. | 303/144 |
| 5,265,946 | 11/1993 | Bader | 303/189 |
| 5,267,166 | 11/1993 | Takata et al. | 364/449.1 |
| 5,267,783 | 12/1993 | Inoue et al. | 303/146 |
| 5,272,635 | 12/1993 | Nakayama | 364/426.035 |
| 5,272,636 | 12/1993 | Buschmann et al. | 364/426.016 |
| 5,274,576 | 12/1993 | Williams | 364/565 |
| 5,275,475 | 1/1994 | Hartmann et al | 303/146 |
| 5,276,620 | 1/1994 | Bottesch | 364/424.051 |
| 5,276,624 | 1/1994 | Ito et al. | 364/426.016 |
| 5,278,764 | 1/1994 | Iizuka et al. | 364/461 |
| 5,281,008 | 1/1994 | Kawamura et al. | 303/141 |
| 5,285,523 | 2/1994 | Takahashi | 395/22 |
| 5,294,146 | 3/1994 | Tabata et al. | 280/707 |
| 5,295,552 | 3/1994 | Kageyama et al. | 180/197 |
| 5,297,646 | 3/1994 | Yamamura et al. | 180/415 |
| 5,297,662 | 3/1994 | Tsuyama et al. | 477/185 |
| 5,301,766 | 4/1994 | Momiyama et al. | 180/197 |
| 5,305,218 | 4/1994 | Ghoneim | 364/426.016 |
| 5,309,362 | 5/1994 | Ito et al. | 364/426.036 |
| 5,311,431 | 5/1994 | Cao et al. | 364/426.016 |
| 5,312,169 | 5/1994 | Buschmann | 303/140 |
| 5,315,519 | 5/1994 | Chin et al. | 364/426.016 |
| 5,320,422 | 6/1994 | Tsuyama et al. | 303/141 |
| 5,325,300 | 6/1994 | Tsuyama et al. | 364/426.036 |
| 5,328,256 | 7/1994 | Ohta et al. | 303/146 |
| 5,332,300 | 7/1994 | Hartmann et al | 303/146 |
| 5,333,058 | 7/1994 | Shiraishi et al. | 364/426.016 |
| 5,335,979 | 8/1994 | Naitou et al. | 303/191 |
| 5,341,296 | 8/1994 | Yasuno | 364/426.01 |
| 5,341,297 | 8/1994 | Zomotor et al. | 364/426.016 |
| 5,344,224 | 9/1994 | Yasuno | 303/146 |
| 5,345,385 | 9/1994 | Zomotor et al. | 364/424.045 |
| 5,348,111 | 9/1994 | Williams et al. | 180/415 |
| 5,353,225 | 10/1994 | Tsuyama et al. | 364/426.028 |
| 5,357,798 | 10/1994 | Weinzerl et al. | 73/146 |
| 5,369,584 | 11/1994 | Kajiwara | 364/424.058 |

| | | | |
|---|---|---|---|
| 5,371,677 | 12/1994 | Ehret et al. | 364/426.016 |
| 5,383,123 | 1/1995 | Kunz | 364/424.046 |
| 5,386,365 | 1/1995 | Nagaoka | 364/424.054 |
| 5,388,658 | 2/1995 | Ando et al. | 180/197 |
| 5,402,342 | 3/1995 | Ehret et al | 364/423.098 |
| 5,428,532 | 6/1995 | Yasuno | 364/424.058 |
| 5,446,657 | 8/1995 | Ikeda et al. | 364/424.051 |
| 5,455,770 | 10/1995 | Hadeler et al. | 364/426.01 |
| 5,471,386 | 11/1995 | Hrovat et al. | 364/426.027 |
| 5,471,388 | 11/1995 | Zomotor et al. | 364/424.045 |
| 5,480,219 | 1/1996 | Kost et al. | 303/146 |
| 5,482,133 | 1/1996 | Iwata et al. | 180/197 |
| 5,488,555 | 1/1996 | Asgari et al. | 364/424.051 |
| 5,510,989 | 4/1996 | Zabler et al. | 364/423.098 |
| 5,513,907 | 5/1996 | Kiencke et al. | 303/150 |
| 5,526,270 | 6/1996 | Adachi et al. | 364/424.045 |
| 5,532,929 | 7/1996 | Hattori et al. | 364/431.07 |
| 5,555,499 | 9/1996 | Yamashita et al. | 364/426.029 |
| 5,557,520 | 9/1996 | Suissa et al. | 364/424.034 |
| 5,584,541 | 12/1996 | Sone et al. | 303/146 |

FOREIGN PATENT DOCUMENTS

| | | |
|---|---|---|
| 0 321 894 | 6/1989 | European Pat. Off. . |
| 0 323 066 | 7/1989 | European Pat. Off. . |
| 0 325 298 | 7/1989 | European Pat. Off. . |
| 0 339 617 | 11/1989 | European Pat. Off. . |
| 0 354 563 | 2/1990 | European Pat. Off. . |
| 0 386 792 | 9/1990 | European Pat. Off. . |
| 0 388 107 | 9/1990 | European Pat. Off. . |
| 0 390 075 | 10/1990 | European Pat. Off. . |
| 0 390 088 | 10/1990 | European Pat. Off. . |
| 0 392 165 | 10/1990 | European Pat. Off. . |
| 0 397 203 | 11/1990 | European Pat. Off. . |
| 0 397 330 | 11/1990 | European Pat. Off. . |
| 0 405 570 | 1/1991 | European Pat. Off. . |
| 0 417 792 | 3/1991 | European Pat. Off. . |
| 0 435 833 | 7/1991 | European Pat. Off. . |
| 0 444 109 | 9/1991 | European Pat. Off. . |
| 0 449 333 | 10/1991 | European Pat. Off. . |
| 0 453 931 | 10/1991 | European Pat. Off. . |
| 0 461 570 | 12/1991 | European Pat. Off. . |
| 0 476 373 | 3/1992 | European Pat. Off. . |
| 0 488 052 | 6/1992 | European Pat. Off. . |
| 0 492 782 | 7/1992 | European Pat. Off. . |
| 0 576 044 | 12/1993 | European Pat. Off. . |
| 2695613 | 3/1994 | France . |
| 14 55 731 | 5/1969 | Germany . |
| 19 02 944 | 8/1970 | Germany . |
| 27 26 465 | 12/1978 | Germany . |
| 27 52 908 | 5/1979 | Germany . |
| 29 00 461 | 7/1980 | Germany . |
| 30 33 653 | 10/1982 | Germany . |
| 31 27 302 | 1/1983 | Germany . |
| 31 27 605 | 1/1983 | Germany . |
| 33 42 152 | 5/1984 | Germany . |
| 33 43 007 | 5/1984 | Germany . |
| 33 09 712 | 9/1984 | Germany . |
| 34 21 776 | 12/1984 | Germany . |
| 34 25 956 | 1/1985 | Germany . |
| 34 38 086 | 5/1985 | Germany . |
| 34 16 292 | 11/1985 | Germany . |
| 35 28 536 | 2/1986 | Germany . |
| 35 29 928 | 3/1986 | Germany . |
| 35 41 354 | 5/1986 | Germany . |
| 35 34 211 | 3/1987 | Germany . |
| 35 36 185 | 4/1987 | Germany . |
| 35 37 452 | 4/1987 | Germany . |
| 36 43 147 | 7/1987 | Germany . |
| 36 05 600 | 8/1987 | Germany . |
| 36 12 170 | 10/1987 | Germany . |
| 37 08 581 | 10/1987 | Germany . |
| 36 16 907 | 11/1987 | Germany . |
| 37 21 626 | 1/1988 | Germany . |
| 37 24 574 | 2/1988 | Germany . |
| 37 24 575 | 2/1988 | Germany . |
| 36 34 240 | 4/1988 | Germany . |
| 36 34 301 | 4/1988 | Germany . |
| 37 36 010 | 4/1988 | Germany . |
| 37 41 908 | 6/1988 | Germany . |
| 37 10 870 | 10/1988 | Germany . |
| 37 28 572 | 3/1989 | Germany . |
| 38 32 924 | 4/1989 | Germany . |
| 38 36 713 | 5/1989 | Germany . |
| 38 39 710 | 6/1989 | Germany . |
| 39 05 855 | 9/1989 | Germany . |
| 39 13 052 | 11/1989 | Germany . |
| 39 15 840 | 11/1989 | Germany . |
| 39 17 245 | 11/1989 | Germany . |
| 38 25 639 | 2/1990 | Germany . |
| 38 31 105 | 3/1990 | Germany . |
| 39 31 210 | 3/1990 | Germany . |
| 40 00 557 | 7/1990 | Germany . |
| 40 01 387 | 7/1990 | Germany . |
| 39 02 082 | 8/1990 | Germany . |
| 40 02 821 | 8/1990 | Germany . |
| 40 10 551 | 10/1990 | Germany . |
| 39 16 354 | 11/1990 | Germany . |
| 39 33 652 | 4/1991 | Germany . |
| 39 35 588 | 4/1991 | Germany . |
| 39 39 069 | 5/1991 | Germany . |
| 40 34 549 | 5/1991 | Germany . |
| 40 41 404 | 7/1991 | Germany . |
| 40 42 089 | 7/1991 | Germany . |
| 40 42 091 | 7/1991 | Germany . |
| 40 42 092 | 7/1991 | Germany . |
| 40 11 974 | 9/1991 | Germany . |
| 41 12 582 | 10/1991 | Germany . |
| 40 42 090 | 11/1991 | Germany . |
| 4 026 627 | 2/1992 | Germany . |
| 4 030 704 | 4/1992 | Germany . |
| 4 030 724 | 4/1992 | Germany . |
| 4 031 304 | 4/1992 | Germany . |
| 40 35 653 | 5/1992 | Germany . |
| 4 139 012 | 6/1992 | Germany . |
| 40 38 079 | 6/1992 | Germany . |
| 4 208 404 | 9/1992 | Germany . |
| 41 33 238 | 4/1993 | Germany . |
| 4 200 061 | 7/1993 | Germany . |
| 43 00 255 | 7/1993 | Germany . |
| 43 01 591 | 7/1993 | Germany . |
| 42 14 642 | 11/1993 | Germany . |
| 4 222 958 | 1/1994 | Germany . |
| 42 26 646 | 2/1994 | Germany . |
| 4 229 504 | 3/1994 | Germany . |
| 43 34 260 | 4/1994 | Germany . |
| 43 34 261 | 4/1994 | Germany . |
| 43 40 289 | 6/1994 | Germany . |
| 2256404 | 12/1992 | United Kingdom . |
| 2258198 | 2/1993 | United Kingdom . |
| WO 90/03898 | 4/1990 | WIPO . |
| WO 91/11757 | 8/1991 | WIPO . |
| WO 91/17069 | 11/1991 | WIPO . |
| WO 92/05884 | 4/1992 | WIPO . |
| WO 92/05994 | 4/1992 | WIPO . |

PROCESS FOR CONTROLLING THE DRIVING STABILITY WITH THE KING PIN INCLINATION DIFFERENCE AS THE CONTROLLED VARIABLE

This application is a division of application Ser. No. 08/475,389, filed Jun. 7, 1995.

FIELD OF THE INVENTION

The present invention pertains to a process for controlling a vehicle in terms of stable travel behavior, in which a characteristic variable describing the current condition of the vehicle is determined and compared with a suitable desired value.

BACKGROUND OF THE INVENTION

1. General Structure of Driving Stability Control (DSC)

Stability control processes have been known from, for example, patent publication DE-PS 38 19 474. It has been proposed concerning such processes that the yaw rate $\dot{\Psi}$ be used as the primary reference variable. This is either measured by means of a dynamic vehicle model (e.g., a single-track model) as a preliminary filter, or it is approximated by a static model (also called circular travel model) and is compared with the measured yaw rate $\dot{\Psi}_{meas}$ (controlled variable). However, the presetting (and consequently also the control intervention) depend directly on the quality of the vehicle model in each of these control principles. Since these are linear equivalent models, the models deviate from the actual desired travel behavior in some cases and in certain ranges of operation.

If the real behavior of the vehicle also changes, e.g., due to the load on, or wear of, individual components, the model will describe the vehicle inaccurately. Consequently, it would be necessary to perform an adjustment of the model by a continual estimation of the parameters, which leads to the following problems:

An excitation must be preset for the estimation, i.e., the driver must sufficiently excite the vehicle by means of steering preset values in the linear range (<0.4 g). It is difficult to achieve this on standard roads.

Furthermore, it is not possible to directly estimate all parameters of the linear single-track model. Thus, certain parameters must be preselected as fixed values.

SUMMARY OF THE INVENTION

The present invention is a method for controlling driving stability of a vehicle having front and rear axles, each of the axles having wheels. Front and rear kingpin inclination values are determined for the wheels of the front and rear axles, respectively. A variable is formed which characterizes the driving stability of the vehicle based on the front and rear kingpin inclination values. A comparison is performed between the variable and a predetermined desired value. The vehicle is controlled based on the comparison, to adjust the driving stability of the vehicle towards a desired state.

The invention adjusts the travel behavior such that responses of the vehicle to steering, braking and accelerator inputs of the driver are always predictable and easily controllable. Furthermore, the behavior of the vehicle is simulated by means of the control as well as possible, to prevent the control from intervening at a time when the travel behavior is still easily controllable. It is also achieved by such a restrained control intervention that the control will respond for the first time only when a driving instability would otherwise be unavoidable and the driver does not feel the control to be an unpleasant intervention with his driving desires (because, for example, he is unable to avoid an obstacle in the usual manner or does not notice, because of the travel behavior of the vehicle, that it is fully loaded or that the adhesion of the vehicle has changed because of worn or underinflated tires).

The present invention consists, in principle, of performing the control via controlled variables, which by definition describe a neutral travel behavior of the vehicle and are therefore independent from secondary variables of the vehicle, such as load, condition of the tires and the like.

The determination of the king pin inclination actually occurring on the front wheels and rear wheels causes considerable difficulties in practice. This can be remedied by using the difference of the king pin inclinations directly for determining the control signals.

This difference can be determined in a relatively simple manner by setting the steering angle $\delta$, the yaw rate $\dot{\Psi}$ and the reference velocity $V_{ref}$ in a suitable relation to one another and, thus, determining the difference of the king pin inclinations. The reference velocity is the velocity of the center of gravity in the vehicle, which can be measured or calculated indirectly via the velocity of the individual rolling wheels of the vehicle, taking their slip into account.

According to another aspect of the present invention, the measured variables as well as the constant l (the distance between front and rear axles) may be related with one another, to determine the difference of the king pin inclinations between the front axle and the rear axle. The difference is determined by the equation:

$$\alpha_v - \alpha_h = \delta - \frac{l*\dot{\Psi}}{v}$$

where $\alpha_v$ is the front kingpin inclination value, $\alpha_h$ is the rear kingpin inclination value, $\alpha_v - \alpha_h$ is the difference, $\delta$ is the steering angle, l is a distance between the front and rear axles, $\dot{\Psi}$ is the yaw rate, and v is the velocity.

The result is a calculated actual value, which is related with a predetermined desired value. Consequently, contrary to the prior-art process, a desired value or a range of tolerance for the desired value, which value or range is compared with the calculated actual value, is set from the beginning in the process according to the present invention. Control signals, which act on the vehicle in the direction of a stable travel behavior, are then generated by the control, if necessary, as a function of the difference determined.

It may be useful in practice, not to arrange the permissible range of tolerance for the desired value symmetrically about the value 0. Instead, this range may be shifted in relation to the value 0, such that the higher permissible desired values of the now asymmetric range of tolerance will be located in the range characteristic of the understeering of the vehicle.

A rather simple possibility of representing the control system based on the measurement of the king pin inclination difference may consist of setting a desired value, and comparing a directly or indirectly measured variable, namely, the measured yaw rate $\dot{\Psi}_{meas}$, with a desired variable determined in a computer, wherein the desired variable is determined by setting other, suitable measured values. As a result, the control system is independent from changing properties of the vehicle, because the changed properties of the vehicle are already taken into account in the calculation of the desired yaw rate, $\dot{\Psi}_{Desired}$.

For example, the yaw rate values may be calculated according to the equations:

$$\dot{\Psi}_{Desired1} = \frac{(\delta - K1) \cdot v}{l}$$

and $$\dot{\Psi}_{Desired2} = \frac{(\delta - K2) \cdot v}{l}$$

Corresponding to the above equation, a range of tolerance can also be selected here; it is characterized by the factor K, which is the permissible deviation of the king pin inclination difference $(\alpha_v - \alpha_h)$ from the desired value, where $\alpha_v$ is the front axle kingpin inclination and $\alpha_h$ is the rear axle kingpin inclination. $\dot{\Psi}_{Desired1}$ and $\dot{\Psi}_{Desired2}$ are the first and second yaw rate values, respectively, $\delta$ is the steering angle, v is the velocity, l is a distance between the front and rear axles. To preset an asymmetric range of tolerance, it is necessary to introduce two factors, K1 and K2, which are used for understeering (US) or oversteering (OS), depending on a king pin inclination difference that may occur.

The present invention will be explained below on the basis of an exemplary embodiment; the explanations given under 2.3.3. are particularly important here for the understanding of the present invention.

BRIEF DESCRIPTION OF THE FIGURES

How such a driving stability control system may be designed is described below on the basis of 29 figures. The objects of the individual figures are as follows:

FIGS. 4 and 5 show a flow chart of the determination of the coefficient of friction of the road surface, wherein FIG. 5 is to be inserted into FIG. 4, FIGS. 6 and 8 show block diagrams of a combined process for determining the current values of the velocity of the side slip angle and of the side slip angle in different forms of representation.

DETAILED DESCRIPTION

Figure 1:
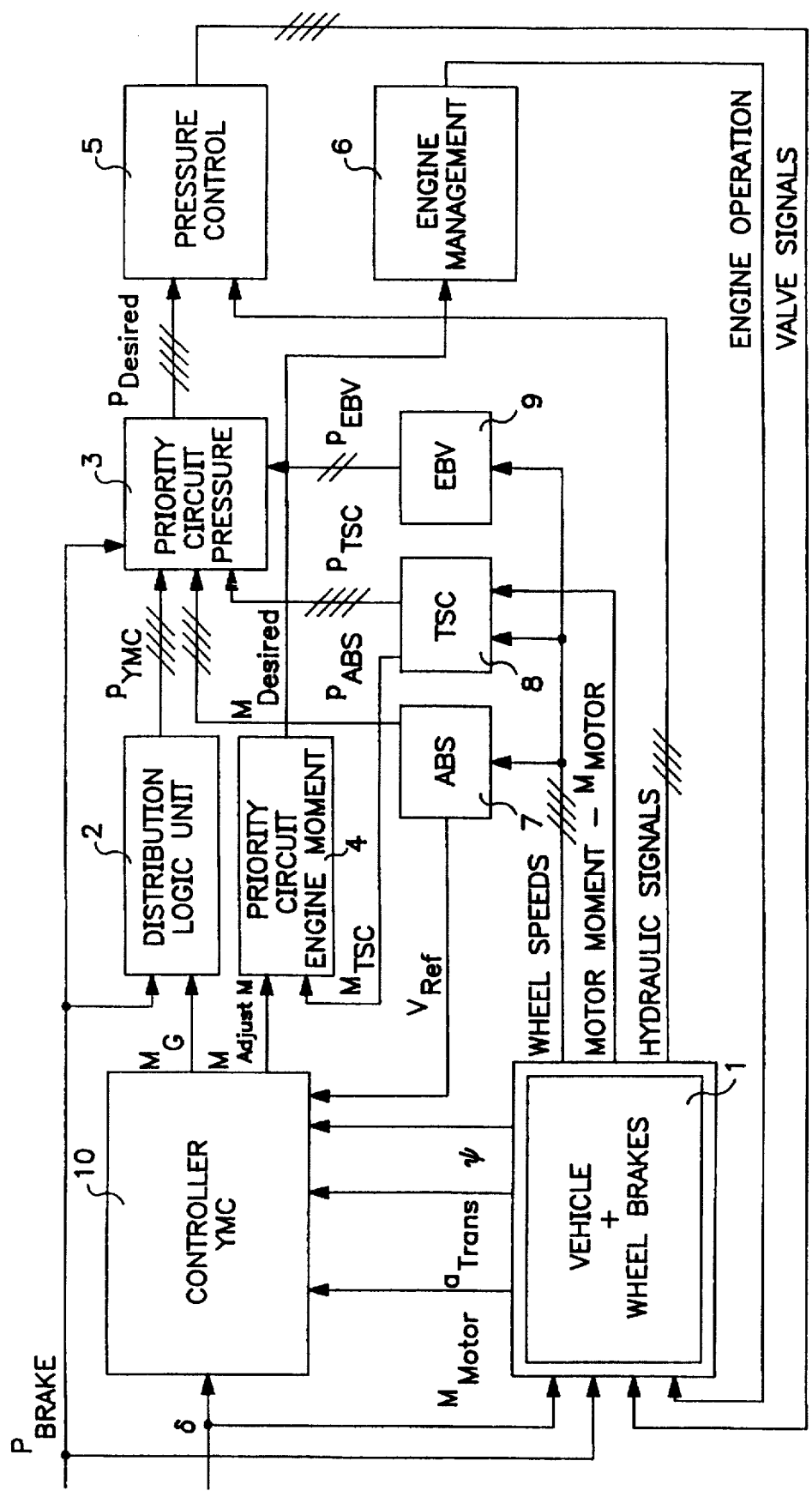
FIG. 1 shows a block diagram of the overall structure of a driving stability control system.

A general description of the course of a driving stability control is shown in FIG. 1. The vehicle 1 forms the controlled system.

The variables given by the driver, namely, the driver brake pressure $P_{brake}$ and the steering angle $\delta$, act on the vehicle 1. The variables resulting from this, namely, the motor moment $M_{motor}$, the lateral acceleration $a_{trans}$, the yaw rate $\dot{\Psi}$, the wheel speeds and hydraulic signals, such as wheel brake pressures, are measured on the vehicle. To evaluate these data, the DSC system has four electronic controllers 7, 8, 9 and 10, which are associated with the anti-locking system ABS, the traction slip control system TSC, the electronic brake effort proportioning system EBV, and the yawing moment control system YMC, respectively. The electronic controllers for ABS 7, TSC 8 and EBV 9 may correspond to the state of the art without change.

The wheel speeds are sent to the controllers for the anti-locking system 7, the traction slip control system 8 and the electronic brake effort proportioning system 9. The controller 8 of the traction slip control system additionally receives data on the actual engine torque, the motor moment $M_{Motor}$. This information is also sent to the controller 10 for the yawing moment control system YMC. In addition, controller 10 receives the data on the lateral acceleration $a_{trans}$ and the yaw rate $\dot{\Psi}$ of the vehicle from the sensors. Since a vehicle reference velocity $v_{Ref}$, on the basis of which an excess brake slip of one of the wheels can be determined, is determined in the controller 7 of the ABS via the individual wheel speeds of the vehicle wheels, such a reference velocity does not need to be calculated in the YMC controller 10, but it is taken over from the ABS controller 7. Whether the vehicle reference speed is calculated or a separate calculation is performed for the yawing moment control makes only a slight difference for the process of the yawing moment control. This also applies, e.g., to the longitudinal acceleration along of the vehicle. The value for this also can be determined in the ABS controller 7, and sent to the YMC controller 10. This applies to the determination of the coefficient of friction μ of the road surface with restrictions only, because a more accurate coefficient of friction determination than is determined for the anti-locking system is desirable for yawing moment control.

All four electronic controllers of the DSC, i.e., the controllers for YMC 10, ABS 7, TSC 8 and EBV 9, develop brake pressure set values $P_{YMC}$, $P_{ABS}$, $P_{TSC}$, $P_{EBV}$ for the individual wheels simultaneously and independently from one another based on their own control strategies.

In addition, preset values $M_{TSC}$ and $M_{AdjustM}$ for the engine torque are calculated by the TSC controller 8 and the YMC controller 10 simultaneously.

The pressure preset values $p_{YMC}$ of the YMC controller 10 for the individual wheel brake pressures are determined as follows: The YMC controller 10 first calculates an additional yawing moment $M_G$, which leads to stabilization of the driving condition within a curve if it is generated by a corresponding brake actuation. This $M_G$ is sent to a distribution logic unit 2, which could also be represented as part of the YMC controller 10. In addition, the possible desire of the driver to decelerate the vehicle, which is recognized from the driver brake pressure $p_{brake}$, is also sent to this distribution logic unit 2. The distribution logic unit 2 calculates yawing moment control brake pressures $p_{YMC}$ for the wheel brakes, which may differ from the preset yawing moment $M_G$ and the desired driver brake pressure very greatly for the individual wheels. These yawing moment control brake pressures $P_{YMC}$ are sent to a priority circuit 3 for the wheel brake pressures, for function optimization along with the pressure preset values calculated by the other controllers 7, 8 and 9 for ABS, TSC and EBV. This priority circuit 3 determines desired wheel pressures $p_{Desired}$ for optimal driving stability, taking into account the driver's desire. These desired pressures may either correspond to the pressure preset values of one of these four controllers, or represent a superimposition.

The procedure followed in the case of the engine torque is similar to the procedure with the wheel brake pressures. While ABS and EBV act only on the wheel brakes, intervention with the engine torque is also provided in the case of YMC and TSC. The preset values $M_{AdjustM}$ and $M_{TSC}$ calculated separately for the engine torque in the YMC controller 10 and in the TSC controller 8 are again evaluated in a priority circuit 4 and superimposed to a desired torque. However, this desired torque $M_{Desired}$ may also just as well correspond only to the calculated preset value of one of the two controllers.

Driving stability control by intervention with the brakes and the engine can now be performed based on the calculated desired preset values for the wheel brake pressure $P_{Desired}$ and for the engine torque $M_{Desired}$. Hydraulic signals or values, which reflect the actual wheel brake pressure, are also sent for this purpose to the pressure control unit 5. From this, the pressure control unit 5 generates valve signals, which are sent to the control valves of the individual wheel brakes in the vehicle 1. The engine management controls the drive motor of the vehicle according to $M_{Desired}$, as a result of which a changed motor moment is again generated. This will then again lead to new input variables for the four electronic controllers 7, 8, 9 and 10 of the DSC system.

2. Structure of the Yawing Moment Control System (YMC)

Figure 2:
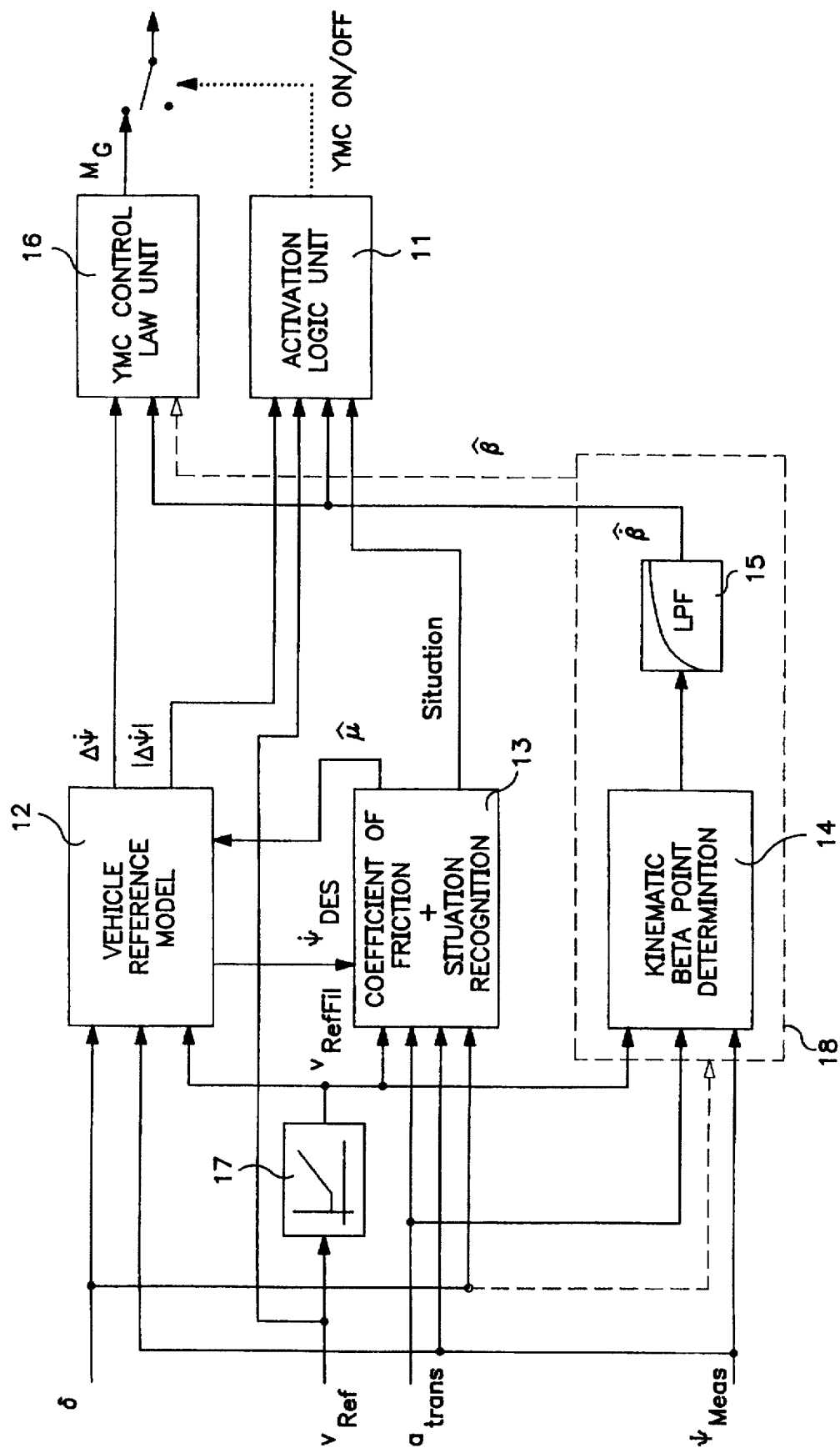
FIG. 2 shows a block diagram of the structure of a yawing moment controller.

FIG. 2 shows in a block diagram how the additional yawing moment $M_G$ is determined within the YMC controller 10 for the distribution logic unit 2. The steering angle δ, the vehicle reference velocity $v_{Ref}$ from the ABS controller 7, the measured lateral acceleration $a_{trans}$, and the measured yaw rate $\dot{\Psi}_{Meas}$ are entered for this as input variables. The vehicle reference velocity $v_{Ref}$ passes through a filter 17, which sets a constant value above zero at low velocities, so that the denominator of a fraction will not become equal to zero during the further calculations. The unfiltered value of $v_{Ref}$ is sent only to an activation logic unit 11, which recognizes the standstill of the vehicle.

This direct determination of the vehicle reference velocity $v_{Ref}$ by the activation logic unit 11 may also be omitted if standstill of the vehicle is assumed when the filtered vehicle reference velocity $v_{RefFil}$ assumes its constant minimum.

A vehicle reference model 12, which calculates a preset value for a change in the yaw rate $\Delta\dot{\Psi}$ on the basis of the steering angle δ, the filtered vehicle reference velocity $v_{RefFil}$ as the measured yaw rate $\dot{\Psi}_{Meas}$ is placed in the YMC controller.

To keep the preset values within the physically possible range, the coefficient of friction μ of the road surface, which is calculated as an estimated value $\hat{\mu}$ in a coefficient of friction and situation recognition unit 13, is also needed for these calculations. If the coefficient of friction determined within the framework of the anti-locking control has sufficient accuracy, this coefficient of friction may be used as well, or the coefficient of friction calculated in the YMC controller 10 may be taken over in the ABS controller 7.

The coefficient of friction and situation recognition unit 13 uses for its calculations the filtered reference velocity $v_{RefFil}$, the measured vehicle lateral acceleration $a_{trans}$, the measured yaw rate $\dot{\Psi}_{Meas}$ and the steering angle δ.

The situation recognition unit distinguishes different cases, such as straight travel, travel in curves, reverse travel and standstill of the vehicle. Standstill of the vehicle is assumed when the filtered vehicle reference velocity $v_{RefFil}$ assumes its constant minimum. This information may also be sent to the activation logic unit 11 to recognize standstill of the vehicle instead of the unfiltered vehicle reference velocity. The fact that at a given steering angle δ, the orientation of the measured yaw rate $\dot{\Psi}$ is opposite that during forward travel is utilized to recognize reverse travel. The measured yaw rate $\dot{\Psi}_{Meas}$ is compared for this purpose with the desired yaw rate $\dot{\Psi}_{desired}$ preset by the vehicle reference model 12. If the signs are always opposite, and this also applies to the time derivatives of the two curves, the vehicle is traveling in reverse, because $\dot{\Psi}_{desired}$ is always calculated for forward travel, since the usual speed sensors do not detect information on the direction of rotation of the wheels.

Finally, a kinematic velocity of the side slip angle determination, or a kinematic determination for short, is performed on the basis of the filtered vehicle reference velocity $v_{RefFil}$, the measured vehicle lateral acceleration $a_{trans}$, and the measured yaw rate $\dot{\Psi}_{Meas}$.

To cut off peaks in the case of great variations in the side slip angles, the calculated value of velocity of the side slip angle passes through a first-order low-pass filter 15, which sends an estimated value $\hat{\beta}$ for the velocity of the side slip angle to the activation logic unit 11 and to a program 16 for converting the yawing moment control law. Program 16 also uses the preset values for changing $\Delta\dot{\Psi}$ for the yaw rate, which is the difference of the measured yaw rate $\dot{\Psi}_{Meas}$ and the desired yaw rate $\dot{\Psi}_{desired}$ calculated on the basis of the vehicle reference model 12. The additional yawing moment $M_G$ for the vehicle, which is to be mediated via the brake pressures, is calculated from this.

The program 16 operates permanently to keep ready current control variables all of the time. However, whether these controlling torques are transmitted to the distribution logic unit 2 shown in FIG. 1 depends on the activation logic unit 11.

The activation logic unit 11 receives not only the value of the unfiltered vehicle reference velocity $v_{Ref}$ and, as was described, the velocities of the side slip angles $\dot{\beta}$, but also the amount of the deviation $|\Delta\dot{\Psi}|$ of the desired yaw rate $\dot{\Psi}_{desired}$ from the measured yaw rate $\dot{\Psi}_{Meas}$, and information from the situation recognition unit 13 during reverse travel.

If the vehicle is traveling in reverse, the transmission of $M_G$ is interrupted. This also happens when standstill of the vehicle is recognized or when neither the estimated velocity of the side slip angle $\dot{\beta}$ nor the preset value for the change in the yaw rate, $\Delta\dot{\Psi}$, reaches a value that would make control necessary.

The logic circuit for calculating the engine controlling torque $M_{AdjustM}$ is not shown.

2.1. Coefficient of Friction and Situation Recognition

Figure 3:
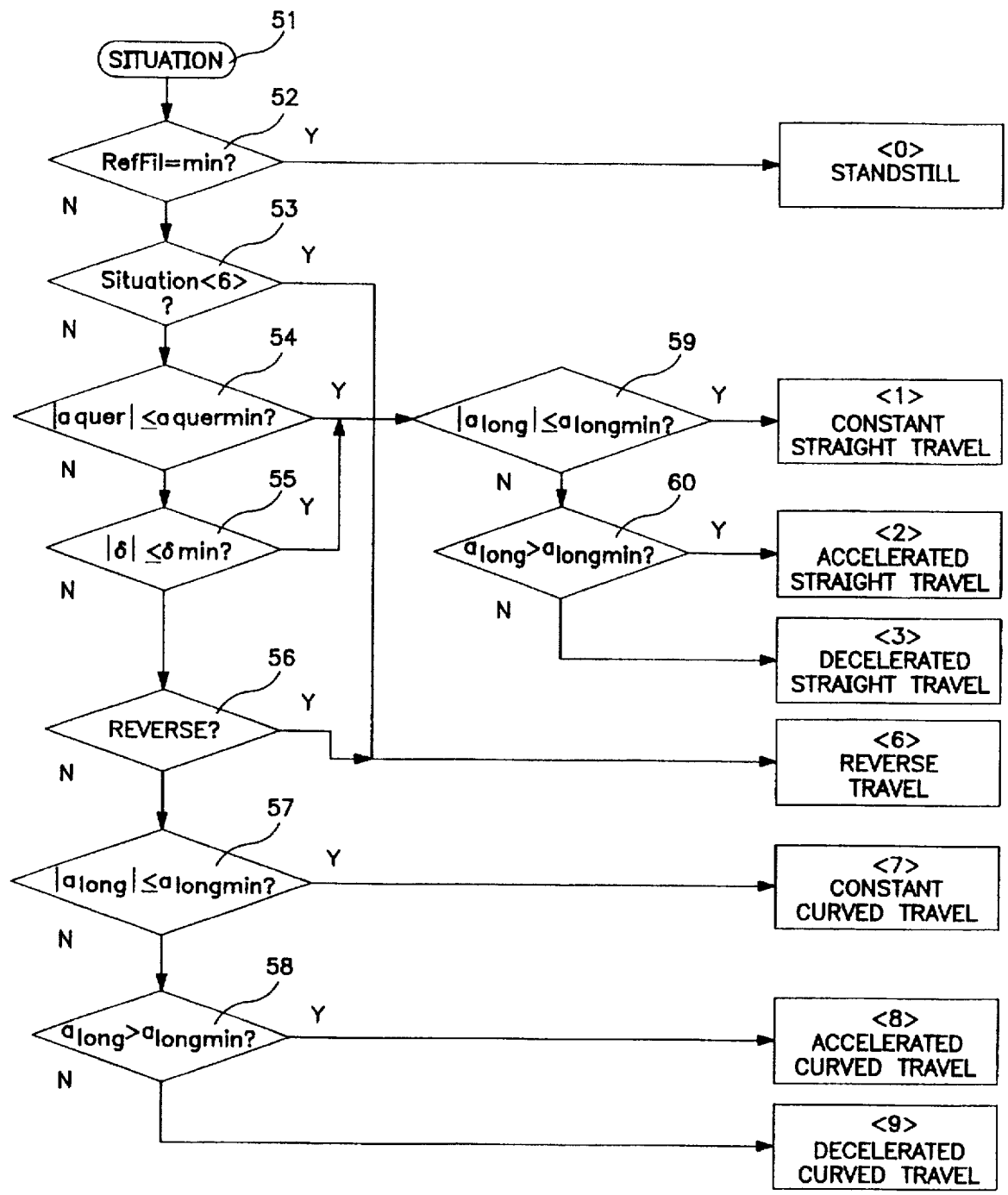
FIG. 3 shows a flow chart of the determination of a driving situation, e.g., travel in a curve.
Figure 4:
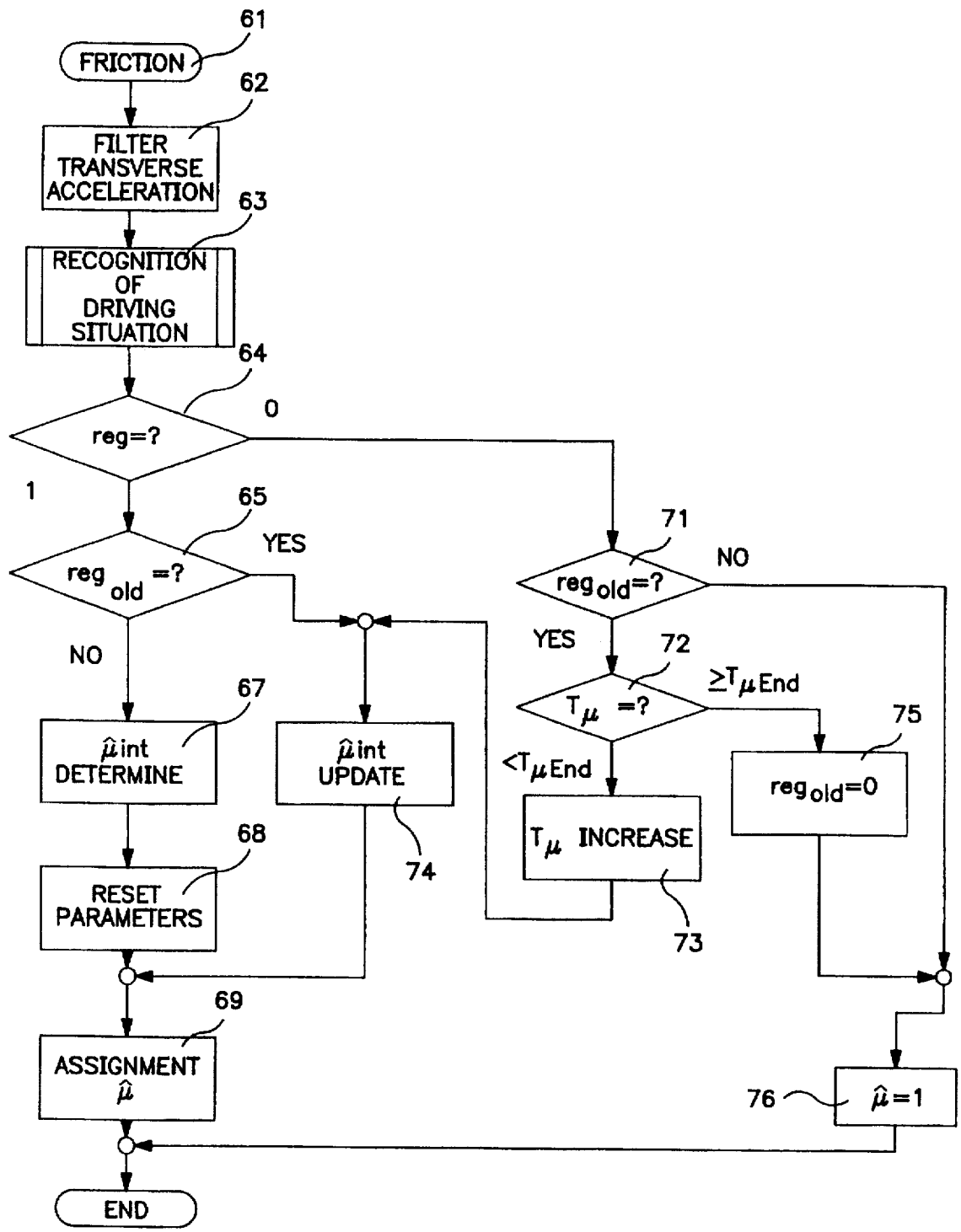
Figure 5:
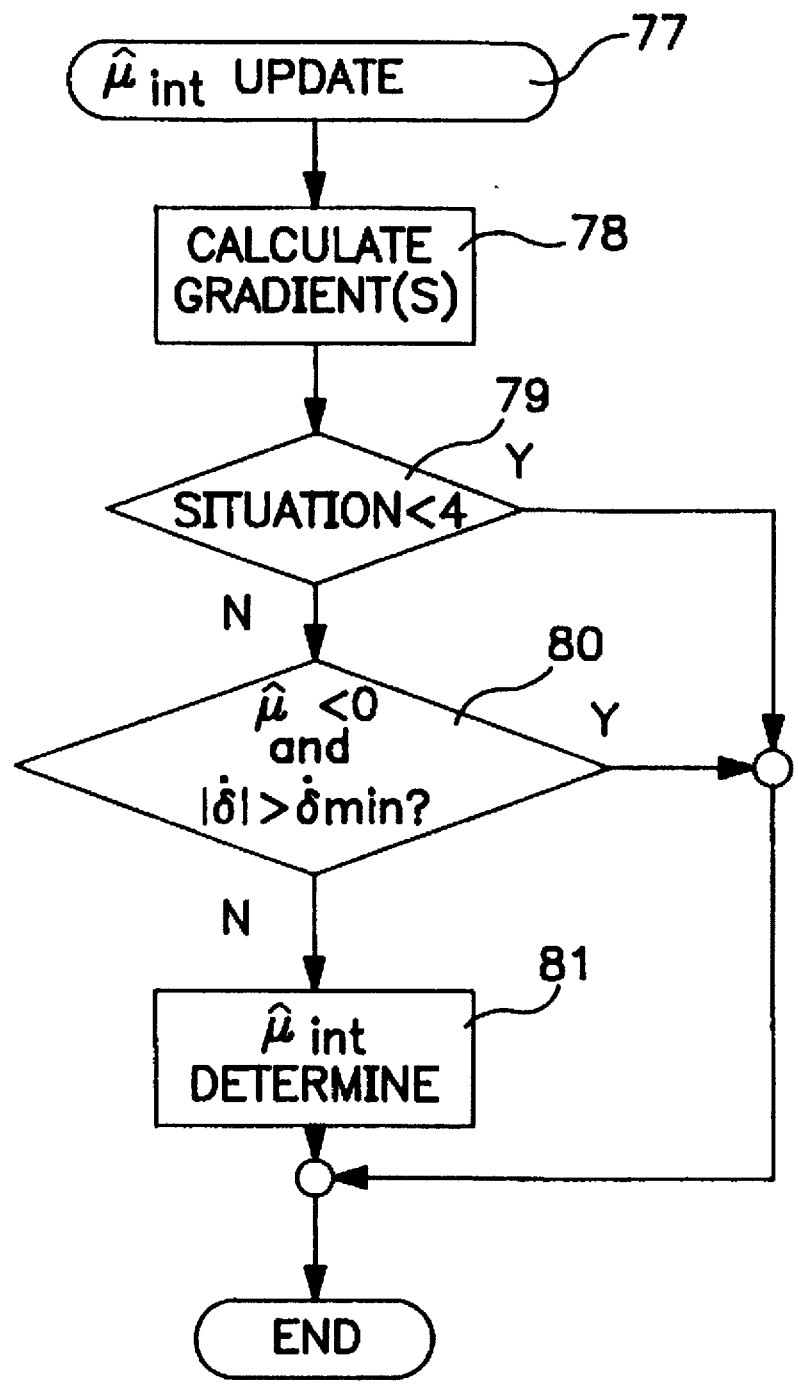

The logic processes taking place in the coefficient of friction and situation recognition unit 13 are shown in the form of flow charts in FIGS. 3, 4 and 5.

FIG. 3 pertains to the situation recognition. Eight different driving situations can be distinguished with the process shown:

<0> Standstill of the vehicle
<1> Constant straight travel
<2> Accelerated straight travel
<3> Decelerated straight travel
<6> Reverse travel
<7> Constant travel in curve
<8> Accelerated travel in curve
<9> Decelerated travel in curve.

Logic branchings are represented as blocks in the flow chart.

Based on a given situation 51 to be determined, it is first determined in block 52 whether or not the vehicle is at a standstill. If the filtered vehicle reference velocity $v_{RefFil}$ assumes its minimum vmin, standstill of the vehicle, i.e., situation <0>, is assumed. If $v_{RefFil}$ is greater than $v_{min}$, the result of the preceding run of situation recognition is polled in block 53.

If the situation last determined was recognized as reverse travel, i.e., situation <6>, reverse travel continues to be present, because standstill of the vehicle did not occur in the meantime, because situation <0> would have otherwise been recognized in block 52 in the meantime.

If the preceding run of the situation recognition recognized a situation other than <6>, the value of the lateral acceleration $a_{trans}$ is polled in block 54. If this is lower than a defined threshold value $a_{transmin}$, it is assumed that the vehicle is traveling straight, i.e., that one of the situations <1> through <3> prevails. This is also true when the value of the measured lateral acceleration $a_{trans}$ is above the threshold value $a_{transmin}$, but it is recognized in block 55 in the next step that value of the steering angle $\delta$ is lower than a threshold value $\delta_{min}$. The measured lateral acceleration $a_{trans}$ is an error of measurement that results from the fact that lateral acceleration meters are usually securely mounted in the transverse axis of the vehicle and are tilted with the vehicle in the case of an inclination of the road surface, so that a lateral acceleration that does not actually occur is indicated.

Consequently, if the vehicle is traveling straight, the value of the longitudinal acceleration along is examined in block 59. If this is lower than a threshold value $a_{longmin}$, constant straight travel is assumed. However, if the value of the longitudinal acceleration $a_{long}$ is greater than this threshold value, block 60 makes a distinction between positive and negative longitudinal acceleration. If the value of $a_{long}$ is above the threshold value $a_{longmin}$, the vehicle is in an accelerated straight travel, i.e., in situation <2>. If the value of $a_{long}$ is below the threshold value $a_{longmin}$, this means nothing else but negative longitudinal acceleration, e.g., decelerated straight travel, namely, situation <3>.

If none of the situations <0> through <3> occurs and a steering angle value that is greater than the threshold value $\delta_{min}$ is recognized in block 55, a polling is performed in block 56 to determine whether the vehicle is currently traveling in reverse. The recognition of reverse travel is necessary only at this point, because the yaw rate $\dot{\Psi}$ hardly differs from zero during straight travel anyway, and no control intervention is therefore performed. Reverse travel must be ruled out with certainty only when travel in a curve is recognized, in which the yawing moment control itself becomes active. This is not possible based solely on the signals of the wheel speed sensors, because such sensors only transmit the value of the speed, without making it possible to infer the direction of travel from it.

As was described above, situation <6> is determined by comparing the measured yaw rate $\dot{\Psi}_{Meas}$ with the desired yaw rate $\dot{\Psi}_{desired}$ determined in the vehicle reference model 12. If the signs are opposite, and if this is also true of the time derivatives of the two variables, namely, the yaw acceleration $\ddot{\Psi}_{Meas}$ and $\ddot{\Psi}_{desired}$, the vehicle is in a curve, traveling in reverse. The signs of the yaw accelerations are therefore compared, to rule out that the opposite signs of the yaw rates originate not only from a phase shift, which is due to the time-delayed calculation of the desired values.

If the conditions for reverse travel are not satisfied, there is travel in a curve in the forward direction. Whether or not this travel in the curve takes place at constant velocity is investigated in block 57. As was done before in blocks 59 and 60 in the case of straight travel, the value of the longitudinal acceleration $a_{long}$ is first examined in block 57. If it is lower than the threshold value $a_{longmin}$, there is constant travel in a curve, i.e., situation <7>. In the case of longitudinal acceleration $a_{long}$ whose value is greater than the threshold value $a_{longmin}$, it is further examined in block 58 whether the longitudinal acceleration $a_{long}$ is positive or negative. The vehicle is in an accelerated travel in a curve, i.e., situation <8>, in the case of positive longitudinal acceleration $a_{long}$, while a decelerated travel in a curve, corresponding to situation <9>, is recognized in the case of negative longitudinal acceleration $a_{long}$.

The longitudinal acceleration $a_{long}$ can be recognized in different ways. It can be determined, e.g., from the reference velocity $v_{Ref}$ provided by the ABS controller 7, in which case it should be borne in mind that such a reference velocity $v_{Ref}$ may deviate from the actual vehicle velocity during an ABS intervention. Consequently, a correction of $v_{Ref}$ is justified in an ABS case. However, the longitudinal acceleration $a_{long}$ can also be taken over under certain circumstances directly from the ABS controller if such calculation is performed there.

The situation recognition according to FIG. 3 is continually run through again, and the situation last determined remains stored and is available in block 53.

A possible process for determining the coefficient of friction of the road surface is shown in FIGS. 4 and 5. According to this process, the coefficient of friction is determined only when the yawing moment controller enters the control. However, since no estimated coefficient of friction is still available at the time of entry into the control, the coefficient of friction $\mu=1$ is set at the beginning of the control.

If the yawing moment control system responds on the basis of an instantaneous driving situation, it can be assumed that the vehicle is at least in the vicinity of the borderline range to unstable driving situations. The instantaneous coefficient of friction of the road surface can therefore be inferred from an examination of the current measured variables of the vehicle. The coefficient of friction then determined at the time of entry into the control will subsequently serve as the basis for limiting the desired yaw rate $\dot{\Psi}_{desired}$ and consequently also for the control deviation for the yaw rate $\Delta\dot{\Psi}$, which is transmitted to the YMC control law unit 16. The coefficient of friction is determined for the first time at the time of entry into the control, associated with a subsequent phase of updating for the limitation of the desired yaw rate to physically meaningful values. Based on the originally preset coefficient of friction $\mu=1$, a maximum coefficient of friction $\hat{\mu}$ is determined at the time of entry into the control, and the calculation of the additional yawing moment $M_G$ will then be based on this value.

An internal coefficient of friction $\hat{\mu}_{int}$ is first determined for this from the measured lateral acceleration $a_{trans}$ and a calculated value for the longitudinal acceleration $a_{long}$, which value corresponds to the instantaneous coefficient of friction if complete utilization of the frictional connection is assumed. However, since it must be assumed that the maximum frictional connection is not yet reached at the time of entry into the control, a higher coefficient of friction $\hat{\mu}$ is associated with the internal coefficient of friction $\hat{\mu}_{int}$ by means of a table, a characteristic curve or a constant factor. This coefficient of friction $\hat{\mu}$ is then sent to the control system. It is thus possible to calculate with a desired yaw rate $\dot{\Psi}_{desired}$ adjusted to the coefficient of friction of the road surface in the next step of the calculation and to improve the control. While the yawing moment control system acts on the vehicle, the estimated coefficient of friction $\hat{\mu}$ must be further updated, because a change in the coefficient of friction might take place during the control. If the control system is not activated based on the adjustment of the coefficient of friction in the vehicle reference model due to the resulting changed control deviation of the yaw rate $\Delta\dot{\Psi}$, the coefficient of friction $\hat{\mu}$ is further updated in $T_{\mu End}$ number of steps. If the yawing moment control system is not activated even during this phase of updating, the estimated coefficient of friction $\hat{\mu}$ is reset to 1.

The adjustment or updating of the estimated coefficient of friction $\hat{\mu}$ may also be omitted in certain situations. Such situations are, e.g., straight travel, travel in reverse or standstill of the vehicle, i.e., situations <0> through <4>. These are situations in which no yawing moment control is performed anyway, so that an estimation of the coefficient of friction is also unnecessary. Updating the coefficient of friction may be omitted if the time derivative of the coefficient of friction $\hat{\mu}$, i.e., $\dot{\hat{\mu}}$, is negative and the value of the time derivative of the steering angle $\delta$, i.e., $|\dot{\delta}|$, exceeds a predetermined threshold. It can be assumed in the latter case that a change in the lateral acceleration $a_{trans}$ is based on a change in the steering angle $\delta$, rather than on a change in the coefficient of friction.

It is generally true of the coefficient of friction calculated in this manner that it is a mean coefficient of friction for all four wheels of the vehicle. The coefficient of friction cannot be determined in this manner for the individual wheels.

The process of the coefficient of friction determination will now be explained on the basis of FIG. 4. The behavior of the vehicle is affected by the prevailing coefficient of friction of the road surface according to field 61 in each driving situation. To determine the corresponding coefficient of friction of the road surface, the measured lateral acceleration $a_{trans}$ is first filtered according to step 62, i.e., either the measured values are smoothed, or the curve passes through a low-pass filter, so that no extreme peaks appear. Step 63 comprises the situation recognition according to FIG. 3. The driving situation recognized is later significant for the phase of updating in step 74. A polling is performed in block 64 to determine whether a control intervention is necessary. Such a calculation is first based on the initial coefficient of friction $\mu=1$. If control is considered to be necessary, a polling is performed in block 65 to determine whether this was also the condition at the end of the preceding run of the coefficient of friction determination. If an entry into control is involved here, control was not recognized before, so that an internal coefficient of friction $\hat{\mu}_{int}$ is determined for the first time in step 67. It is calculated from the following equation:

$$\hat{\mu}_{int} = \frac{\sqrt{a_{trans}^2 + a_{long}^2}}{g} \qquad F\ 2.1$$

Here, g is the gravitation constant g=9.81 m/sec$^2$.

The parameter reg$_{old}$ for step 65 is set at 1 in step 68. In addition, the counting parameter T$\mu$ is set at 1, corresponding to the fact that the first determination of the internal coefficient of friction $\hat{\mu}_{int}$ has been performed. An estimated coefficient of friction $\hat{\mu}$ is associated with the calculated internal coefficient of friction $\hat{\mu}_{int}$ in step 69. This is done under the assumption that the existing acceleration components are not based on a complete utilization of the frictional connection, either. The estimated coefficient of friction $\hat{\mu}$ is consequently usually between the internal coefficient of friction $\hat{\mu}_{int}$ thus determined and 1. The determination of the coefficient of friction is thus concluded.

Consequently, assuming an unchanged driving situation, reg$_{old}$=1 is decided in block 65 during the next run of this coefficient of friction determination. A $\hat{\mu}_{int}$, which replaces the $\hat{\mu}_{int}$ determined in the preceding run, is later determined here as well. The parameters determined in field 68 are not updated, because the updating of $\hat{\mu}_{int}$ was performed during a control. reg$_{old}$ had been set at 1 already in the run before that, and it remains unchanged. The number T$\mu$ of runs performed continues to be 1, because counting is continued only if no control takes place. As was described above, an estimated coefficient of friction $\hat{\mu}$ is also associated with the updated value of $\hat{\mu}$ int by means of a table, a nonlinear relationship, or a constant factor.

If it is determined in one run in block 64 that control is not necessary, a polling is then performed in block 71 to determine whether the parameter reg$_{old}$ for the control was last set at 0 or 1. If it was set at 1 in the last run, the number T$\mu$ of runs is polled in block 72. This T$_\mu$equals 1 if control was performed in the last run. If control was performed only in the run before last, T$_\mu$=2, etc. If T$_\mu$has not yet reached a certain T$_{\mu End}$ in step 72, it is increased by 1 in step 73, and a repeated updating of the internal coefficient of friction $\hat{\mu}_{int}$ is performed in step 74. If the number T$_{\mu End}$ is then reached in one of the next runs without control having taken place, the parameter reg$_{old}$ is again reset to 0 for the control. The estimated coefficient of friction $\hat{\mu}$ is equated with the initial coefficient of friction $\mu=1$. The phase of updating for the coefficient of friction $\hat{\mu}$ is thus terminated.

If it is then again recognized in the next run in block 64 that no control is necessary, the initial coefficient of friction $\mu=1$ is retained in field 76 in block 71 with reg$_{old}$=0. A coefficient of friction determination is again performed only if the necessity of a control intervention is recognized in field 64.

The criteria for updating the internal coefficient of friction $\hat{\mu}_{int}$ after step 74 are shown in FIG. 5. Based on the instruction in field 77 that the internal coefficient of friction $\hat{\mu}_{int}$ is to be updated, the time derivatives of the estimated coefficients of friction $\hat{\mu}$ or $\hat{\mu}_{int}$ formed before, as well as of the steering angle $\delta$ are formed in step 78. When it is then recognized in block 79 that the vehicle is neither at a standstill nor is it traveling straight, i.e., that one of the situations <6> through <9> occurs, the results from step 78 are evaluated in step 80. A coefficient of friction determination is performed, as was explained above, only if a decreasing coefficient of friction cannot be attributed to a steering maneuver. No updating of the coefficient of friction is performed if the vehicle is traveling straight, forward or in reverse, or if it is at a standstill, or if a reduction in the estimated coefficient of friction $\hat{\mu}$ can be attributed to a steering maneuver.

2.2. Determination of $\beta$ and $\dot{\beta}$

The prevailing side slip angle $\beta$ as well as its time derivative, the velocity of the side slip angle $\dot{\beta}$ are an indicator of the stability of a driving condition. The determination of these values will be explained below.

2.2.1. Kinematic Determination of $\dot{\beta}$

The kinematic determination of $\dot{\beta}$, 14, is nothing else but the determination of the velocity of the side slip angle $\dot{\beta}$, separated from any vehicle model, from measured variables or from variables calculated on the basis of measured values, according to purely physical considerations:

The acceleration $a_{trans}$ of the center of gravity of the vehicle at right angles to its longitudinal axis in the plane of movement is measured. The center of gravity of the vehicle moves with the velocity vector $\underline{v}$ relative to an inertial system:

$$\underline{v} = v \begin{bmatrix} \cos(\Psi + \beta) \\ \sin(\Psi + \beta) \end{bmatrix} \qquad \text{F 2.2}$$

The yaw angle is designated by $\Psi$ and the side slip angle by $\beta$. The acceleration vector $\underline{a}$ is obtained as a derivative over time t as:

$$\underline{a} = \frac{d}{dt}\underline{v} = \dot{v} \begin{bmatrix} \cos(\Psi + \beta) \\ \sin(\Psi + \beta) \end{bmatrix} + v(\dot{\Psi} + \dot{\beta}) \begin{bmatrix} -\sin(\Psi + \beta) \\ \cos(\Psi + \beta) \end{bmatrix} \qquad \text{F 2.3}$$

The acceleration sensor measures the projection of the acceleration vector to the transverse axis of the vehicle:

$$a_{trans} = \underline{a}^T \begin{bmatrix} -\sin\Psi \\ \cos\Psi \end{bmatrix} \qquad \text{F 2.4}$$

$$a_{trans} = \dot{v}\sin\beta + v\cdot(\dot{\Psi} + \dot{\beta})\cos\beta \qquad \text{F 2.5}$$

After linearization of the trigonometric functions (sin $\beta=\beta$; cos $\beta=1$), the equation can be rewritten as $$\dot{\beta} = \frac{a_{trans}}{v} - \dot{\Psi} - \frac{\dot{v}}{v}\beta \qquad \text{F 2.6}$$

The velocity of the side slip angle $\dot{\beta}$ corresponding to the above differential equation can now be calculated. Besides the lateral acceleration $a_{trans}$, the yaw rate $\dot{\Psi}$, the scalar velocity of the vehicle v and its time derivative $\dot{v}$ are included as measured variables. To determine $\beta$, $\dot{\beta}$ from the previous calculation can be numerically integrated, and $\dot{v}=0$ is assumed for the first determination of $\dot{\beta}$. A simplification is obtained if the last term is generally ignored, so that no $\beta$ needs to be determined.

The proposed procedure offers the advantage that the velocity of the side slip angle $\dot{\beta}$ is directly derived from the sensor signals and thus it can also be determined in the nonlinear range of the transverse dynamics. The disadvantages are the sensitivity of the procedure to measurement noise and the cumulative integration of errors of measurement, as a result of which the determination of the side slip angle may become highly inaccurate.

Figure 6:
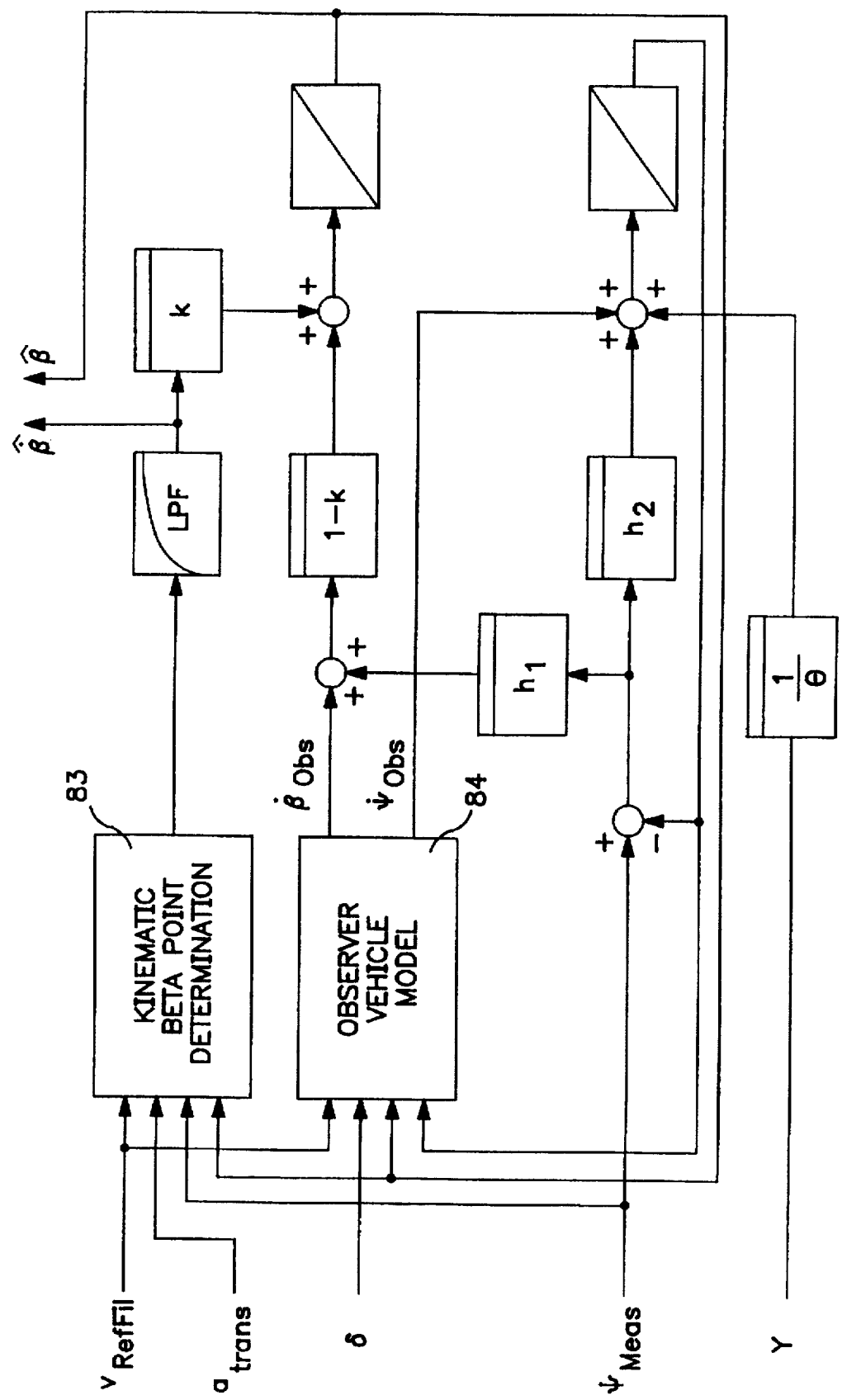

These disadvantages are circumvented by the combination with a model-supported procedure. FIG. 6, which can be inserted in place of the block 18 drawn in broken line in FIG. 2, shows such a combination of the kinematic determination with the observer model-supported determination of the velocity of the side slip angle $\dot{\beta}$. The steering angle $\delta$, which is indicated by an arrow drawn in broken line, is also included as an additional input variable in such a model-supported procedure. The mutual influences and correction of the combined methods of determination of the velocity of the side slip angle $\dot{\beta}$ also make it possible to calculate the side slip angle $\beta$ itself with less error, so that it can then also be made available to the control as $\hat{\beta}$. This is also indicated by an arrow drawn in broken line.

2.2.2. Combination of the Kinematic Determination of $\dot{\beta}$ with an Observer Vehicle Model The area 18 bordered in broken line in FIG. 2 can also be replaced with the representation according to FIG. 6. It will thus become possible to determine not only the existing velocity of the side slip angle $\dot{\beta}$, but also the prevailing side slip angle $\beta$.

Contrary to a purely kinematic calculation of the velocity of the side slip angle $\dot{\beta}$, an observer vehicle model 84 is used here to determine the driving condition, in addition to the kinematic determination of $\dot{\beta}$. Just like the vehicle reference model 12 for determining the yaw rate, the observer vehicle model 84 receives the steering angle $\delta$ as the input variable. The filtered vehicle reference velocity $v_{RefFil}$ is included as a parameter. The measurable output variables, namely, the lateral acceleration $a_{trans}$ and the yaw rate $\dot{\Psi}_{Meas}$, are needed for the kinematic determination of $\dot{\beta}$, 83, but not for the observer vehicle model 84, which creates these variables, in principle, itself.

Another term Y, which is identical in the simplest case to the additional yawing moment calculated by the control law unit, represents the changes in the vehicle behavior, which are caused by a control intervention. Y is also used to expose the observer's simulated vehicle to the same conditions as the real vehicle.

Besides a velocity of the side slip angle $\dot{\beta}$Obs, the observer vehicle model also gives a value for the yaw acceleration $\ddot{\Psi}_{Obs}$. The variable for the velocity of the side slip angle $\dot{\beta}$, which originates from the kinematic determination of $\dot{\beta}$, is multiplied by a weighting factor k after passing through the low-pass filter, while the variable for the velocity of the side slip angle $\dot{\beta}$Obs, which originates from the observer vehicle model, is multiplied by a weighting factor (1–k). The value of k is always between 0 and 1. We would have k=1 without the observer vehicle model. After adding the two velocities of the side slip angles, the sum is integrated into an estimated side slip angle $\hat{\beta}$. Besides the kinematic velocity of the side slip angle $\dot{\beta}$, this is also made available to the control. In addition, the side slip angle $\hat{\beta}$ is transmitted to both the kinematic determination of $\dot{\beta}$ and the observer vehicle model 84. A similar correcting variable is the yaw acceleration $\ddot{\Psi}_{Obs}$ calculated by the observer vehicle model 84.

This is first integrated to a yaw rate and returns to the observer vehicle model 84, on the one hand, and is subtracted from the measured yaw rate $\dot\Psi$, on the other hand. This difference is multiplied by a factor h that determines the value of the next control steps in the correction of the observer vehicle model 84 and is provided with the dimension 1/s. The yaw rate multiplied by this factor h has consequently the same dimension as the yaw acceleration $\ddot\Psi$, so that the two variables can be added up and form a returning correcting variable for the yaw rate after further integration.

In the course of a yawing moment control, the term Y assumes values different from zero, corresponding to the additional yawing moment $M_G$ applied. By being divided by the moment of inertia in yaw $\Theta$ of the vehicle, the term Y also acquires the dimension of a yaw acceleration and is added to the sum of the yaw accelerations, so that the integrated correction variable also takes into account the control effects or influences.

If an observer vehicle model 84 according to FIG. 6 is present, which makes possible a more reliable determination of the side slip angle $\beta$ than would be possible with a purely kinematic determination of the velocity of the side slip angle $\dot\beta$, and integration, the side slip angle $\beta$ thus determined can also be transmitted to the yawing moment controller 10 proper.

Figure 7:
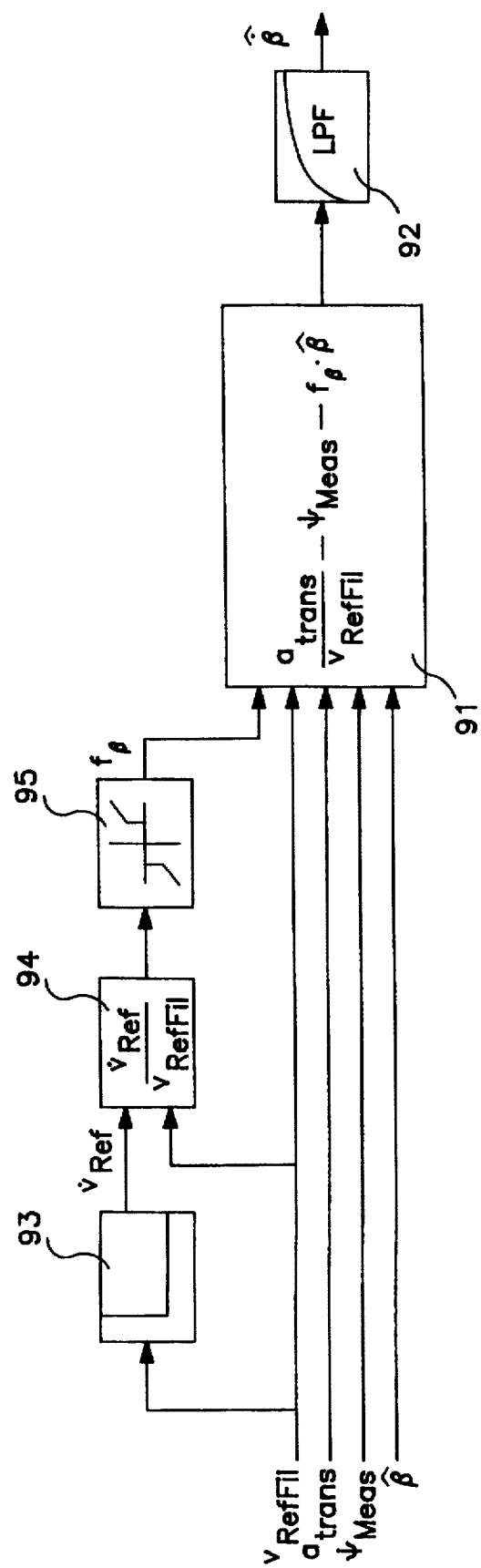
FIG. 7 shows a block diagram of the direct determination of the velocity of the side slip angle from kinematic considerations as part of the combined process according to FIG. 6.

The kinematic determination of $\beta$, which takes place in combination with an observer vehicle model, is shown in FIG. 7. As is apparent even from FIG. 6, the lateral acceleration $a_{trans}$ and the yaw rate $\dot\Psi_{Meas}$ are included in the calculation 91 according to Equation F 2.6 as measured output variables.

The filtered vehicle reference velocity $v_{RefFil}$ is differentiated in field 93 to provide the vehicle reference velocity $\dot v_{Ref}$, which is divided in field 94 by the filtered vehicle reference velocity $v_{RefFil}$, which leads to a factor $f_\beta$ after nonlinear multiplication 95. This nonlinear multiplication 95 leads to the factor $f_\beta$ being set to equal zero at low quotients of $\dot v_{Ref}$ and $v_{RefFil}$, so that this factor, which precedes the side slip angle $\beta$, can be ignored. The side slip angle $\beta$ is taken into account in the kinematic determination of $\dot\beta$ only when the vehicle acceleration $\dot v_{Ref}$ reaches a significant value. The $\beta$ used here is the combined $\beta$, which is used both as a variable for the control and for feedback according to FIG. 6. After calculation 91, the value determined for the velocity of the side slip angle passes through a low-pass filter 92, as was described above, and it yields the estimated velocity of the side slip angle $\dot\beta$.

Figure 8:
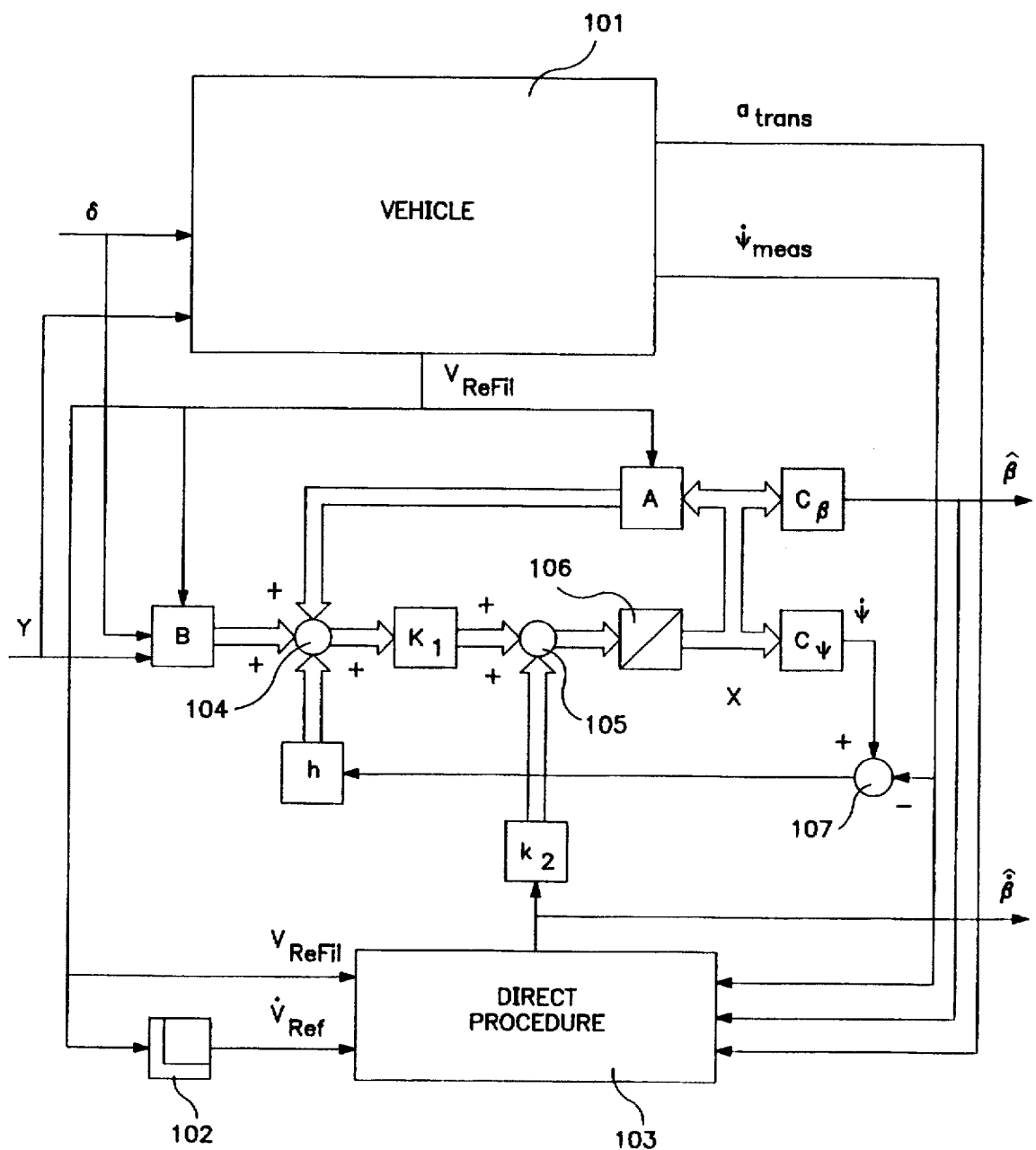

FIG. 8 shows how the observer vehicle model 84 from FIG. 6 operates. A matrix representation was selected, in which "→" are scalar and "⇒" multidimensional formations.

The matrix representation is based on Equations F 1.1 through F 1.3. The phase variables $\beta$ and $\dot\Psi$ are combined into a phase vector $\underline{x}(t)$, so that the following set of equations is obtained:

$$\underline{\dot x}(t) = \underline{A}(v(t))\underline{x}(t) + \underline{B}(v(t))\underline{u}(t) \qquad F\ 2.7$$

with the system matrix $\underline{A}(v(t))$, the input matrix $B(v(t))$, the phase vector $\underline{x}(t)$ and the input vector $\underline{u}(t)$:

$$\underline{A}(v(t)) = \begin{bmatrix} -\frac{c_h + c_v}{mv(t)} & -1 + \frac{c_h l_h - c_v l_v}{mv^2(t)} \\ \frac{c_h l_h - c_v l_v}{\Theta} & -\frac{c_h l_h^2 + c_v l_v^2}{\Theta v(t)} \end{bmatrix} \qquad F\ 2.8$$

$$\underline{B}(v(t)) = \begin{bmatrix} \frac{c_v}{mv(t)} & 0 \\ \frac{c_v l_v}{\Theta} & \frac{1}{\Theta} \end{bmatrix}; \underline{x}(t) = \begin{bmatrix} \beta(t) \\ \dot\Psi(t) \end{bmatrix}; \underline{u}(t) = \begin{bmatrix} \delta \\ Y \end{bmatrix}$$

The input vector $\underline{u}(t)$ contains as the input variables the steering angle $\delta$ and the term Y, which is the additional yawing moment generated by the yawing moment control system.

Instead of weighting factors, a weighting matrix $\underline{K_1}$ and a weighting vector $\underline{k_2}$ are used for the weighted addition of the variables determined.

$$\underline{K_1} = \begin{bmatrix} 1-k & 0 \\ 0 & 1 \end{bmatrix}; \underline{k_2} = \begin{bmatrix} k \\ 0 \end{bmatrix}; 0 \le k \le 1 \qquad F\ 2.9$$

To eliminate the phase variables, two vectors, $\underline{c_\beta}$ and $\underline{c}_{\dot\Psi}$, are introduced, which cancel one component of the phase vector each:

$$\underline{c_\beta} = [1,0];\ \underline{c}_{\dot\Psi} = [0,1] \qquad F\ 2.10$$

The dynamics of the observer vehicle model, i.e., the value of the correction steps, is determined by a vector $\underline{h}$, whose first component, $h_1$, is dimensionless, and whose second component, $h_2$, has the dimension (1/s):

$$\underline{h} = \begin{bmatrix} h_1 \\ h_2 \end{bmatrix} \qquad F\ 2.11$$

Based on the vehicle model in the description of the phase space (F 1.1 and F 1.2), the structure described below is then obtained for determining the side slip angle $\beta$ by means of an observer according to FIG. 8.

The vehicle 101 is shown in FIG. 8 only to distinguish between input variables and output variables. It is not a part of the combined procedure for determining the velocity of the side slip angle $\dot\beta$.

The system equations according to F 2.7 are formed in the adder 104. To do so, the system matrix $\underline{A}$ is multiplied by the phase vector $\underline{x}$, and the input matrix $\underline{B}$ is multiplied by the input variables and y, i.e., with the input vector $\underline{u}$.

The current vehicle reference velocity $v_{RefFil}$ is included as the only variable parameter in both the system matrix $\underline{A}$ and the input matrix $\underline{B}$. The time derivative $\dot x$ of the phase vector $\underline{x}$, formed in the adder 104 by addition, is now multiplied by the weighting matrix $\underline{K_1}$ according to F 2.9 and is sent to another adder 105.

Simultaneously to these processes, a velocity of the side slip angle $\dot\beta$ is estimated in the direct procedure 103. The filtered vehicle reference velocity $v_{RefFil}$, as well as its time derivative $\dot v_{Ref}$ determined in the differentiator 102 (identified by 93 in FIG. 7), the measured lateral acceleration $a_{trans}$, as well as the measured yaw rate $\dot\Psi_{Meas}$ according to Equation F 2.6 are used for this. The last term of the equation is ignored in the first step, because no value of the side slip angle $\beta$ is available as yet. After the velocity of the side slip angle is determined, it still passes through the low-pass filter 92, as was shown in FIG. 7, after which the resulting estimated velocity of the side slip angle $\dot{\beta}$ is made available for the further calculation. This $\dot{\beta}$ corresponds to the $\dot{\beta}$ which is output from the shaded field in FIG. 2. The scalar $\dot{\beta}$ is multiplied by the weighting factor $\underline{k}_2$, so that a vector is obtained from this, whose first component has the dimension of an angular velocity, and whose second component equals zero. This vector is also sent to the adder 105. The vector resulting from the sum of the time derivative $\dot{\underline{x}}$ of the phase vector $\underline{x}$ formed according to Equation F 2.7 and of the vector obtained from the multiplication with $\underline{k}_2$ is integrated in the integrator 106 into the phase vector $\underline{x}$. One of the components $\beta$ and $\dot{\Psi}$ is eliminated from the phase vector by scalar multiplication of the vectors $\underline{c}_\beta$ and $\underline{c}_\psi$ and is further processed. While the estimated is sent to the YMC control law unit 16, on the one hand, and to the direct process 103, on the other hand, the calculated is used within the combined process only as a state variable within the observer and for determining the error of estimation. The difference between the yaw rate $\dot{\Psi}$ determined from the observer vehicle model and the measured yaw rate $\dot{\Psi}_{Meas}$ is formed for this purpose in the adder 107. This difference is multiplied by a vector $\underline{h}$, whose first component is dimensionless and sets the value of the correction steps for the velocity of the side slip angle $\dot{\beta}$, and whose second component has the dimension s$^{-1}$ and determines the value of the control steps during the correction of the yaw rate $\dot{\Psi}$.

The side slip angle $\dot{\beta}$ is also returned as a correcting variable; specifically, it is fed back into the direct procedure of the kinematic determination of $\beta$ according to FIG. 7, so that the last term of Equation F 2.6 can also be assigned a value in the subsequent control step.

A substantially more accurate determination of the side slip angle $\dot{\beta}$ is possible due to the mutual correction of the two calculation procedures, i.e., the calculation on the basis of a vehicle model and the calculation on the basis of kinematic considerations, so that this side slip angle can also be sent as a controlled variable to the YMC control law unit 16.

2.3. Vehicle Reference Models

The vehicle reference model will be explained below on the basis of FIGS. 9 and 12 through 17.

Figure 9:
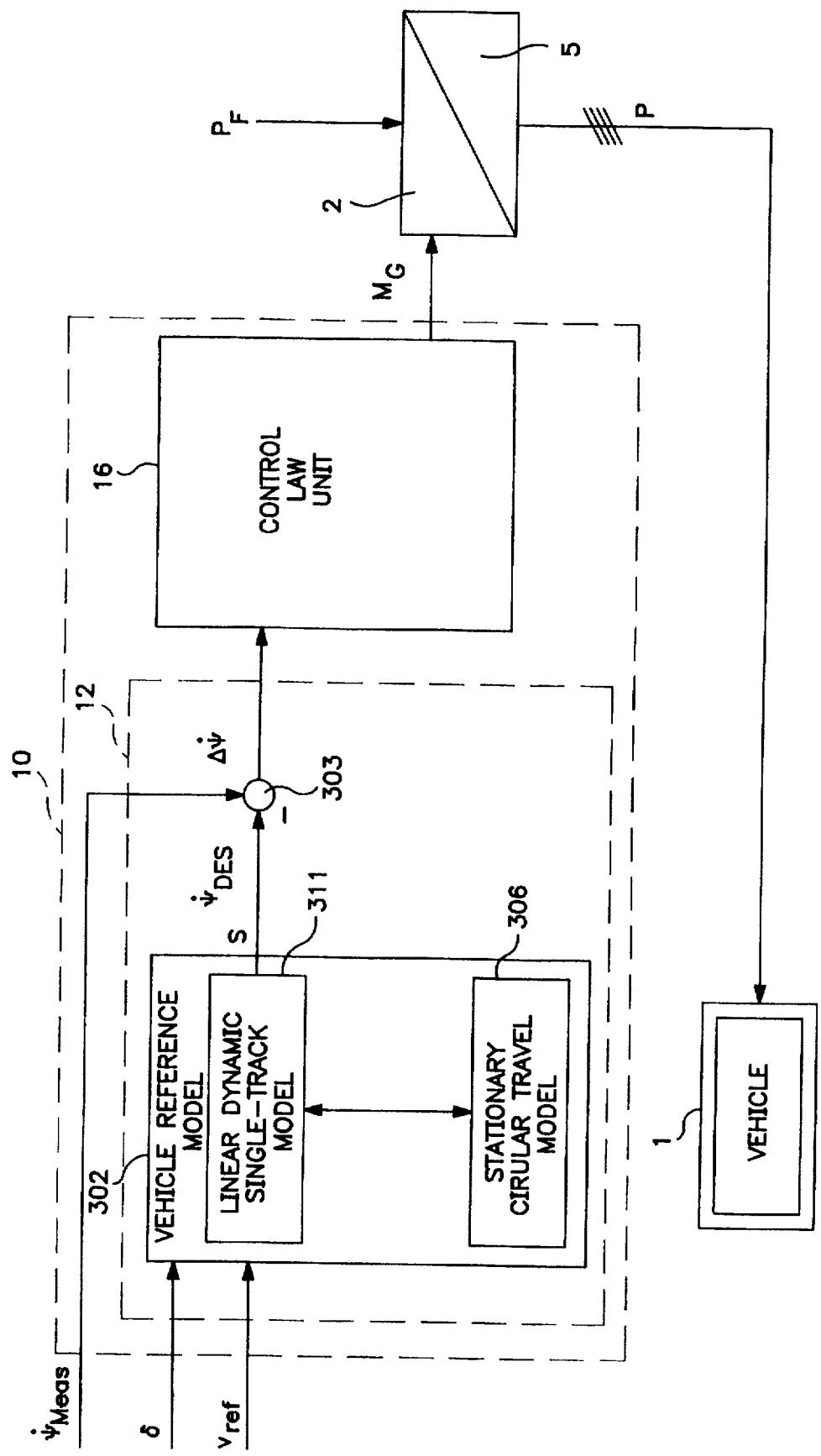
FIG. 9 shows a control circuit for driving stability control with a travel speed-dependent change of the calculation model for the vehicle.

FIG. 9 shows an even more simplified version of the control circuit according to FIG. 1 and FIG. 2 for controlling the driving stability of a vehicle. The controllers 7 through 9 in FIG. 1, the corresponding priority circuit 3 and the motor management 6 are omitted, and the distribution logic unit 2 is shown combined with the pressure control unit 5. An additional yawing moment $M_G$ around the vertical axis is calculated and set within the control circuit, so that the curve path desired by the driver is maintained. The additional yawing moment $M_G$ is generated by specific braking processes on the individual wheels, and the course of the braking processes and the selection of the wheels to be braked are set by the distribution logic 2. The desired direction of travel is set by the driver by selecting a corresponding angular position of the steering wheel. The steering wheel is coupled with the steered wheels at a fixed transmission ratio (steering ratio). A defined steering angle $\delta$ of the wheels is thus set.

2.3.1. Dynamic Single-Track Model

A so-called vehicle reference model 12 (FIG. 2)=302 (FIG. 9), which is supplied with input data (velocity v, represented by $v_{Ref}$, steering angle), is provided in the YMC controller 10. The size of the change in the yaw angle (yaw rate $\dot{\Psi}_{Desired}$) is calculated in the vehicle reference model 302 on the basis of the input data. The desired value of the yaw rate $\dot{\Psi}_{Desired}$ is compared with the measured actual value of the yaw rate $\dot{\Psi}_{Meas}$ in a downstream comparison unit 303. The comparison unit 303 sends as an output value an output variable $\Delta \dot{\Psi}$, which corresponds to the difference between $\dot{\Psi}_{Desired}$ and $\dot{\Psi}_{Meas}$. The difference value thus determined is sent to a control law unit 16 for controlling the yawing moment. On the basis of $\Delta \dot{\Psi}$, the control law unit calculates an additional yawing moment $M_G$, which is sent to the distribution logic unit 2. Based on the additional yawing moment $M_G$ and possibly the driver's desire to build up pressure in the brakes, PBrake, the distribution logic unit 2 sets output variables. These may be brake pressure values or valve switching times.

Optimal mode of operation of the vehicle reference model 302 is also important in the range of low velocities. To ensure this, the vehicle reference model 302 may also be provided with a stationary circular travel model 306, in addition to the above-described linear dynamic single-track model 311.

For the stationary circular travel:

$$\dot{\Psi}_{desired} = \delta * \frac{v}{l_v + l_h} * \frac{1}{1 + \frac{v^2}{v_{ch}^2}} + \dot{\Psi}_{korr} \qquad \text{F 2.12}$$

$$\beta = \delta * \frac{1 - \frac{l_v}{l_v + l_h} * \left(1 + \frac{m * v^2}{c_h * (l_v + l_h)}\right)}{1 + \frac{v^2}{v_{ch}^2}} + \beta_{korr} \qquad \text{F 2.13}$$

in which $$v_{ch}^2 = \frac{c_v * c_h * (l_h + l_v)^2}{m * (c_h * l_h - c_v * l_v)} \qquad \text{F 2.14}$$

Here, v=front; h=rear; m=weight; l=distance between the axle and the center of gravity; $\dot{\Psi}_{korr}$, $\beta_{korr}$=correction terms for $\dot{\Psi}$, $\beta$ respectively.

The system equations F 1.1 and F 1.2 are valid for the linear dynamic single-track model.

The switching over between the calculation models 306 and 311 is performed automatically by a change-over switch (not shown in the drawing) in the vehicle reference model 302 as a function of the velocity of the vehicle. A hysteresis of a few km/h is provided for switch-over processes from one model to the other. Below the switching threshold, the desired yaw rate $\dot{\Psi}_{Desired}$ is calculated according to the model of stationary circular travel. If the velocity, increasing from a lower value, exceeds the threshold that applies to this direction, the calculation of the desired value of the yaw rate $\dot{\Psi}_{Desired}$ is performed by means of the dynamic single-track model 311. The dynamic processes that are particularly important for control at higher velocities are thus incorporated in the model.

The desired values calculated by the circular travel model, such as $\dot{\Psi}_{Desired}$ and $\beta$, are used as the starting values for the single-track model when switching over from the circular travel model 306 to the single-track model 311. As a result, transient effects during switch-over are avoided. Further calculation is performed by means of the single-track model 311 until the velocity drops below the velocity threshold, which is lower for decreasing velocity. To minimize transient effects here as well, the correction factors $\dot{\Psi}_{korr}$ and $\beta_{korr}$ necessary for the circular travel model are calculated with the values for $\dot{\Psi}_{Desired}$ and $\beta$, which were calculated before in the single-track model, as well as with the velocity $v_{Ref}$ and the steering angle $\delta$ as the input variables.

The correction values are as follows:

$$\dot{\Psi}_{korr} = \dot{\Psi}_{desired} - \delta * \frac{v}{l_v + l_h} * \frac{1}{1 + \frac{v^2}{v_{ch}^2}} \quad \text{F 2.15}$$

$$\beta_{korr} = \beta - \delta * \frac{1 - \frac{l_v}{l_v + l_h} * \left(1 - \frac{m * v^2}{c_h * (l_v + l_h)}\right)}{1 + \frac{v^2}{v_{ch}^2}} \quad \text{F 2.16}$$

The effect of these correction factors decreases exponentially over time according to the equation:

$$\psi_{korr}(n+1) = \psi_{korr}(n) * \lambda \quad \text{F 2.17}$$

$$\beta_{korr}(n+1) = \beta_{korr}(n) * \lambda$$

in which $\lambda$ may assume values between 0 and less than 1. The calculation runs are counted with n and n+1.

Sudden changes are avoided as a result, because the two calculation methods yield different results in the stationary case. Thus, the changeover between calculation models offers the possibility of determining the desired values for the control system at a rather high accuracy to velocities of v=0 km/h.

It was explained in connection with FIG. 9 that different models can be considered for use as vehicle calculation models. The stationary circular travel may be a preferred model. The yaw rate $\dot{\Psi}_{Desired}$ can be calculated according to this model from the above formula. If such a vehicle calculation model is to be represented, it is possible to send the measured values and $v_{Ref}$ to a calculation circuit 350 and to subsequently poll the desired value of the yaw rate $\dot{\Psi}_{Desired}$ as an output value.

2.3.2. Simplified Model

An extremely simple model for determining a desired yaw rate will be described below. It shall be an alternative to the above-described combination model. It is characterized in that an acceptable result is obtained with a small amount of calculations.

The desired yaw rate $\dot{\Psi}_{Desired}$ is calculated according to this model as follows:

$$\dot{\Psi}_{desired} = \frac{\delta * v}{l} \quad \text{F 2.18}$$

This equation is obtained from F 2.12, with equations F2.14 and F2.15 if the rigidities $c_r$ and $c_1$ are assumed to be very high.

This hypothesis is based on the following considerations.

In the vehicle reference model described above, the desired yaw rate $\dot{\Psi}_{Desired}$ is calculated either by means of a dynamic vehicle model (e.g., a single-track model) or by a static model (called stationary circular travel value) and is compared with the measured yaw rate $\dot{\Psi}_{Meas}$. However, the preset value (and consequently also the control intervention) depend directly on the quality of the vehicle model in each of these hypotheses. Since these are linear equivalent models, the model markedly differs in some cases from the actual behavior of the vehicle.

If the real behavior of the vehicle additionally changes due to, e.g., load or wear of individual components, the model describes the vehicle only insufficiently. Consequently, adaptation of the model should be performed by means of a continuous parameter estimation, in connection with which the following problems arise:

An excitation must be present for the estimation, i.e., the driver should sufficiently excite the vehicle by means of a steering instruction in the linear range (<0.4 g). This hardly applies to normal driving.

Furthermore, it is not possible to directly estimate all parameters of the linear single-track model. Thus, certain parameters should be preselected as fixed parameters.

Consequently, control on the basis of model hypotheses can always offer a satisfactory solution only regarding the model preset values. It may therefore be sufficient in many cases to proceed according to a simple control principle.

One important goal of driving stability control is to coordinate the driving behavior such that the response of the vehicle to steering, braking and gas pedal inputs of the driver is always predictable and readily controllable. Consequently, understeering and oversteering operating conditions of the vehicle must be recognized and corrected to neutral behavior by a corresponding braking or engine management intervention.

The idea of a simplified control principle is that a direct indicator of the understeering/oversteering behavior is used as a controlled variable. According to a definition of the steering behavior of a motor vehicle the mean king pin inclinations of the front axle and rear axle ($\alpha_v$, $\alpha_H$) are compared for this purpose. In the case of greater king pin inclinations of the front axle, the vehicle thus exhibits an understeering behavior, and, in the opposite case, an oversteering behavior. According to the definition, neutral behavior is present if the king pin inclinations front and rear are equal. Thus, $$a_v - a_h \quad \begin{array}{ll} > 0: & \text{understeering} \\ = 0: & \text{neutral} \\ < 0: & \text{oversteering.} \end{array} \quad \text{F 2.10}$$

Based on the difference of the king pin inclinations, it is consequently possible to directly determine the instantaneous driving condition of the vehicle. If the single-track vehicle model (FIG. 12) is used as a hypothesis, the king pin inclinations can be derived from this as a function of the steering angle $\delta$, the side slip angle $\beta$, the yaw rate $\dot{\Psi}$ and the velocity of the vehicle v, as follows:

$$a_v = \delta - \beta - \frac{\dot{\Psi} * l_v}{v} \quad \text{F 2.20a}$$

$$a_h = -\beta + \frac{\dot{\Psi} * l_h}{v} \quad \text{F 2.20b}$$

Since the side slip angle cannot be directly measured or calculated in a simple manner, an explicit calculation of the individual king pin inclinations must be performed. However, if their difference is formed, it is possible to calculate this variable on the basis of the existing measured variables (steering angle, yaw rate) of the vehicle reference velocity $v_{Ref}$ known from the ABS controller and from the constant wheel base 1.

$$a_v - a_h = \delta - \frac{l * \dot{\Psi}}{v} \quad \text{F 2.21}$$

Thus, a variable that can be used as an indicator of understeering/oversteering is available.

If the known relationship between the instantaneous curve radius R of the curve path of the center of gravity of the vehicle and the difference of the king pin inclinations is also considered $$R = \frac{1}{\delta - (a_v - a_h)} \qquad \text{F 2.22}$$

it can be recognized that if a neutral state of the vehicle (F 2.19) is assumed $$a_v - a_h = 0 \qquad \text{F 2.23}$$

the curve radius R can be determined only by the steering angle, namely, $$R = 1/\delta \qquad \text{F 2.24}$$

A control that directly uses the calculated king pin inclination difference as the controlled variable is therefore possible. The instruction for this control is to keep the value of this controlled variable as small as possible in order thus to achieve an approximately neutral behavior. It may be meaningful to assume this tolerance threshold to be asymmetric, so that the tolerance can be selected to be smaller in the direction of oversteering behavior.

The desired yaw rate $\dot{\Psi}_{Desired}$ can be calculated according to these considerations (F 2.18). This yaw rate $\dot{\Psi}_{Desired}$ is then compared with $\dot{\Psi}_{Meas}$ and is used as the basis of the control according to FIG. 1.

2.3.3. Desired Value Limitation

Controlling the driving behavior of the vehicle makes sense only as long as the adhesion of the wheels of the vehicle on the road surface permits the calculated additional torque to act on the vehicle.

It is undesirable, e.g., for the control to always force the vehicle to the curve path predetermined by the steering angle δ when the steering wheel was turned in excessively or too rapidly in relation to the existing velocity of the vehicle.

$\dot{\Psi}_{Desired}$ should therefore be prevented from always being selected as the preset value under all circumstances, according to the vehicle reference model selected, because if the reference model alone is followed, it may happen under unfortunate circumstances that if the steering wheel angle is accidentally set at an excessively high value, and the velocity is also high at the same time, the actual yaw rate $\dot{\Psi}$ will be changed so much, due to the fact that $\dot{\Psi}_{Desired}$ is also too high in this case, that the vehicle will rotate around its own axis in the extreme case, while its center of gravity is moving in an essentially straight line at the same time. This condition is even much more unfavorable for the driver than the condition in which the vehicle is unable to obey the driver's desire due to the poor friction conditions and pushes out in a strongly understeering manner, because the vehicle will at most only travel straight in this case, without also rotating around its own axis.

To avoid these consequences, which are disadvantageous in special cases, calculation algorithms, which make it possible to set the maximum yaw rate $\dot{\Psi}_{Desiredmax}$ valid for the velocity just measured via the coefficient of friction μ, are additionally provided in the vehicle reference model. μ is determined in the coefficient of friction recognition unit 13. The calculation algorithms are based on the theory of stationary circular travel, for which $\dot{\Psi} = a_{trans}/v$ (F 2.18).

The maximum allowable lateral acceleration $a_{qlim}$ an be determined essentially as a function of the coefficient of friction, the velocity v, the longitudinal acceleration $a_{long}$, and possibly other parameters. Thus, $$a_{qlim} = f(\mu, v, a_{long}, \ldots) \qquad \text{F 2.25}$$

The maximum yaw rate can be calculated as:

$$\dot{\Psi}_{Desiredmax} = \frac{a_{qlim}}{v} \qquad \text{F 2.26}$$

It is therefore possible to set a limit value for the yaw rate, which does not take the driver's wish directly into account any longer, but it contributes to preventing the vehicle from additionally rotating around its vertical axis when it swings out.

Details of the suitable determination of μ will be described under 2.1.

Provisions can also be made to permit a control intervention only under certain prevailing conditions. One possibility for this may be, e.g., for the activation logic unit 11 in FIG. 2 to not transmit any current $M_G$ to the distribution logic unit 2 when an excessively large side slip angle β is determined, which can happen depending on the just occurring velocity.

2.4. Control Law Unit

The program structure of the control law unit 16 of the yawing moment controller 10 will be described below. From four input variables, the program calculates the additional yawing moment $M_G$ around the vertical axis of the vehicle that is necessary to obtain a stable vehicle behavior especially during travel in a curve. The yawing moment $M_G$ calculated is the basis for the calculation of the pressures to be applied to the wheel brakes.

Figure 19:
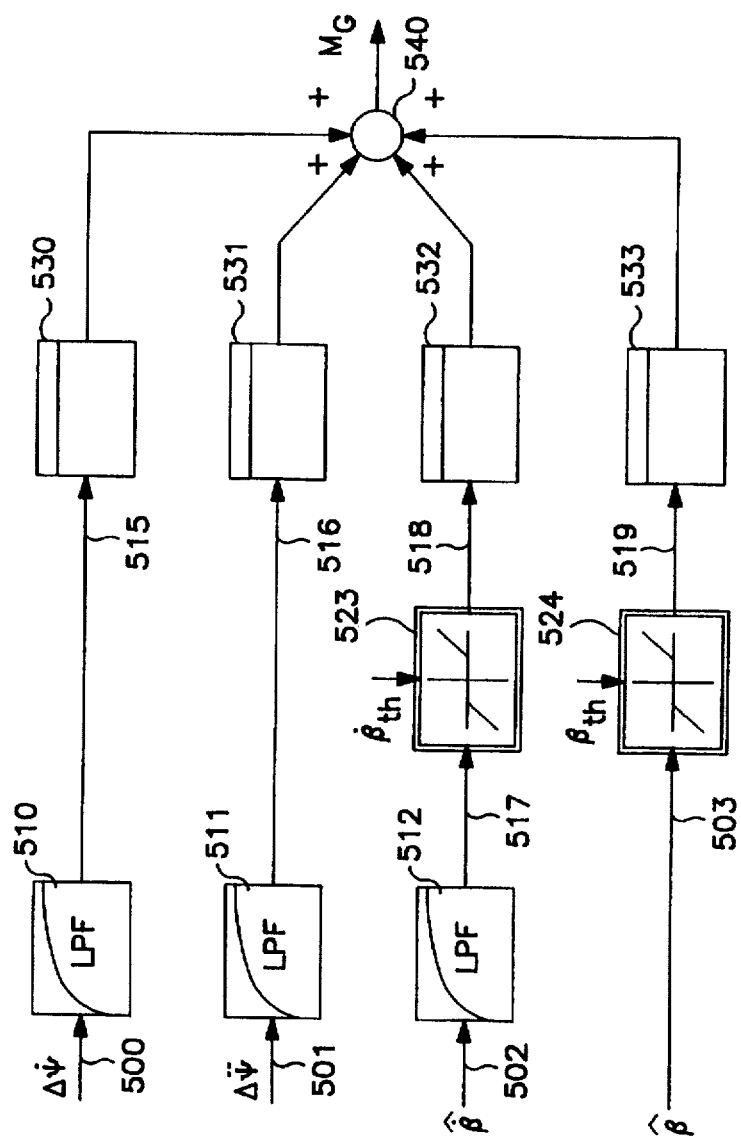
FIG. 19 shows a block diagram for describing the controller for calculating the additional yawing moment.

The following input variables are available for the control law unit (see FIG. 19):

at input 500: $\Delta\dot{\Psi}$
at input 501: $\Delta\ddot{\Psi}$
at input 502: $\dot{\beta}$
at input 503: $\beta$ If the king pin inclination difference is used as a basis, $\Delta\dot{\Psi}$ is present at the input 500 and $\Delta\ddot{\Psi}$ is present at the input 501.

Input 503 is facultative. It is available especially when a so-called observer vehicle model 84 is provided in the overall calculation system.

The value at input 500 is obtained as the difference between the measured yaw rate $\dot{\Psi}_{Meas}$ and the desired yaw rate $\dot{\Psi}_{Desired}$ calculated by means of a vehicle reference model 12.

The value at input 501 is obtained either as a change in the variable at input 500 over time from one calculation loop to the next, divided by the loop time $T_0$, or as a difference between the time derivative of the measured yaw rate and the time derivative of the calculated desired yaw rate.

A calculation loop is defined as a calculation run through the DSC driving stability controller according to FIG. 1. Due to its structure, such a loop requires a certain amount of real time, the loop time $T_0$. This must be kept sufficiently short for an effective control.

The values at the inputs 500 and 501, namely, $\Delta\dot{\Psi}$ and $\Delta\ddot{\Psi}$, are first sent to a respective low-pass filter 510 or 511.

Figure 20:
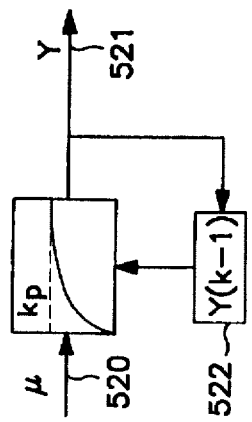
FIG. 20 shows a block diagram for describing a low-pass filter.

The two low-pass filters are, in principle, of the same design, and have the structure shown in FIG. 20.

The input variable 520 of the low-pass filter according to FIG. 20 is designated by u, and the output variable 521 is designated by y. The output variable 521 is sent to a register 522 and is available as a previous value y(k-1) at the time of the next calculation. The output value 521 for the calculation loop can then be calculated according to the formula $$y(k) = \lambda \cdot y(k-1) + (1-\lambda) \cdot u \cdot k_p \qquad \text{F 2.27}$$

in which λ may assume values between 0 and 1. λ describes the quality of the low-pass filter. The recursion function is eliminated at the limit value λ=0: The previous values y(k−1) are of no significance for the calculation of the new output value 521. The more closely λ approaches the value of 1, the stronger will be the effect of the previous values, so that the current input value 520 becomes established as an output value 521 only slowly.

$k_p$ is a linear rating factor.

The low-pass filtration just described is performed for both input values 500 and 501, and it leads to filtered values 515, 516.

An identical low-pass filtration 512 is performed for the input variable 502, namely, $\dot{\beta}$. The filtered value 517 is sent, just as the unfiltered value 503, to nonlinear filters 523,524. These filters 523,524 have the task of setting the output value to 0 for low input values and of transmitting an input value reduced by the limit value for input values that are above a certain limit value.

The limitation is performed in the negative and positive ranges alike. The limit values $\beta_{th}$ and $\beta_{th}$ may be fixed values implemented in the program, but they may also be variables that depend on other parameters, e.g., the coefficient of friction between the tires and the road surface. The limit values are calculated separately as a linear function of the coefficient of friction in this case.

All four variables, namely, 515, 516, 518 and 519, are weighted with a linear factor each in a next step 530, 531, 532 and 533, respectively.

These factors are implemented as fixed values in the calculation system. They can be calculated, in terms of their order of magnitude, from corresponding vehicle models, but they need, in general, a fine adjustment by driving tests. A corresponding set of linear factors is thus set for each vehicle or for each model of vehicle. The input variables 500, 501, 502, 503 thus weighted are added up, and (addition member 540) the additional yawing moment $M_G$ is obtained, which is used as the basis for the further calculation process of the program.

However, it was found in practice that modifications of the calculated yawing moment are still necessary.

Two hypotheses can be made for this:

1. The input variables, especially $\Delta\dot{\Psi}$, are modified.
2. The calculated yawing moment $M_G$ is subjected to filtration.

Attempts are made with both statements to perform the control not only in consideration of the yaw rate, but also in consideration of the side slip angle.

2.4.1. Modification of the Input Variables

As was explained, a desired value is calculated for the yaw rate by means of a vehicle reference model. Since the vehicle reference model cannot completely agree with the actual conditions, it is usually necessary to correct the result of the model calculation once again. The values which are provided by a yaw rate sensor, as well as a steering angle sensor, are essentially evaluated in the reference model. Correction of the calculated desired yaw rate can be performed by additionally taking into account the values provided by a lateral acceleration sensor.

The evaluation may be performed in various manners. One way is proposed below, according to which the measured lateral acceleration is first converted into a velocity of the side slip angle $\dot{\beta}$. A correction of the desired value for the yaw rate is performed with this value.

The calculation of $\dot{\beta}$ is performed, e.g., by the kinematic determination of $\dot{\beta}$ 14, 15 (FIG. 2).

Figure 21:
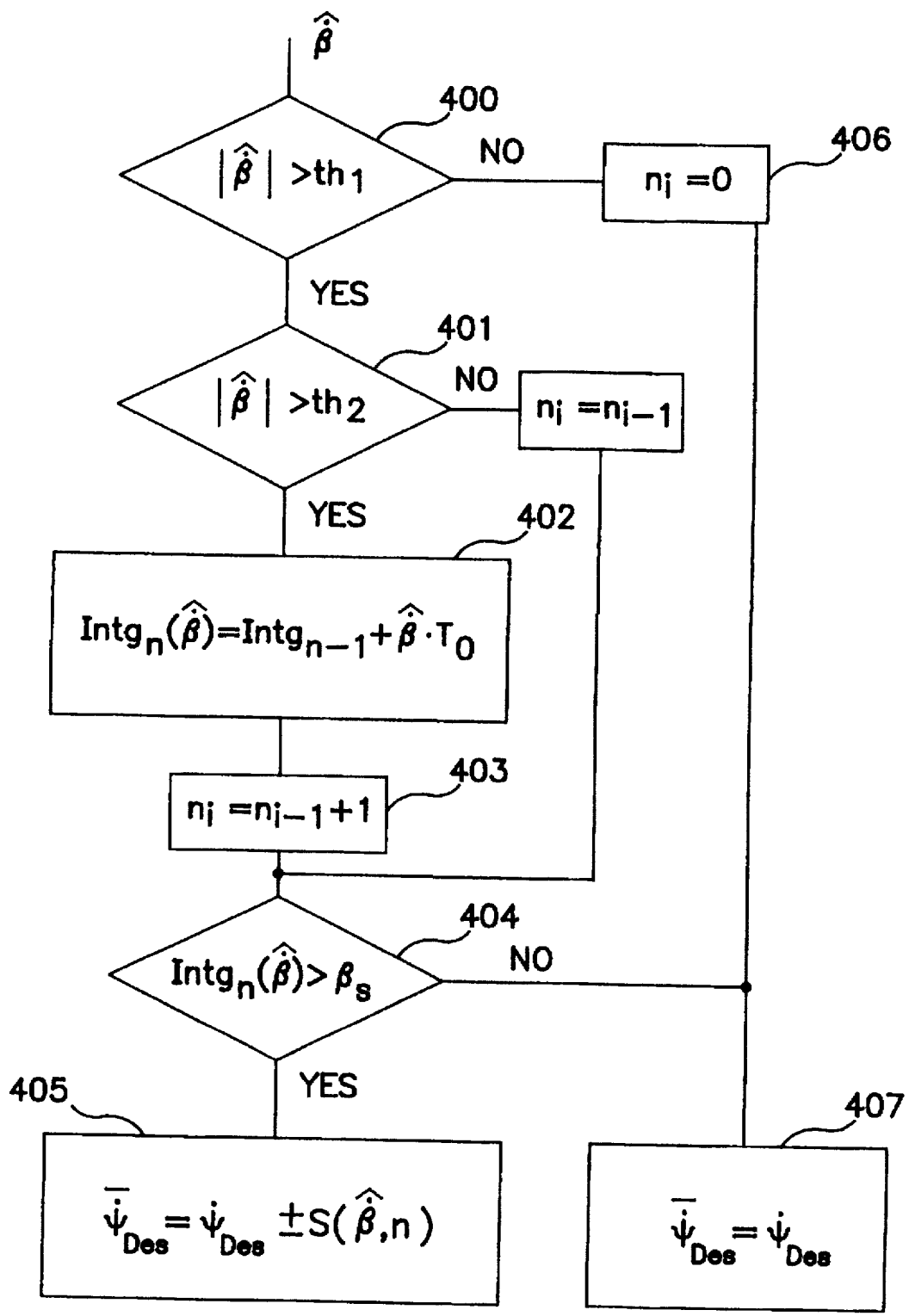
FIG. 21 shows a flow chart for calculating a corrected desired yaw rate.

The procedure is carried out according to the scheme shown in FIG. 21. The estimated value of the velocity of the side slip angle $\dot{\beta}$ is compared with a first threshold value $th_1$ (block 400), if desired, after a low-pass filtration. The meaning of this comparison will appear only after a correction of the desired value of the yaw rate $\dot{\Psi}_{Desired}$, and it is therefore explained in greater detail below.

If $|\dot{\beta}|>th_1$, the value of $\dot{\beta}$ is compared with a second threshold value $th_2$ (block 401), and the second threshold value is higher than the first threshold value $th_1$. If this threshold value is also exceeded, integration 402 of the velocity of the side slip angle $\dot{\beta}$ over time is first performed.

To do so, the velocity of the side slip angle $\dot{\beta}$ is multiplied by the loop time $T_0$ and added to the previous integration result $Intg_{i-1}$. The integration steps are counted with n, so that the number n is increased by 1 after the integration (step 403). The integration time is thus represented by the number n of integration steps performed. The integration result Intg n $\dot{\beta}$ is compared with a threshold value $\beta_s$ (block 404). The amount of the threshold value represents a maximum allowable deviation from a side slip angle that is theoretically to be maintained. The threshold value $\beta_s$ is on the order of magnitude of approx. 5°.

If this threshold value is exceeded, the desired yaw rate $\dot{\Psi}_{Desired}$ is newly evaluated by an additive constant S (step 405), which depends on the instantaneous velocity of the side slip angle $\dot{\beta}$ and the number n of integration steps. This means that the desired yaw rate is further reduced with each new loop in which the threshold value $\beta_s$ is exceeded. The additive constant S is either added or subtracted, depending on the sign of $\dot{\Psi}_{Desired}$, so that the value of the desired yaw rate is reduced at any rate. If $Intg_n$ does not reach the threshold value $\beta_s$, $\dot{\Psi}$ is not limited (step 407).

The estimated velocity of the side slip angle is checked again in a repeated loop to determine whether its value is lower than the threshold $th_1$. If so, this is interpreted as meaning that the vehicle has again stabilized. The consequence of this is that n in step 406 is again set at 0 and that the further calculation in step 407 is based on a desired yaw rate that is not corrected, i.e., it is identical to the value obtained as the result of the vehicle reference model. In addition, the start value $Intg_{n-1}$ of the integration is set to equal zero.

If the value of a velocity of the side slip angle exceeds $th_1$, but not $th_2$, the old value $Intg_n$ remains unchanged, i.e., the integration is omitted for one loop. The previous limitation is preserved. Should the threshold value $th_2$ be exceeded again, the integration is continued.

2.4.2. Correction of $M_G$

Another possibility is to manipulate the yawing moment $M_G$, which is calculated by the control law unit 16. To do so, the difference between the previous value $M_1(k-1)$ and the current value $M_1(k)$ is formed. The subscript 1 indicates that these values are the direct result of the yawing moment controller, i.e., they were not yet calculated on the basis of the next correction. This difference is related to the loop time $T_0$ and yields $\Delta M_1$. A correction gradient which is obtained from $\dot{\beta}$ multiplied by a correction factor, is added to this gradient $\Delta M_1$. The gradient thus corrected is multiplied by the loop time $T_0$ and is added to the yawing moment $M(k-1)$ of the preceding calculation. This leads to the current moment $M_G(k)$, which is used as the basis for the further calculation.

Figure 22:
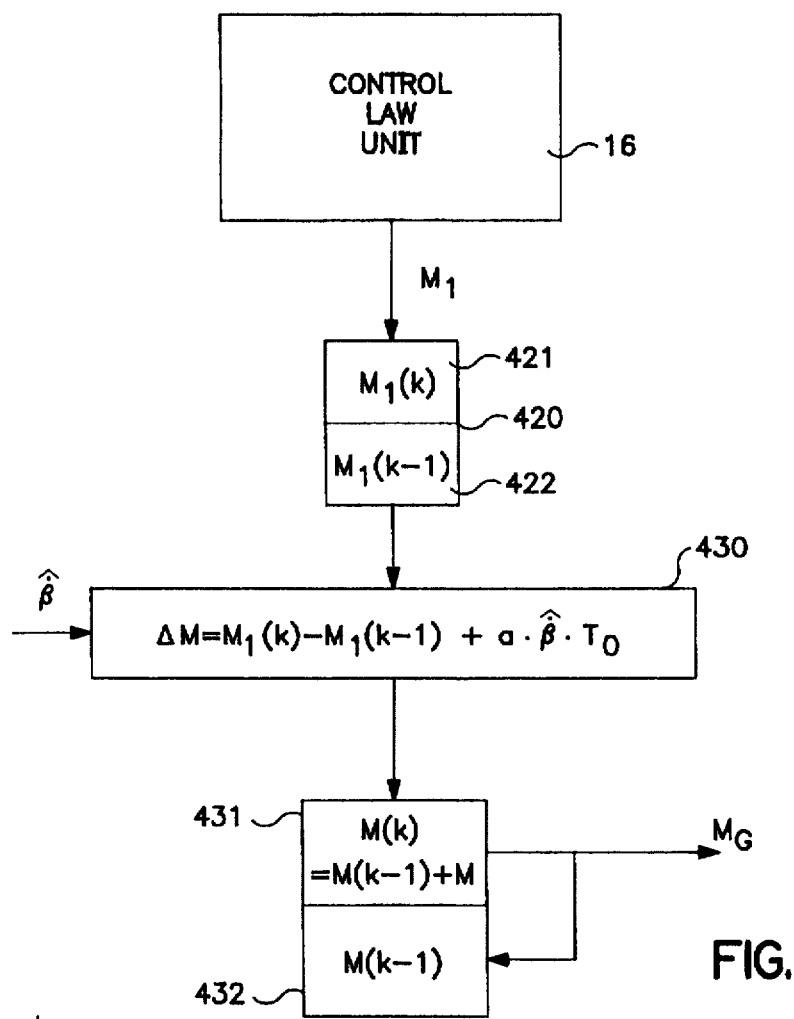
FIG. 22 shows a block diagram for calculating a corrected additional yawing moment.

This calculation is performed by a logic unit as is shown in FIG. 22. The calculated moments, which are obtained from the "control law unit 16" subprogram, are sent into a shift register 420. The current value $M_1(k)$ always stands in the first place 421 of the shift register 420; the previous value $M_1(k-1)$ stands in the second place 422 of the shift register 420. As soon as a new value $M_1$ is available, the value is shifted from register 421 into register 422, and the value in register 421 is replaced with the new value. The values in the registers 421 and 422 are sent to a calculation logic unit 430, which calculates a $\Delta M$ according to the following formula:

$$\Delta M = M_1(k) - M_1(k-1) + a*\beta*T_0 \qquad \text{F 2.28}$$

In addition, the estimated velocity of the side slip angle $\dot{\beta}$ is sent to the calculation logic unit 430 for this from the kinematic determination of $\beta$. Furthermore, a value for a correction factor a, with which the velocity of the side slip angle is converted into a change in moment, is set in a memory. The new moment M(k) is calculated according to the formula $$M(k) = M(k-1) + \Delta M \qquad \text{F 2.29}$$

The current value of the corrected moment is stored in register 431, and the value from the previous calculation is stored in register 432. The value in register 431 is used as the basis for the further calculation.

3. Distribution Logic Unit 3.1. Additional Yawing Moment by the Application of Brake Forces To achieve stable travel of the vehicle even in a curve, it is first necessary to determine the steering angle. The steering angle represents the curved path of the vehicle desired by the driver. In the case of stable, stationary travel in a curve, the vehicle shall travel through the curve at an approximately constant side slip angle and constant yaw rate. Deviations from this side slip angle or from this yaw rate must be compensated by the driver by steering in the opposite direction. However, this is not always possible when the driver travels through the curve at the limit velocity for the curve. It is necessary in such situations to specifically brake the vehicle and to apply additional moments around the vertical axis to the vehicle, which are to bring about an adjustment of the actual yaw rate to the desired yaw rate.

Calculation algorithms which describe this were described before, so that they do not need to be explained in greater detail here.

However, there remains the problem that an additional yawing moment $M_G$ calculated by the calculation algorithm must be put into practice in an appropriate manner by specifically applying brake forces.

In the case of hydraulic brakes, the task is therefore practically to set a brake pressure for every individual wheel brake. The moment to be obtained around the vertical axis shall be obtained with the lowest possible pressures in the individual brakes. It is therefore proposed that a coefficient be determined for each wheel and that the brake pressures be calculated from the vehicle yawing moment to be generated and the actual weighted coefficient.

As was explained above, it is favorable, especially in vehicle brake systems operating hydraulically, to determine the coefficients such that the brake pressure for the individual wheel brakes can be directly determined. The weighting of the coefficients is performed by dividing every individual coefficient by the sum of the squares of all coefficients.

Each coefficient determines the relationship between the wheel brake pressure and the individual wheel brake forces thus generated as a percentage of the yawing moment of the vehicle.

Parameters which change during the travel of a vehicle are included as variables in the determination of the individual coefficients. They are, in particular, the steering angle $\delta$, the coefficient of friction $\mu$ between the tire and the road surface, the vehicle mass m, and the axle load distribution $N_z$.

Variables which are included in the calculation of the coefficients and are vehicle-specific or brake-specific are, e.g., the following, for a disk brake system:

the area A of the brake pistons, the number n of pistons per wheel brake, the coefficient of friction $\mu_r$ between the disk and the brake lining, the ratio s of the effective friction radius to the dynamic tire radius, and the efficiency $\eta$ of the brake.

The method of calculation proposed has the advantage that the corresponding brake pressures can be calculated very rapidly from a predetermined additional yawing moment. Should the above-described parameters change during travel, this is taken into account via a change in the coefficients in the calculation of the brake pressure.

While some influencing variable are used linearly in the calculation of the coefficients, especially the dependence of the coefficients on the steering angle $\delta$ is nonlinear.

However, it was found that a linearized estimation of the dependence between the individual coefficients and the steering angle yields sufficiently good results.

Figure 23:
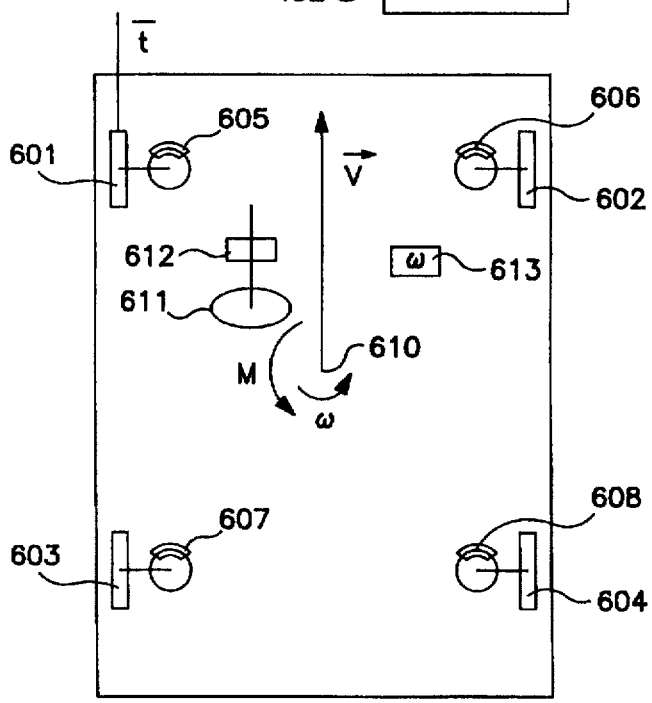
FIG. 23 shows a schematic representation of a motor vehicle.

FIG. 23 schematically shows a vehicle during straight travel with four wheels 601, 602, 603, 604. A wheel brake 605, 606, 607, 608 is associated with each of the wheels. These can be actuated independently from one another, and brake forces are generated by the wheel braking moments exerted by the wheel brakes on the contact surfaces of the tires on the road surface. For example, a braking force F, which in turn generates a moment M (positive in the example) around the vertical axis, is generated on wheel 601 when the wheel brake 605 is actuated.

Such moments around the vertical axis of the vehicle can be used specifically to keep a vehicle stable on a path desired by the driver.

Furthermore, sensors are present in the vehicle. They include wheel sensors, which detect the angular velocity of the wheels 601, 602, 603, 604. In addition, the steering wheel angle is detected with a steering sensor 612. In addition, a sensor 613 for the yaw rate is provided.

A yawing moment, which, when applied, is able to make the yaw rate of the driver as well as its side slip angle agree with the driver's desire, can be calculated with these sensors, which detect the driver's desire, on the one hand, and the behavior of the vehicle, on the other hand. The wheel brakes 605, 606, 607, 608 are actuated for this purpose, with a control device, which is part of a complex program for controlling the driving stability, being provided with this purpose.

Figure 24:
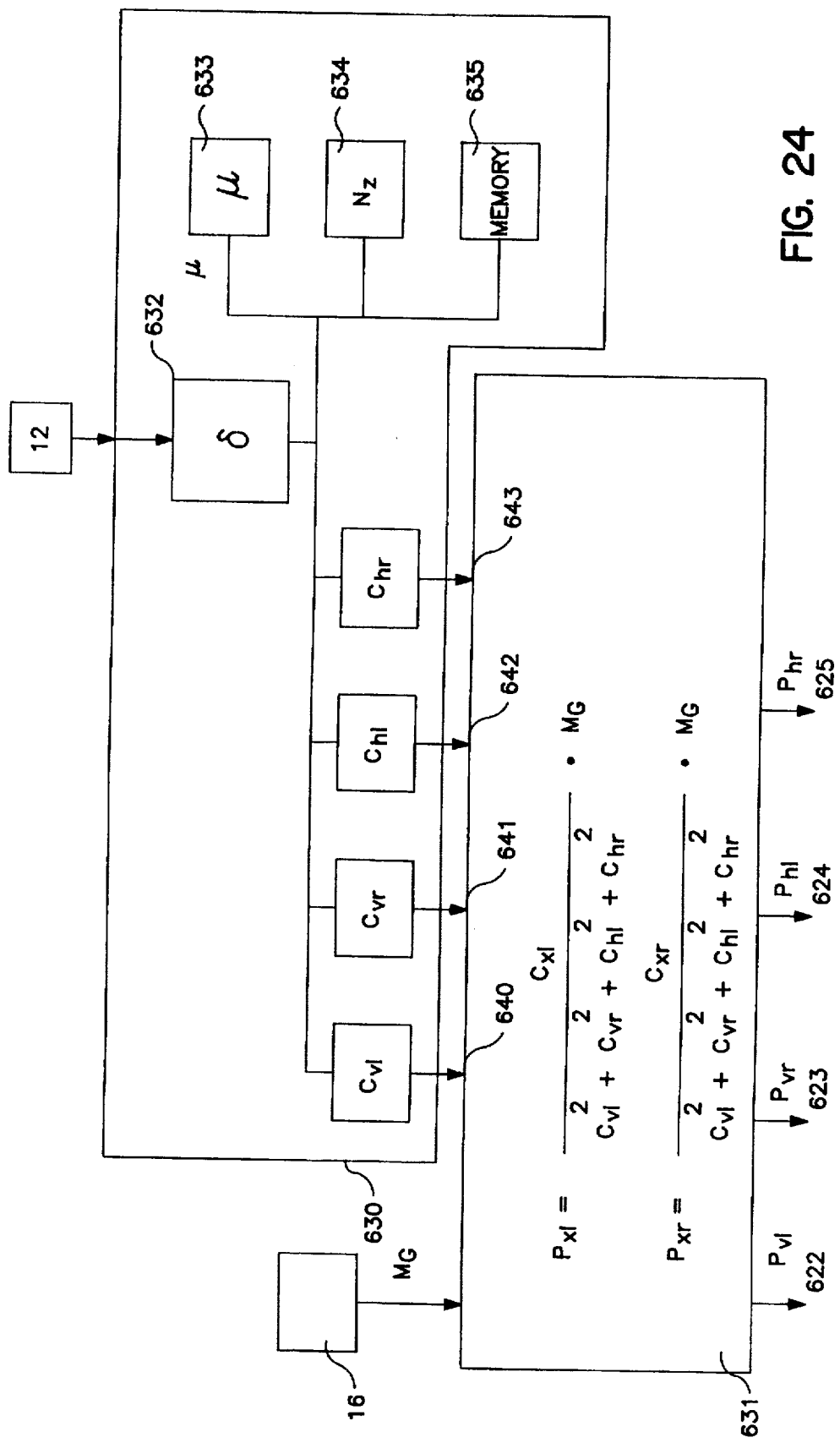
FIG. 24 shows a block diagram for describing the distribution logic unit.

The general situation is shown in FIG. 24. A program module, which calculates the yawing moment $M_G$, is designated by 16. FIG. 24 shows a control device, which calculates the pressures $p_{xx}$ that are to be introduced into the individual wheel brakes 605, 606, 607, 608. The pressure values 622, 623, 624, 625 determined can be subjected to further evaluation and can be converted into corresponding control signals for the wheel brakes 605, 606, 607, 608.

The control device itself consists of two parts, namely, a first part 630, in which coefficients $c_{xx}$ for the individual wheels are calculated. The coefficients $c_{xx}$ establish a linear relationship between the pressure in the wheel brake and the proportionate yawing moment, which is brought about by the brake force on the corresponding wheel. The individual pressure values $p_{xx}$ 622, 623, 624, 625 are calculated in the second part 631 by weighting the individual coefficients and taking into account the yawing moment $M_G$ to be applied.

The pressure values as well as the coefficients are designated with subscripts:

| | |
|---|---|
| v: front | h: rear |
| l: left | r: right |
| x: either v/l or h/r | |

The first calculation part 630 takes into account the steering angle, which is made available to the calculation process via an evaluation 632 of the steering sensor 612. To calculate the coefficient, the coefficient of friction μ, which is derived from the wheel rotation behavior in an evaluation unit 633 (cf. Section 2.1.), is taken into account. The wheel rotation behavior is in turn determined by a signal of the wheel sensors at the individual wheels. The mass of the vehicle as well as the load distribution $N_z$, which are determined in an evaluation unit 634, in which the behavior of the vehicle is analyzed in different situations, are included as well. The first program part 630 has access to a memory 635, which contains the above-mentioned vehicle-specific and wheel brake-specific values.

A coefficient $c_{xx}$ is calculated from the above-mentioned values for each wheel; the values 640, 641, 642, 643 may be calculated simultaneously or consecutively. The calculation is performed according to a function implemented in the program. The known relationships between the brake pressure and the brake force are taken into account in this function. The relationship is usually linear. Only the steering angle δ must be taken into account separately. How the steering angle can be taken into account in a suitable manner will be described below.

The pressure values for the individual wheel brakes are determined in the second calculation step 631 either simultaneously or consecutively from the individual coefficients 640, 641, 642, 643 according to the following formula:

$$p_{vl} = \frac{c_{vl}}{c_{vl}^2 + c_{vr}^2 + c_{hl}^2 + c_{hr}^2} * M_G \qquad \text{F 3.1a}$$

$$p_{xr} = -\frac{c_{xr}}{c_{vl}^2 + c_{vr}^2 + c_{hl}^2 + c_{hr}^2} * M_G \qquad \text{F 3.1b}$$

Calculating the individual pressures according to this formula offers the advantage that only relatively low pressures must be introduced into the wheel brakes to reach the calculated braking moment. Furthermore, the brake pressure control is able to respond very sensitively and rapidly to changes especially in the steering angle and in the coefficients of friction.

Figure 25:
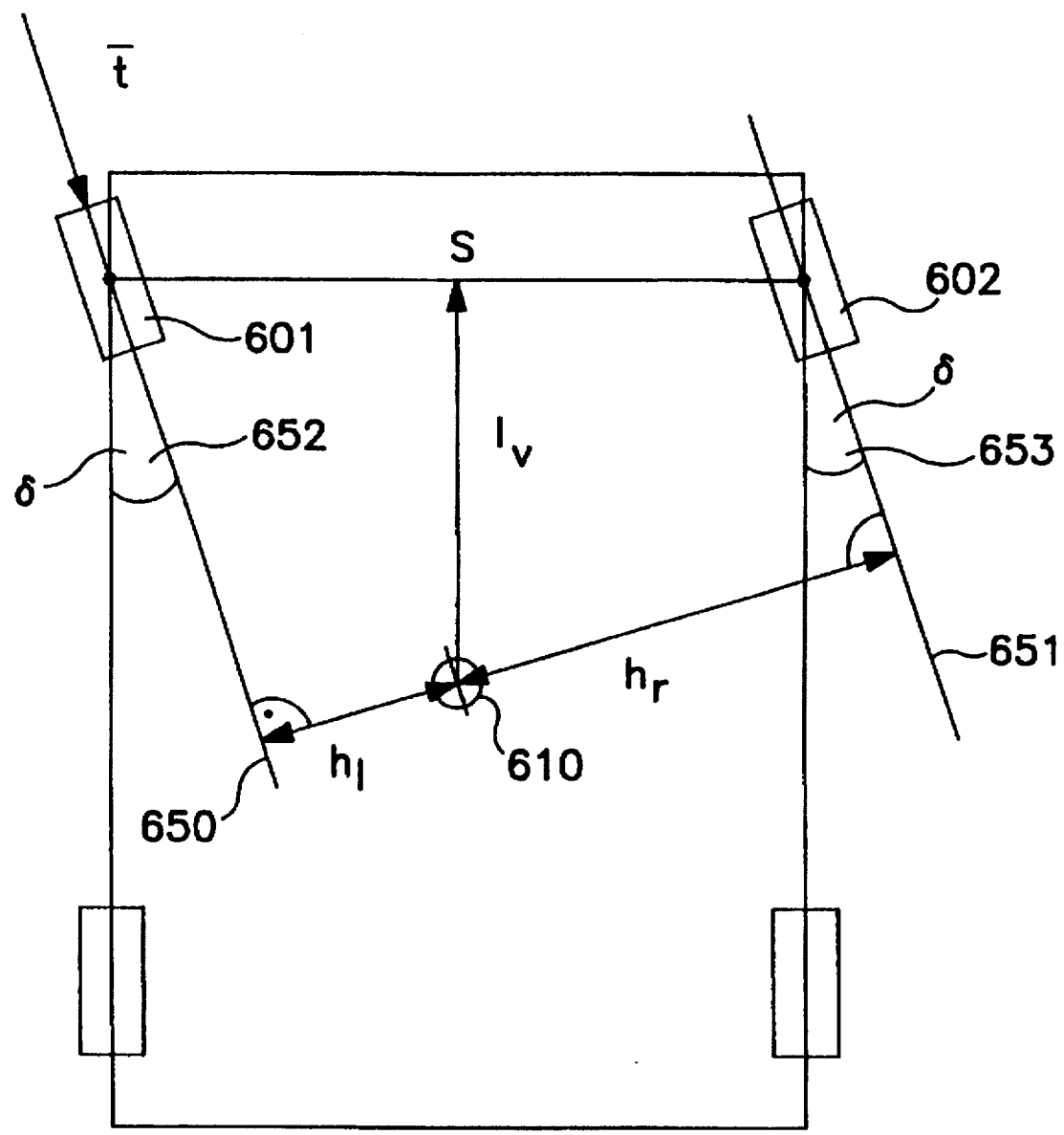
FIG. 25 shows a schematic representation of a motor vehicle and the forces acting on it with the steering wheel turned.

The steering angle δ is taken into account in the calculation of the coefficients as follows: FIG. 25 shows for this a schematic representation of a vehicle, in which the front wheels 601 and 602 are shown turned in. The distance between the front wheels is designated by S, and the distance between the center of gravity 610 and the front axle is designated by $l_v$.

The wheel planes 650, 651 form steering angles 652, 653 with the longitudinal axis of the vehicle. The steering angles δ 652, 653 are assumed to be equal for simplicity's sake. The effective lever arm $h_l$ or $h_r$ relative to the brake force F, which acts in the wheel plane 650, 651, is calculated from approximation considerations for small steering angles as follows.

$$h_r = s/2 + \delta * l_v \qquad \text{F 3.2a}$$

$$h_l = s/2 - \delta * l_v \qquad \text{F 3.2b}$$

Since the "small steering angle" approximation is not always satisfied, it was found to be favorable to calculate possibly with the following formula.

$$h_r = \frac{s}{2} + \delta * \sqrt{\frac{s^2}{4} + l_v^2} \qquad \text{F 3.3a}$$

$$h_l = \frac{s}{2} - \delta * \sqrt{\frac{s^2}{4} + l_v^2} \qquad \text{F 3.3b}$$

Should the calculated lever arms become smaller than zero, they are set equal to zero.

The wheel coefficients $c_{xx}$ can be calculated as follows:

$$c_{xx} = c_{hydxx} * h_{l,r} \qquad \text{F 3.4}$$

where $c_{hydxx} = \mu \cdot m \cdot N_z \cdot A \cdot n \cdot \mu_r \cdot S \cdot \eta$ (see definitions above) in which all parameters except for the steering angle δ are taken into account in $c_{hydxx}$.

The coefficients can thus be represented as the product of two terms, in which one term determines the effective lever arm, and the other term is independent from the steering angle.

3.2. Additional Yawing Moment by Reducing Lateral Forces

One method of applying brake forces acting on one side is to actuate the wheel brakes such that the wheels will be braked with different intensity. One procedure that brings this about was described in the preceding section.

This procedure reaches a limit when a driving stability control is to be performed during pedal braking, i.e., when a certain brake pressure has already been set in the wheel brakes because of braking by the driver. The above-described procedure can be applied, in principle, to this case as well. Instead of absolute pressures, changes in the brake pressures already set are determined.

However, the following problems arise. If a very high pressure has already been introduced into a wheel brake, so that very high brake forces are reached, an increase in the brake pressure would not necessarily lead to an increase in the brake force, because the limit of adhesion between the tire and the road surface has been reached. The linear relationship between the brake pressure and the brake force, which was assumed in the above-mentioned model, is no longer present in this case.

The limit of the brake force on one side of the vehicle, which is not to be exceeded, can be compensated in terms of a yawing moment control by reducing the braking force on the other side of the vehicle.

However, this has the disadvantage that the deceleration of the vehicle is also reduced with the reduction in the brake force. This is not always acceptable, because the vehicle is to be stopped over the shortest possible distance when a braking process is initiated by the driver. An excessive reduction in the actual deceleration of the vehicle compared with the driver's desire cannot therefore generally be accepted. The following approach is taken to solve this problem.

The wheel brakes of at least one wheel are actuated such that the longitudinal slip 2 of the wheel is set such that it is greater than the longitudinal slip at which the maximum frictional connection is reached. This procedure is based on the fact that the brake force transmitted, i.e., the longitudinal force on the tire, reaches its maximum at a longitudinal slip of approx. 20% (0%=freely rolling wheel; 100%=locked wheel), and the brake force that can be transmitted decreases only slightly at values above 20%, so that there is no appreciable loss during the deceleration of the vehicle at wheel slips between 20% and 100%.

However, if the lateral force that can be transmitted, i.e., the force that acts at right angles to the wheel plane, is also taken into account at the same time, a strong dependence on wheel slip is seen, which is manifested in that the lateral force that can be transmitted greatly decreases with increasing slip. In the slip range above 50%, the wheel exhibits a behavior similar to that of a locked wheel, i.e., hardly any lateral forces are applied.

Controlled skidding of the vehicle can be provoked by judiciously selecting the wheels on which a high longitudinal slip is set, and the change in the yaw angle brought about by the skidding shall correspond to the desired change. Since the longitudinal forces are essentially preserved in this procedure, but the lateral forces are markedly reduced, the yaw rate can be controlled without excessively reducing the deceleration of the vehicle.

The wheel that is driven, at least briefly, with an increased longitudinal slip is selected according to the following rules. Let us examine travel in a curve to the right, which is intended by the driver. Corresponding "mirror-image" rules apply to traveling in a curve to the left. The case may occur in which the vehicle will not turn into the curve as sharply as expected. In other words, the vehicle is understeered. The rear wheel that is the inner wheel in the curve is operated with increased slip values in this case.

However, if the vehicle turns too sharply into the curve— this case is called oversteering—the front wheel that is the outer wheel in the curve is operated with high slip values.

In addition, the pressure can be prevented from decreasing on one front wheel. This is done according to the following rules. In a driving situation in which the vehicle exhibits understeering behavior, the brake pressure is prevented from decreasing on the front wheel that is the outer wheel in the curve. The pressure is prevented from decreasing on the front wheel that is the inner wheel in the curve in a situation in which the vehicle exhibits oversteering behavior.

The actual control of the brake pressure may be performed as follows. As was explained before, the brake pressure in the individual wheel brakes is determined individually as a function of the yawing moment to be reached and the weighted wheel coefficients.

A factor which is independent from the brake slip can be introduced in the calculation of the coefficients; this factor is adjusted such that the above-described desired brake slip will become established. The reduction in pressure on a wheel can be limited by setting a lower threshold for the corresponding coefficient.

The procedure implemented in the control program of the brake system will be explained in greater detail below.

Based on weighted coefficients, the control program calculates the brake pressure that must be produced in every individual wheel brake. The calculation becomes more problematic when the vehicle is braked, especially when it is being decelerated while utilizing the limit of frictional connection between the tire and the road surface. It is quite possible in such cases that an anti-locking control will first begin before a superimposed driving stability control becomes necessary.

The basic considerations for an unbraked vehicle cannot be taken over in such cases, because, e.g., the corresponding brake force does not increase linearly upon the increase in pressure in a wheel brake, since the limit of frictional connection has been reached. An increase in the pressure in this wheel brake would not consequently produce any additional brake force and consequently any additional moment.

Even though the same effect of generating an additional yawing moment can be produced by reducing the wheel brake pressure of the other wheel of the axle, this would cause, on the whole, a reduction in the braking force, which in turn conflicts with the requirement that the vehicle is to be stopped over the shortest possible distance.

Figure 26:
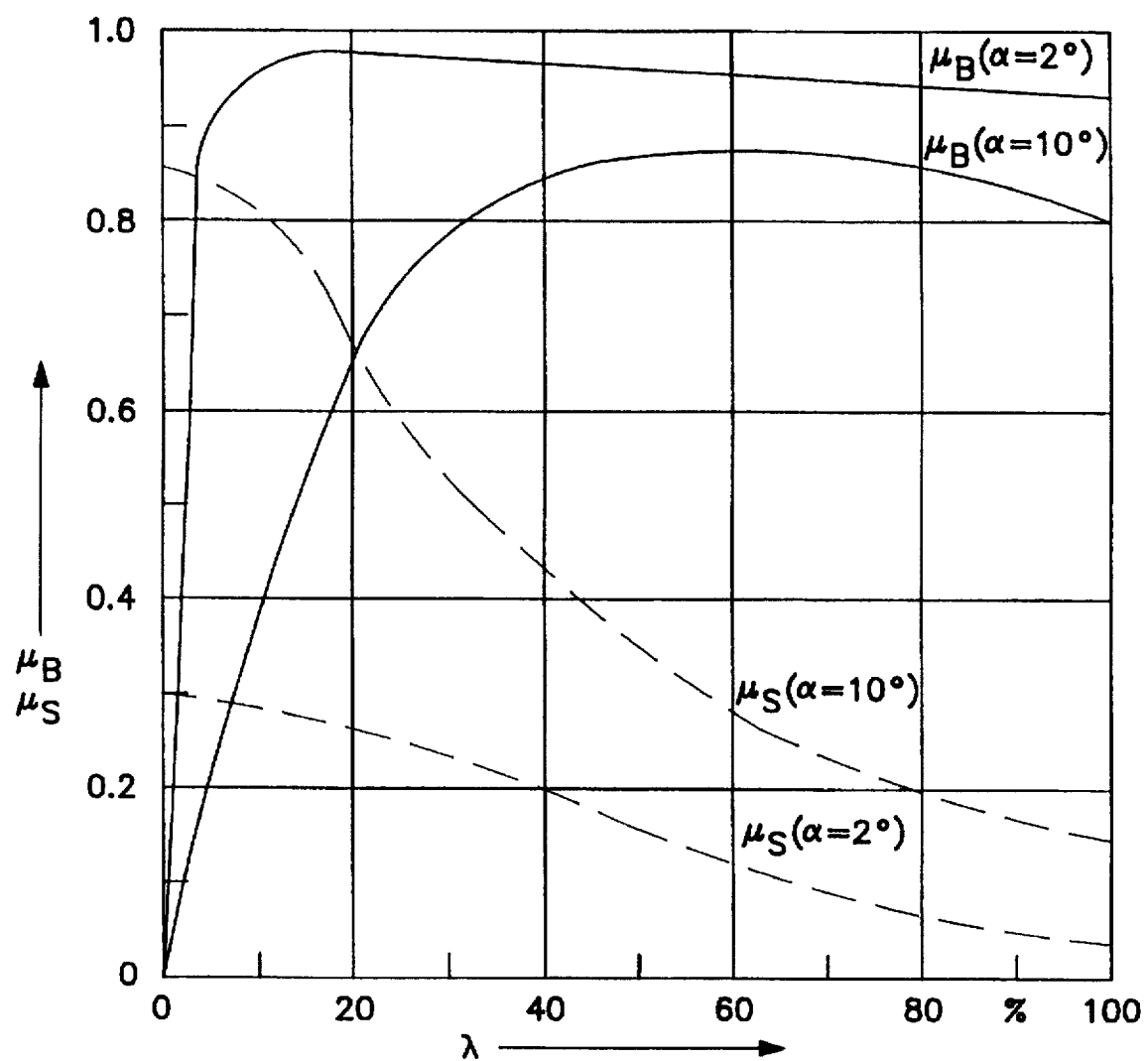
FIG. 26 shows a diagram for describing the lateral and longitudinal force coefficients as a function of the wheel slip, FIGS. 27A, B show schematic representations of motor vehicles for describing the understeering and oversteering behaviors.

The behavior of vehicle wheels shown in FIG. 26 is therefore utilized. This diagram shows slip values λ between 0% and 100% on the X axis, where 0% indicates a freely rolling wheel and 100% a locked wheel. The Y axis shows the frictional force and lateral force values $\mu_B$ and $\mu_r$, respectively, in the range of 0 to 1. The solid lines show the dependence of the coefficient of friction on slip for different king pin inclinations. It is seen, especially in the case of small king pin inclinations, that the curve has a maximum in the slip range of λ=20%. The coefficient of friction slightly decreases toward 100%. The maximum coefficient of friction equals approx. 0.98 for a king pin inclination of 2°, while it is still 0.93 at λ=100%. However, an examination of the values of the lateral force shows an extreme reduction over the slip range, especially for great king pin inclinations. The value of the lateral force for a slip value of 0% is 0.85 at a king pin inclination of 10, to drop to 0.17 for slip values of almost 100%.

Thus, it can be determined from the curves in FIG. 26 that relatively strong brake forces, but weak lateral forces can be transmitted at slip values in the range of 40% to 80%.

This behavior of the wheel can be utilized to specifically reduce the lateral force of a given wheel of the vehicle. The wheel is selected according to the following scheme, which will be explained in greater detail on the basis of FIGS. 27a and 27b.

Figure 27A:
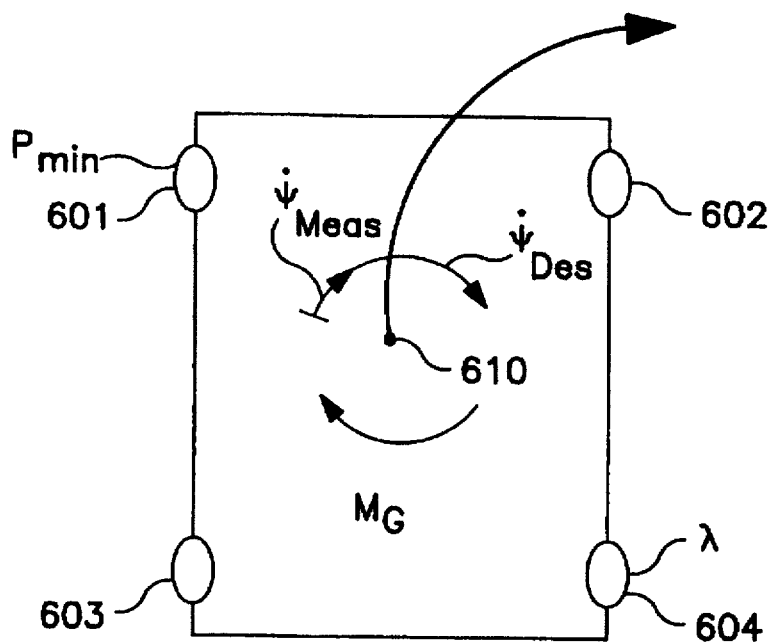

FIGS. 27a, b show a schematic representation of a vehicle in a right curve. Corresponding to the radius of the curve and the velocity of the vehicle, the vehicle must turn around its vertical axis, i.e., there must be a defined clockwise yaw rate.

As was explained above, the vehicle has a yaw angle sensor. If the measured yaw rate $\Psi_{Meas}$ deviates from the $\Psi_{Desired}$ to be reached, an additional moment $M_G$ around the vertical axis of the vehicle must be applied.

If the measured yaw rate deviates from the yaw rate to be reached to such an extent that the vehicle does not turn sufficiently, a so-called understeering behavior is present. An additional moment, which is counted as negative in this situation, must be applied. It shall cause the vehicle to turn into the curve. This could be achieved in this case by increasing the brake pressure in the right-hand wheels of the vehicle.

However, if the vehicle is already being braked by the driver, it may be possible that these wheels already transmit maximum brake force. If this is determined by an electronic evaluation unit, the pressure in the right rear wheel brake is increased such that the wheel runs at slip values in the range of 40% to 80%. Wheel 604 is therefore marked with a "λ." As was explained above, this leads to a considerable reduction in the lateral force. Consequently, only weak lateral forces are built up on the right rear wheel, as a consequence of which the vehicle swings out with its tail to the left, i.e., a clockwise turning begins. The minimization of the lateral force is maintained until the actual yaw rate $\Psi_{Meas}$ corresponds to the desired $\Psi_{Desired}$ of the vehicle.

Figure 27B:
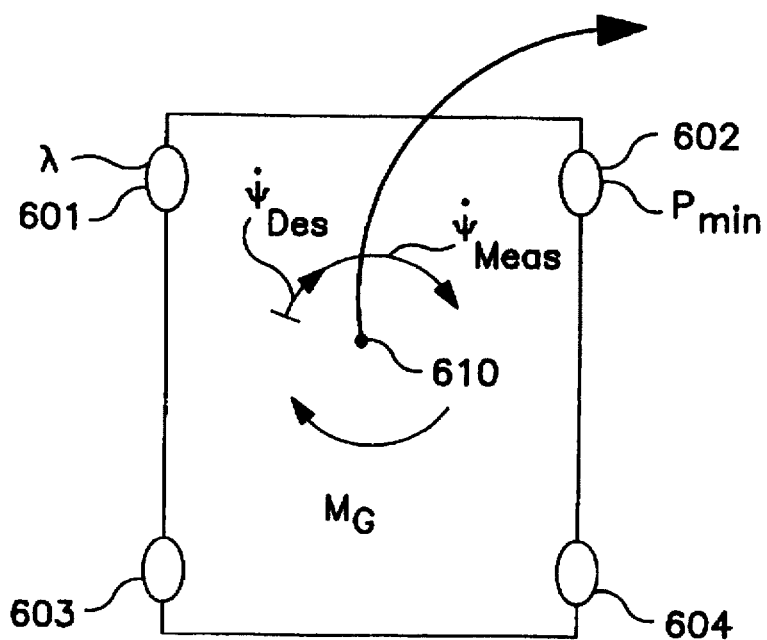

FIG. 27b shows the situation of an oversteering vehicle. The vehicle turns around the vertical axis faster than it would correspond to a calculated desired yaw rate. It is proposed that the lateral force on the front left wheel 601 be reduced in this case. This is also done by introducing slip values between 40% and 80% on this wheel. Wheel 601 is therefore marked with a "λ."

A subprogram that brings about a further reduction in pressure on the front wheel 601 (that is, the outer wheel in the curve for the case of understeering (FIG. 27a)) or on the front wheel 602 (that is, the inner wheel in the curve for the case of oversteering (FIG. 27b)) can be inserted in the control program for both cases. These wheels are marked with "$P_{min}$." The corresponding actuations are laterally reversed for travel in a curve to the left.

The pressure in the individual wheels can be controlled by determining a coefficient, which describes the relationship between the change in pressure and the calculated additional yawing moment $M_G$, for every individual wheel.

These coefficients are a function of parameters that describe the vehicle or the wheel brakes, and of variables which change during travel. These are especially the steering angle δ and the coefficient of friction μ for the road/tire pairing (cf. Section 3.1.). A dependence on the longitudinal slip of the corresponding wheel is now additionally introduced for the above-mentioned control. The pressure on individual wheels can be prevented from decreasing by defining lower limits for the coefficients, replacing the calculated value of the coefficients with the minimum if the actual value drops below the minimum.

Figure 28:
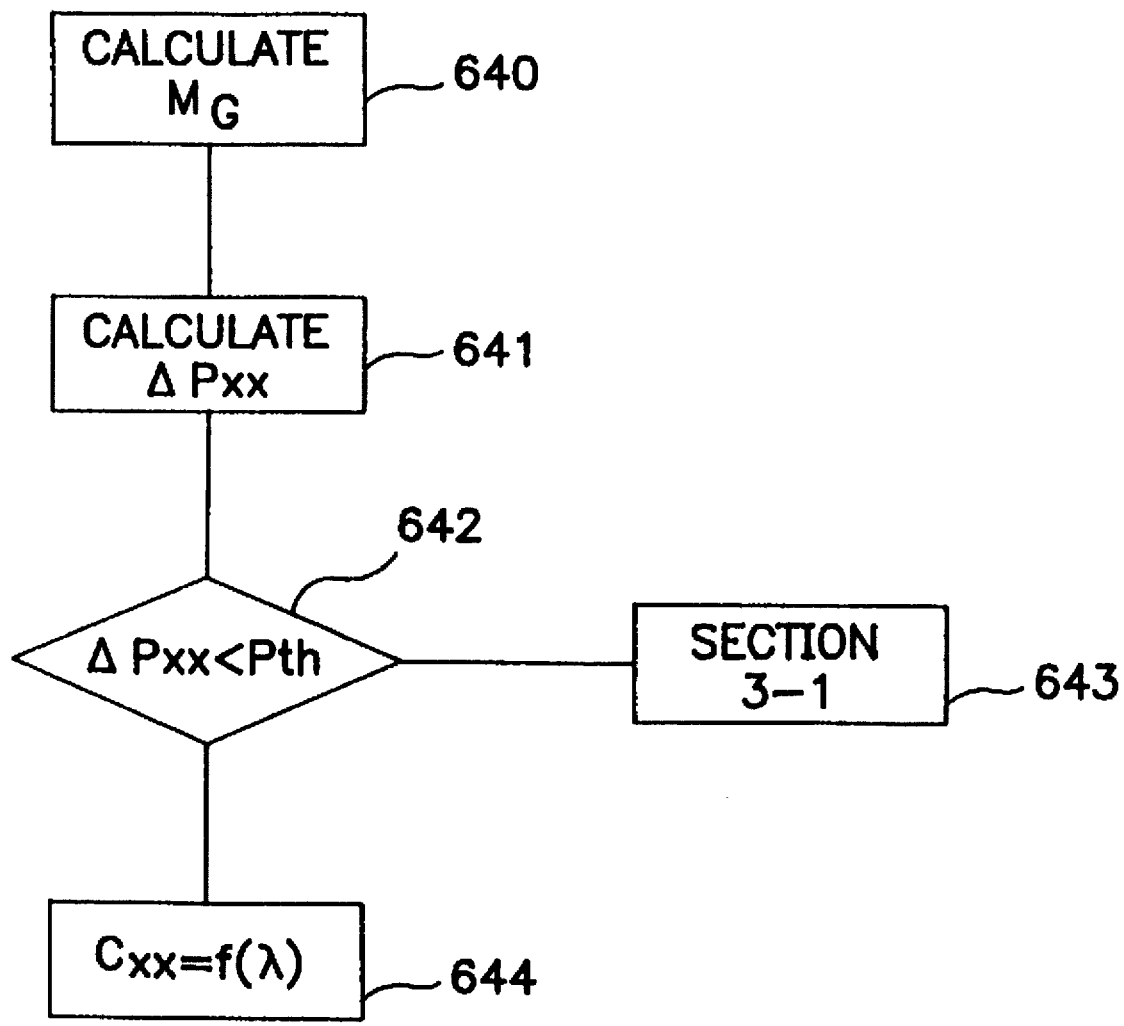
FIG. 28 shows a flow chart with a decision logic unit within the distribution logic unit.

A corresponding algorithm is shown in FIG. 28. The additional yawing moment $M_G$ is first calculated (program 640). The corresponding changes in the brake force and in the brake pressure are calculated from this moment for the individual wheels (program part 641). The brake pressures determined are compared with thresholds $p_{th}$, which are determined, among other things, by the road/tire coefficient of friction pairing (block 642). The thresholds $p_{th}$ determine whether a further increase in the wheel brake pressure with a simultaneous increase in brake force is possible. If the pressures to be introduced remain below these limit values, the control is performed according to the procedure mentioned in Section 3.1. If the calculated brake pressures are above these threshold values, the pressures are calculated according to the scheme 644 described above.

4. Priority Circuit

The pressures to be introduced into the wheel brakes are calculated from the additional yawing moment $M_G$ by means of a distribution logic unit (Section 3).

Based on these pressure values, control signals for inlet and outlet valves are sent by a subordinate pressure control circuit. The actual wheel brake pressures are harmonized with the calculated ones in this subordinate pressure control circuit.

If control signals of other controllers (ABS7, TSC8, EBV9) are to be included as well (Section 1), it is also necessary first to convert their control signals into pressure values by means of a hydraulic model of the wheel brakes stored in the computer.

The pressure requirements of the YMC controller 10 are then related to the pressure requirements of the ABS controller and other controllers. This is done in a priority circuit, which decides what requirements are to be prioritized, and whether averaged pressures are to be sent to the pressure control unit 5 for the wheel brakes. The pressure control unit 5 in turn converts the pressures into valve switching times.

Instead of desired pressures, desired changes in pressure may also be sent to the priority circuit (cf. Section 7).

In this case, the priority circuit 3 sends the changes in pressure Δp to its output according to the rule that the requirement to reduce the pressure on one of the wheels is preferentially satisfied, and the requirement to maintain the pressure in one wheel brake has priority over the requirements to increase the pressure. Thus, the individual requirements on the priority circuit are processed according to the rule that when there is a requirement to reduce the pressure, requirements to maintain the pressure or to increase pressure are ignored. In the same manner, no pressure is increased when maintenance of pressure is required.

5. Priority Circuit with Direct Comparison of Valve Switching Times

Another method can also be used as an alternative to this.

The distribution logic unit calculates valve switching times directly, like the other controllers as well, rather than pressures, from the additional $M_G$. The valve switching times of the YMC can thus be compared with the required valve switching times of the ABS. Unlike before, different valve switching times rather than different pressure requirements are then evaluated in the priority circuit.

To obtain valve switching times, the distribution logic unit first calculates changes in pressure to be set for each wheel brake.

Switching times for actuating the individual wheel brakes are calculated from the changes in pressure by means of a downstream, nonlinear control element.

This nonlinear control element may be, e.g., a counter.

This counter converts the preset changes in pressure into cycle counts. To do so, the loop time $T_0$ is divided into approx. 3 to 10 switching intervals (cycles). The maximum number of cycles per loop time is a fixed quantity, which is determined according to the quality of control to be reached.

How long a valve within a loop time is to be actuated is determined by the calculated cycle count.

Since there are, in general, two valves per wheel brake, with one valve (inlet valve) regulating the feed of the pressure medium to the wheel brake, and the other valve (outlet valve) regulating the release of the pressure medium from the wheel brake, a total of eight signals are to be generated.

These cycle counts are sent to the priority circuit, which receives the cycle counts of other controllers in additional channels.

The priority circuit decides which controller is to be given preference, i.e., which cycle count is taken over for the actual valve control.

The response of the vehicle to the brake forces generated by the actuation of the wheel brakes is a changed yaw rate. This is detected by the YMC controller 10, which will again determine a new additional yawing moment.

Consequently, brake pressures are not calculated or set at any point of the control circuit. Therefore, the control algorithms need no information on the wheel brake, and, in particular, no information on the relationship between the volume received by the wheel brakes and the resulting brake pressures.

Figure 29:
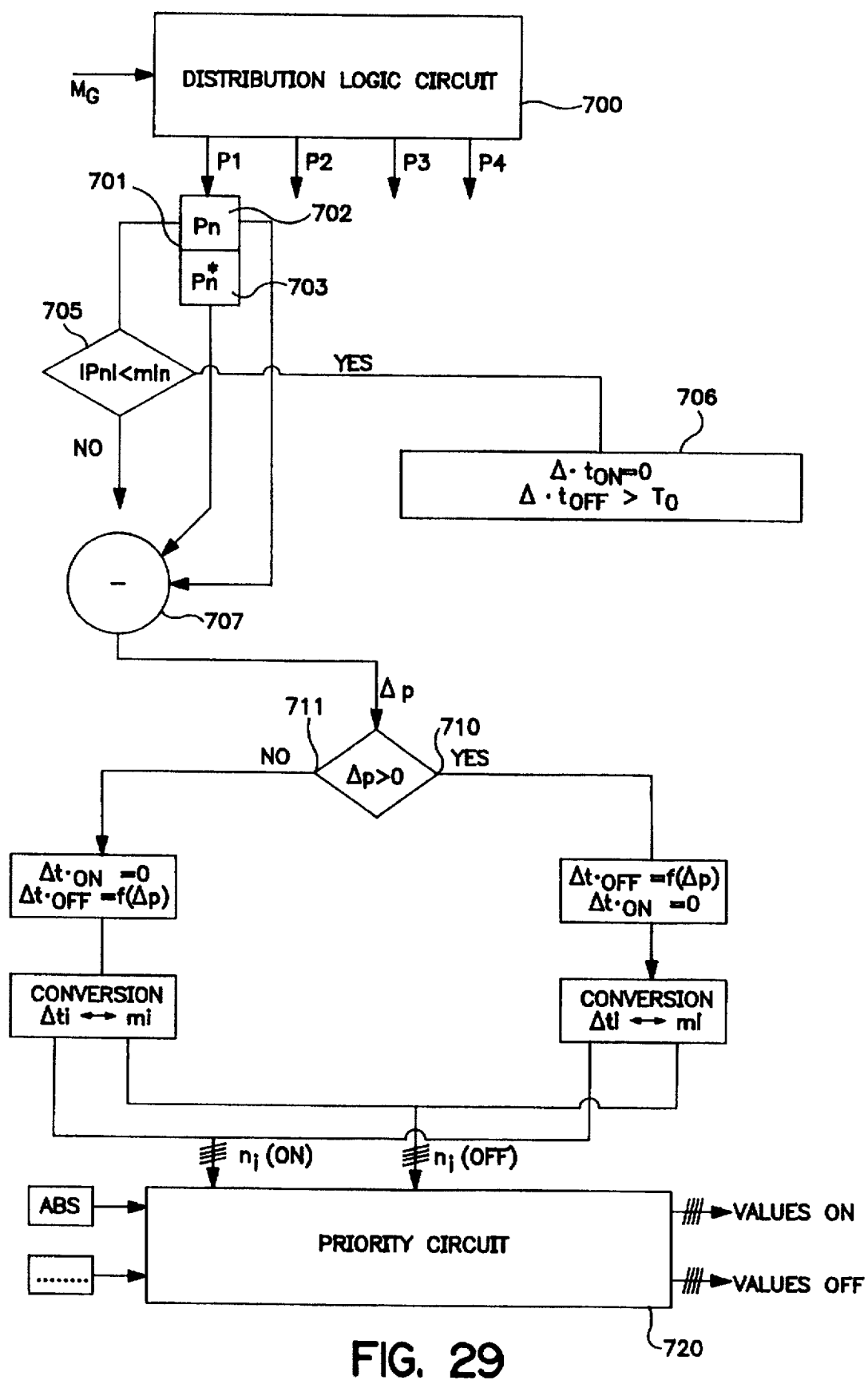
FIG. 29 shows a block diagram for calculating switching times for inlet and outlet valves.

One possibility of calculating the cycle times is explained on the basis of FIG. 29.

Brake pressures, which are to be built up in the individual wheel brakes, are calculated from the additional yawing moment $M_G$ via the distribution logic unit 700. Mow this is done can be found described in Sections 3.1. and 3.2. As a result of the calculation within the distribution logic unit, there are four pressure values $P_1$ through $P_4$ for a four-wheel vehicle. These variables must be converted into switching times for the valves, which control the feed of pressure medium (pressure build-up) and the release of the pressure medium (pressure reduction) and from the wheel brakes.

As was mentioned above, the switching times for the valves are calculated from the change in the preset pressure value rather than from the absolute values of the preset pressure value. Each value $P_n$ (n=1 through 4) is therefore sent to a shift register 701. The current value is written to the first register place 702. The previous value from the first register place 702 is received in the second register place 703, so that the pressure requirement from the preceding calculation loop is written there. This value is designated by $P_n^*$.

The current pressure requirement is read from the first register place 702 in the next step 705. If this value is 0 or lower than a minimum, the program branches into a loop 706, with which it shall be ensured that so much pressure medium is removed from the wheel brake that the pressure becoming established becomes zero. To do so, the inlet valve is closed and the outlet valve is opened for at least one loop time $T_0$.

If the current required pressure value is above this minimum, the difference of the two register values 702 and 703 is formed. This is done in the subtractor 707.

The calculated change in pressure $\Delta p$ may be either greater or less than 0. If it is greater than 0, the pressure must be increased in the corresponding wheel brake. If it is less than 0, the pressure must be reduced in the corresponding wheel brake. In the case of a pressure build-up, the program runs through the right-hand decision path 710. Taking the pressure difference to be set and the pressure requirement or, if corresponding signals are present, based on the actual pressure in the wheel brake, an opening time $\Delta t_{in}$ is calculated for the inlet valve. The opening time $\Delta t_{out}$ of the outlet valve is set to zero. Conversely (decision path 711), the opening time $\Delta t_{in}$ of the inlet valve is set to zero if a reduction in pressure is required, while the opening time $\Delta t_{out}$ of the outlet valve is calculated from the required pressure difference and the actual pressure in the wheel brake or the required pressure, which is written in the first register place 702.

As a rule, there is a linear relationship between the opening time $\Delta t$ and the intended change in pressure $\Delta p_i$.

As was explained, the calculation is performed with cycle counts rather than with the opening times. This is explained in greater detail in the diagram in FIG. 10. The above-described calculations are performed at constant time intervals (loop time $T_0$), and the control signals for the valves of the wheel brakes in the next loop are set as the result of a calculation. One loop time $T_0$ is approx. 3 msec.

Depending on how fine the control is to operate, each loop time $T_0$ is divided into N time intervals.

Figure 10:
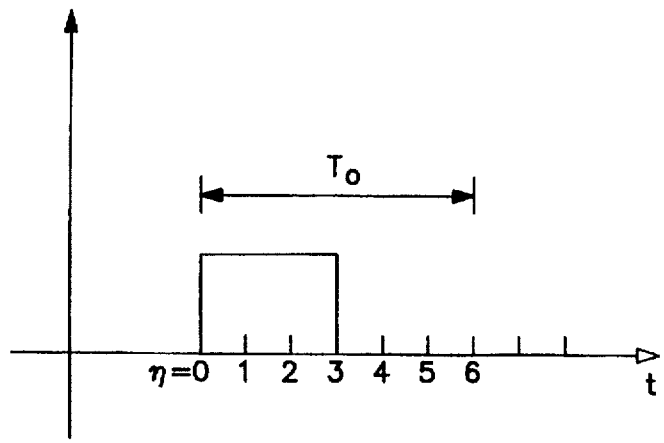
FIG. 10 shows a diagram for describing time intervals within a calculation loop.

The diagram in FIG. 10 shows a division into 6 steps. The switching times for the valves are no longer issued as time variables, but as the number of cycles within one loop, during which the valve is to be opened. As can be determined from FIG. 302, an opening time of 1.5 msec is obtained, e.g., for n=3.

Should the required opening time be longer than the loop time, n is set at the corresponding maximum value N (to 6 in the example shown).

This calculation is performed for each wheel brake, i.e., four times for a four-wheel vehicle. The calculations may be performed simultaneously or consecutively. As a result, 8 values are available; 4 values for inlet values and 4 values for outlet valves. These values are sent to a modified priority circuit 720. The switching time requirement, likewise expressed in cycle times, of an ABS controller and additional controllers are sent to this priority circuit 720 as well.

This actuation is performed such that a change in the pressure in the wheel brakes is obtained. The pressure forces and consequently the moments exerted on the vehicle will thus change. Thus, a change is obtained in the variables which describe the driving dynamics of the vehicle. These are directly or indirectly detected by sensors and are in turn sent to the calculation.

This again leads to a changed moment requirement, which, as was described above, is converted into new control signals for the valves.

The calculation of the pressure differences to be set is based on the pressure requirements from the preceding calculation loop. However, these do not have to have been actually set, so that the actual pressures in the wheel brakes differ from the corresponding calculated pressure requirements.

It is therefore necessary to adjust the actual pressure in the wheel brake to the pressure requirements in certain situations. This can be done in the simplest manner when the pressure requirement is zero, i.e., the distribution logic unit 700 requires a value that corresponds to the pressure zero in a wheel brake. The difference from the preceding value is not formed, and the control signals are not derived from this in such a case, but it is branched off in step 705 into the loop 706 for calculating the switching times, and this loop is to ensure that a pressure value of zero is indeed set. This is done by setting the switching time $\Delta t_{out}$ for the outlet valve to at least the loop time $T_0$. It may also become necessary to send corresponding information to the priority circuit 720, so that this time requirement, which is to lead to zero pressure in a wheel brake, will not be superimposed by preset values of the other controllers. In addition, it can be determined in this information that the reduction in pressure shall take place over several loop times, so that it is ensured that a complete pressure reduction will indeed take place.

6. Wheel Brake Pressure Recognition

The DSC pressure controller described up to Section 4 provides brake pressure values for the wheel brakes as a result. These preset values must be put into practice. One method is to measure the pressures in the wheel brakes and to compare them with the preset values. A pressure controller that operates according to the usual laws adjusts the wheel brake pressure to the predetermined desired value.

This procedure requires one pressure sensor per wheel brake, i.e., four pressure sensors for a four-wheel vehicle.

Attempts will be made, in general, even for cost reasons to make do with as few sensors as possible. In addition, each sensor represents another potential source of disturbance. The failure of one sensor may lead to the necessity to switch off the entire control system.

It is therefore proposed that an evaluation system be provided, which derives a pressure variable that corresponds to the pressure in the wheel brakes on the basis of data available from the already existing sensors. The following concept is proposed for doing so.

As was explained above, the pressure in each wheel brake is controlled by two valves. The inlet valve controls the feed of the pressure medium, while the outlet valve controls the release of the pressure medium.

The signals sent by a pressure controller are therefore control times which indicate how long a valve shall be opened or closed. One loop time is divided into a fixed number of time intervals (cycles). The control times can thus be represented as a cycle count, which indicates over how many time intervals a valve shall be opened or closed.

The basic consideration is that these control signals shall be sent not only to the wheel brakes, but as calculated variables also to a vehicle model.

The real vehicle responds to the brake pressures introduced, and a certain velocity v of the center of gravity and wheel speeds $\omega_i$ of the individual wheels will become established. The velocity of the vehicle is not directly measured, but it is also derived from the speeds $\omega_i$ of the individual wheels in special calculation steps. They are therefore called the reference velocity $v_{Ref}$.

Corresponding values can also be simulated within one vehicle model.

A correcting variable for the pressure in the individual wheel brakes can be determined from a comparison of the actual values of $\omega_i$, $v_{Ref}$ with the calculated values of $\omega_i$ and $v_{Ref}$ or on the basis of the values of $\omega_i$ and $v_{Ref}$ estimated on the basis of the vehicle model, and a pressure calculated via a hydraulic model can be modified by means of the correcting variable, so that a better estimate of the wheel brake pressures can be given.

Figure 11:
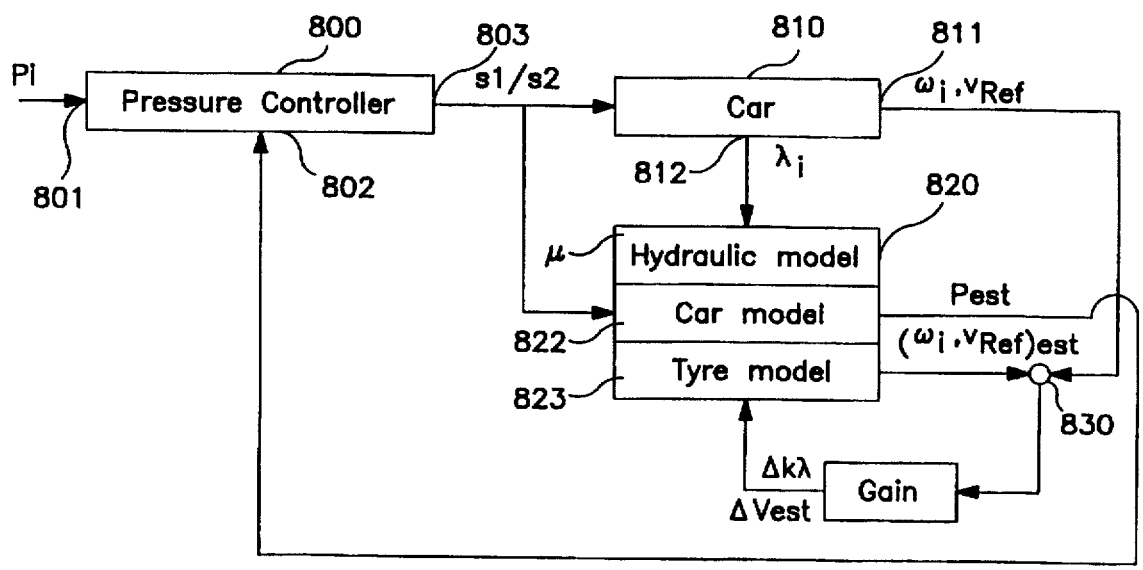
FIG. 11 shows a schematic block diagram for determining the wheel brake pressure.
Figure 12:
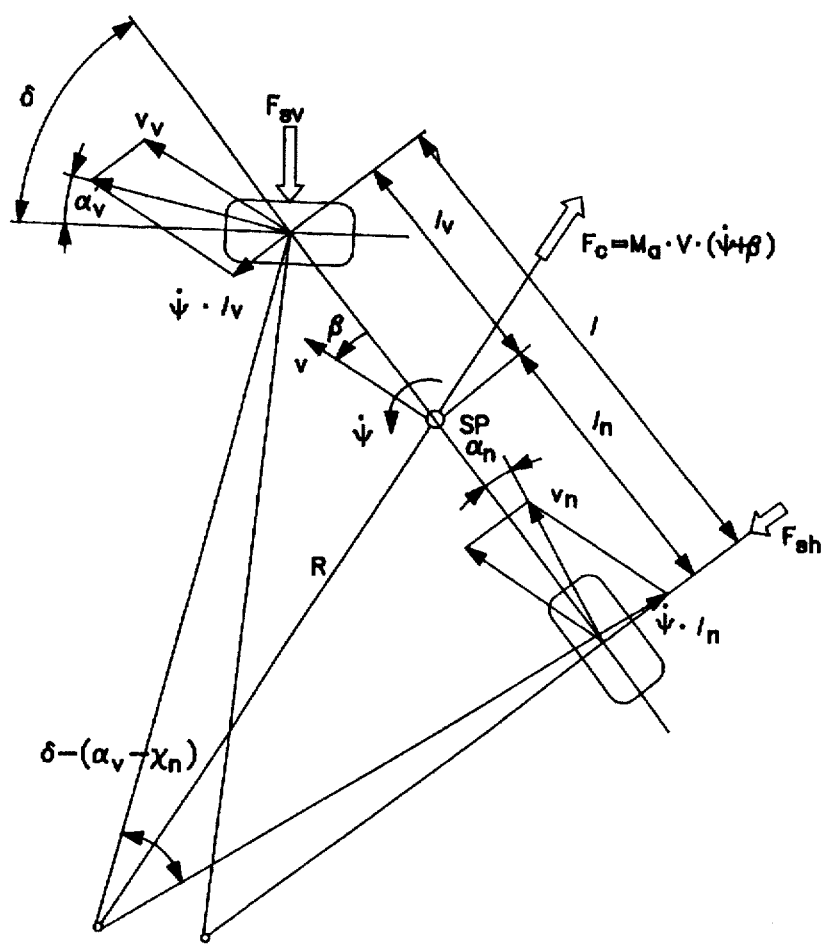
FIGS. 12 and 13A and 13B show diagrams from which the dependence of the king pin inclination difference of a vehicle on the side slip angle and on the velocity vector of the individual wheels can be determined.
Figure 13A:
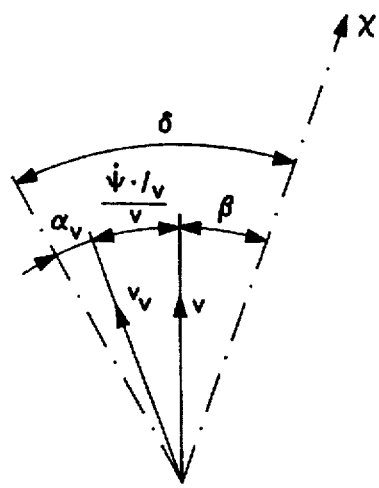
Figure 13B:
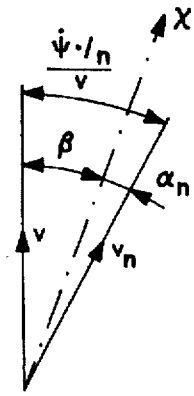

The general structure just described is explained in greater detail in FIG. 11.

A pressure control unit, which has number 5 in FIG. 1, is designated by 800. The pressure control unit calculates control times for the valves of the wheel brakes from a first value 801, which characterizes the pressure to be set, and from a second value 802, which marks an existing, estimated or measured pressure in the wheel brake. The control times are represented as an output variable 803 here. The vehicle is designated by 810. This is to illustrate that the vehicle responds to forces which are caused by the pressures set in the wheel brakes. The speeds $\omega_i$ of the individual wheels change now as well. Wheel sensors, which detect the speeds of the wheels, so that the $\omega_i$ values are immediately available, shall also belong to the vehicle 810.

An evaluation unit $\omega_i$ also belongs to the vehicle 810; this evaluation unit usually represents a partial area of an ABS controller, which calculates a so-called reference velocity $v_{Ref}$, which is to correspond to the actual velocity of the vehicle, from the wheel speeds $\omega_i$ of the individual wheels under certain boundary conditions.

A slip $\lambda_i$ can be calculated for each wheel from the individual wheel speeds and the vehicle reference velocity.

The values $\omega_i$, $v_{Ref}$ are available as output values 811. The slip $\lambda_i$ is available as the value 812.

The calculation model used is designated as a whole by 820. It contains three submodels, namely, a hydraulic model 821,
a vehicle model 822, and
a tire model 823.

In two approximation formulas, the hydraulic model 821 describes the relationship between the brake pressure p and the volume V enclosed in the wheel brake, and the change $\Delta V$ in volume when the inlet or outlet valve is opened for a certain time.

$$p = a * V + b * V^2 \qquad \text{F 6.1}$$

$$\Delta V = \pm c * t_{in/out} * \sqrt{\Delta p} \qquad \text{F 6.2}$$

The parameters a, b and c are variables which describe the brake system and are stored as values in corresponding memories. p describes the current pressure in the wheel brake. V describes the current volume enclosed in the wheel brake.

$\Delta p$ is measured either across the inlet valve or across the outlet valve; the difference between a pressure source and p is determined in the case of measurement across the inlet valve, while the difference between p and the pressure in a tank, which is usually 1 bar and therefore cannot be ignored, is determined in the case of measurement across the outlet valve.

If it is assumed that the pressure in the wheel brakes and the enclosed volume can be set to zero at the beginning of a control, the change in volume and hence the change in pressure in the individual wheel brakes can be reconstructed by monitoring the valve opening times.

At any rate, it is clear that the formulas shown can describe the actual conditions only very approximately, so that a corresponding correction is necessary.

In model 822, the vehicle is described, in general, by a rigid body, which stands on a plane in four contact points (tire contact points). The center of gravity (CG) of this body is above the plane. The distance between the CG and the ground is h.

The body can move in parallel to the plane, i.e., in the x and y directions, and rotate around its center of gravity, with the axis of rotation being at right angles to the plane of movement.

The forces acting on the body are the brake forces in the contact surface of the tires and air resistance forces.

The wheel loads $F_{z,v}$ and $F_{z,h}$, which are directed perpendicular to the plane can be calculated based on these considerations as follows:

$$F_{z,v} = \frac{m * g * l_h + h * (-F_{x,v} - F_{x,h})}{l_v + l_h} = \frac{m * g * l_h - h * m * \dot{v}_{ref}}{l_v + l_h} \qquad \text{F 6.3a}$$

$$F_{z,h} = \frac{m * g * l_v + h * (-F_{x,v} - F_{x,h})}{l_v + l_h} = \frac{m * g * l_v - h * m * \dot{v}_{ref}}{l_v + l_h} \qquad \text{F 6.3b}$$

Such a model is usually sufficient for performing the desired pressure correction. The model can, of course, be refined, if necessary. For the further calculation, the model provides essentially the loads $F_x$ of the tire contact surfaces as a function of the deceleration of the center of gravity. The wheel is considered to be a rotatable disk, which has a certain moment of inertia.

$$\dot{\omega} = \frac{R_{rad} * F_x - M_{Br}}{\theta} \qquad \text{F 6.4}$$

The decelerating torques acting on the wheel are determined linearly from the wheel brake pressure.

$$M_{Br} = C_{Br} * p \qquad \text{F 6.5}$$

It is assumed in the tire model that the utilization of the frictional connection, f, namely, the ratio of the braking force to the wheel load, changes linearly with the slip of the wheel.

$$F_x = \lambda * F_z \qquad \text{F 6.6}$$

The equations given make it possible to calculate the wheel speed of each wheel and the reference velocity of the vehicle model.

These values can be compared with the actual values 811. This is done at the reference point 830.

Taking a correction factor k into account, an additional volume can be determined from the difference between the measured and estimated speeds of each wheel.

This additional pressure medium volume $\Delta V$ is added to the calculated desired volume to obtain the new desired volume, from which a wheel brake pressure, which corresponds to the actual wheel brake pressure relatively accurately, can be derived according to formula 6.1.

The accuracy of the estimation depends, of course, on the correction factor k, which may have to be determined by experiments in advance.

This factor differs from one vehicle to the next, and it also depends, among other things, on how well the vehicle model describes the actual conditions.

The additional volume may also include a tolerance volume, with which the fact that the volume throughput through the valves is not proportional to the switching times is taken into account. The opening cross section of the valve increases or decreases only slowly during the opening and closing of a valve, so that only a reduced volume will flow during the time intervals in which the actual opening cross section still increases toward or decreases from the full opening cross section.

7. Substitution of a Yaw Rate Meter

The yaw rate is a particularly distinctive variable for the above-described control, because it is used as a controlled variable, whose deviation $\Delta\Psi$ is to be minimized. However, as will be described below, other controlled variables may be advantageously used as well. The following designations will be used in this section for simplification:

$\dot{\Psi}_{Meas}=g_l$ as the measured actual value of the yaw rate, $\ddot{\Psi}_{Meas}=\dot{g}_l$ as the measured actual value of the yaw acceleration, d/dt $\ddot{\Psi}_{Meas}=\ddot{g}_l$ as the measured actual value of the change in yaw acceleration (yaw angle pressure).

This also applies analogously to the desired values according to FIG. 9, which are always marked with the subscript "s."

Figure 14:
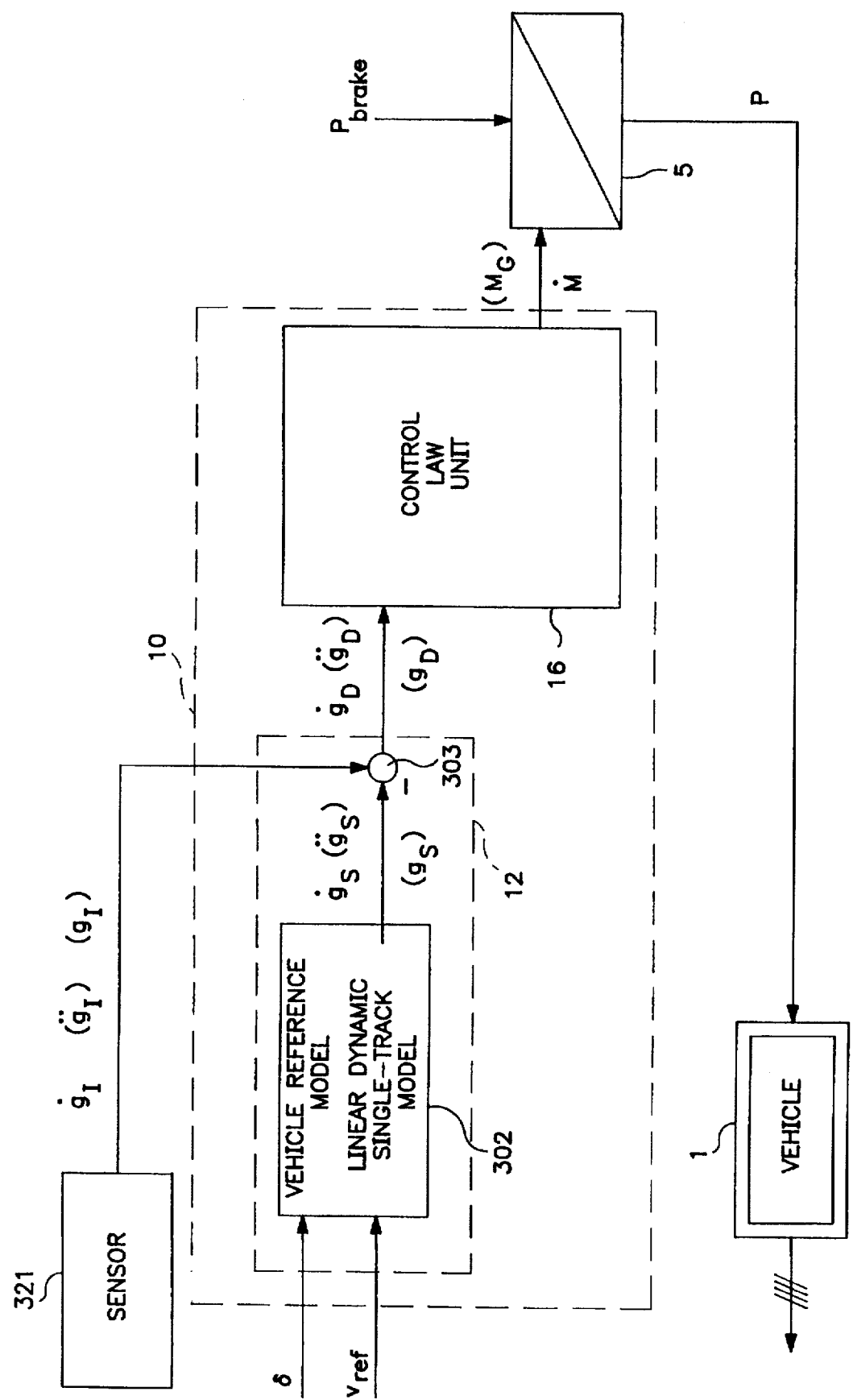
FIGS. 14 through 17 show a block diagram of a control circuit for controlling the driving stability, in which the variables compared with each other in the comparison unit are derivations of the yaw rate.

The measured yaw rate in FIG. 14 is usually determined by means of a yaw rate sensor 321, which issues the output signal $g_l$. However, such known yaw rate sensors with direct issuance of the yaw rate are of a rather complicated design and therefore very expensive. This is also true of the downstream comparison unit and the controller belonging to the control circuit. It is therefore desirable here to seek a way out here and to offer simpler sensor systems and a controller of a simpler design.

Figure 15:
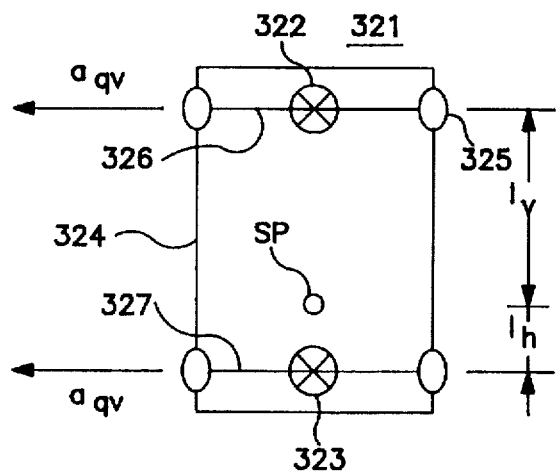

FIG. 15 shows the sketch of the mode of operation of a novel sensor 321, which has a first lateral acceleration meter 322 and a second lateral acceleration meter 323. The two acceleration meters 322, 323 are arranged on the longitudinal axis of the vehicle above the front axle and the rear axle, respectively. The lateral acceleration meters may be arranged, in principle, at any point outside the center of gravity SP, in which case a corresponding conversion is performed.

FIG. 15 indicates the rectangular outline 324 of a vehicle with its tires 325 and sensors. Based on this arrangement, the front lateral acceleration meter 322 measures the lateral acceleration $a_{qv}$ at the level of the front axle 326, and the rear lateral acceleration meter 323 measures the lateral acceleration $a_{qh}$ at the level of the rear axle 327.

The two lateral acceleration meters are able to furnish a variable that depends on the yaw rate. It can be shown from mathematical deductions that the yaw acceleration and the lateral acceleration $a_{trans}$ of the center of gravity SP can be determined from the measurement results of the lateral acceleration meters as follows:

$$\ddot{\Psi} = \frac{a_{qh} - a_{qv}}{l_h + l_v} \qquad F\ 7.1$$

$$a_{trans} = -\dot{v}_{ref} * \beta - \frac{a_{qh}*l_v + a_{qv}*l_h}{l_h - l_v} \qquad F\ 7.2$$

As is apparent from FIG. 15, $l_v$, $l_h$ are the distances between the respective lateral acceleration meters 322, 323, on the one hand, and the center of gravity SP, on the other hand, while v is the velocity of the vehicle, and $\beta$ is the side slip angle. The yaw acceleration $\dot{g}_l$ can thus be determined from the lateral accelerations and the distances of the acceleration meters 322, 323.

It is therefore proposed that the yaw acceleration $\dot{g}_l$ be used instead of the yaw rate proposed in the previous sections, or it is also possible to perform a linear weighting of the individual input values for the comparison unit, similarly to the prior-art condition control. The yaw rate g and the side slip angle $\beta$ can be calculated from the yaw angle pressure $\ddot{g}_l$ and the velocity of the side slip angle $\dot{\beta}$ by means of a bandlimited integration or a first-order, scaled, low-pass filter in order to obtain variables whose dimension corresponds to the output variables of the vehicle reference model 302 (Section 2.3.1.) from sensor 321.

For the band-limited integration:

$$G(z^{-1}) = \frac{\lambda^2 * \frac{T_0}{2} * (1-z^{-1}) * (1+z^{-1})}{1-\lambda*z^{-1}} \qquad F\ 7.3$$

while the following dependence is obtained by using a low-pass filter:

$$G(z^{-1}) = \frac{T_1*(1-\lambda)}{1-\lambda*z^{-1}} \qquad F\ 7.4$$

The velocity of the side slip angle is obtained after evaluating the equation $$a_q = v*(\dot{\Psi}+\dot{\beta}) \qquad F\ 7.5$$

Thus, it is seen that even through a prior-art yaw rate meter can be replaced by using two lateral acceleration meters, the measures just described must be taken to transform the yaw acceleration into the yaw rate. However, the measures just described must be taken to transform the yaw acceleration into the yaw rate. After forming $\Delta g$ and $\Delta\dot{g}$, the control law unit 16 from FIG. 1 can follow unchanged. The moment $M_G$ thus calculated is additionally converted in the control law unit 16 into a change in moment M by a derivation with respect to time.

Figure 17:
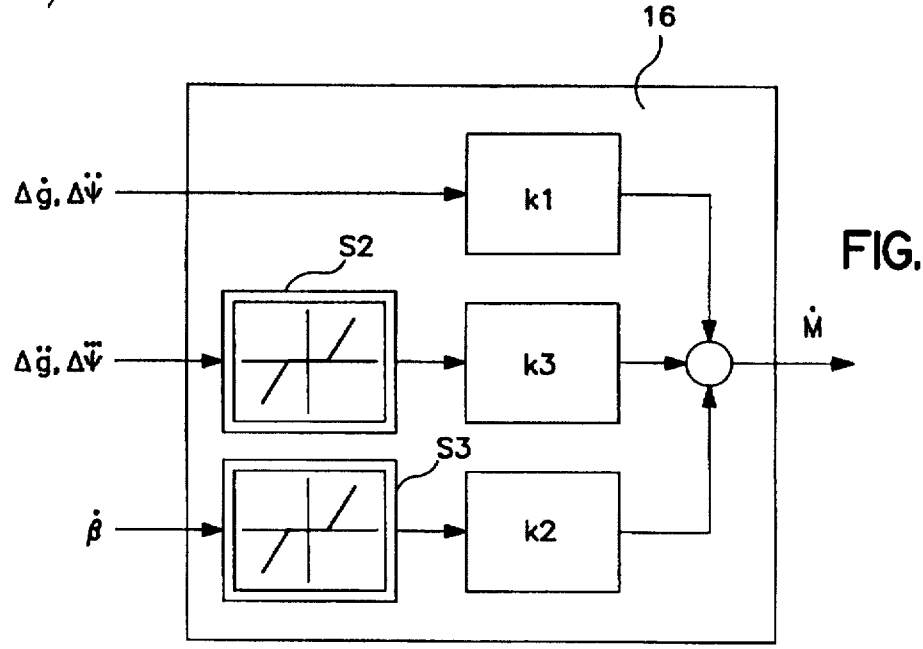

However, it is more expedient under certain circumstances to pass over to a nonlinear control according to FIG. 17, in which the yaw acceleration $\dot{g}$ is sent to the comparison unit 303 both as an actual value and as a desired value as a result from the vehicle reference model 302. To do so, corresponding derivatives must be formed within the vehicle reference model.

As a consequence, the deviation of the yaw acceleration $\Delta\dot{g}$, rather than the yaw rate difference $\Delta g$, is present at the output of the comparison unit 303 and is sent as an input variable to the control law unit 16. Furthermore, as is apparent from FIG. 17, the velocity of the side slip angle $\dot{\beta}$ can be additionally sent to the yawing moment control law unit 16 for the more accurate determination of the change in the moment.

Figure 16:
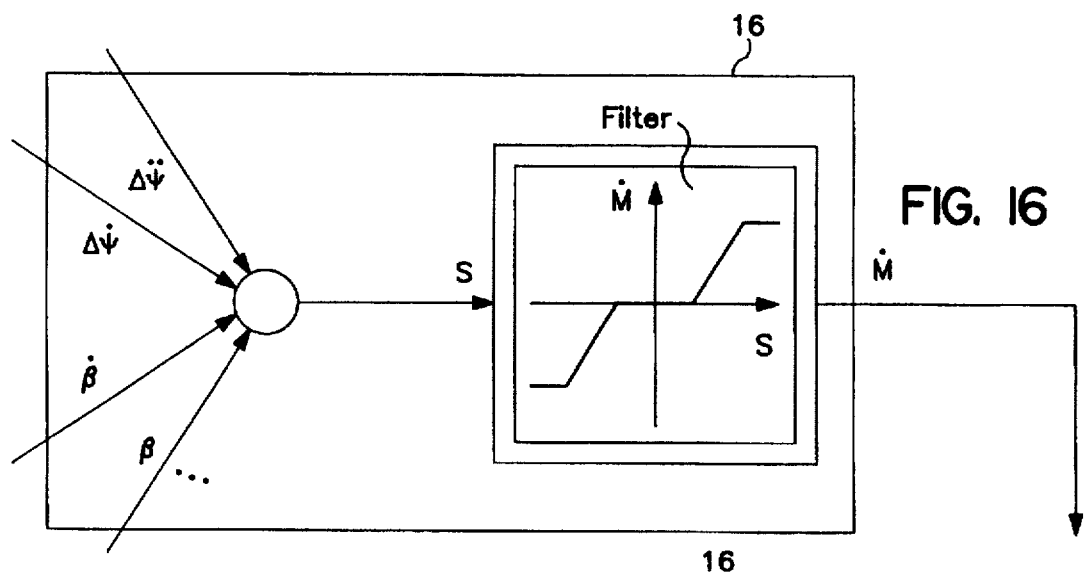

As was mentioned in connection with FIG. 16, it is possible to abandon an additional yawing moment $M_G$ as an output signal of the control law unit 16, and to use the change in moment M, as the output signal, instead. The change in moment, M, i.e., the derivative of the additional yawing moment $M_G$, is converted into individual changes in pressure in a modified distribution logic unit. This means that the changes in pressure are distributed among the individual wheel brakes such that the desired additional yawing moment $M_G$ is obtained, on the whole. Details of this will be described below in connection with FIG. 18.

It should be borne in mind that at the same time, there may be a certain pressure distribution in the wheel brakes due to the driver actuating the brake. It is more favorable in this case to determine the moment $M_G$ by integrating the change in moment Ṁ, after which the pressure differences that must be brought about with respect to the pressure occurring in every individual wheel brake can be directly determined from the moment $M_G$. The above-described advantageous variant, in which the derivatives of the controlled variables used in Sections 1 through 3 are used, may also be combined with the distribution logic unit according to Section 3. Two control principles are available here; one of them yields an additional yawing moment $M_G$, and the other a change in the additional yawing moment Ṁ as a preset value. Switching over between the principles may be provided for. Switching over to the other control principle must be performed especially when the other calculation of additional controlled variables (side slip angle, etc.) according to one principle cannot be performed with sufficient accuracy (cf., e.g., Section 2.2.2.). It should also be noted that $\Delta \dot{g}$ can also be sent as a correcting variable to the control law unit 16 according to FIG. 17, in addition to a $\dot{g}_l$ Besides adapting amplifiers k1, k2, k3, two threshold value switches S2, S3 are shown in the control law unit 16 according to FIG. 17; these threshold value switches are to improve the control behavior within the control law unit 16 and to optimally adapt the influence of the introduced variables to the ideal control behavior as a function of the velocity. The amplifiers k1 through k3 have a comparable task. The individual values are then added in an adder and sent as an output signal to the YMC controller 10. General explanations for the control law unit, which correspondingly apply here, can be found in Section 2.4.

How the pressure preset values at the output of the controllers 7, 8, 9 are linked with the pressure preset value of a distribution logic unit 2 in a priority circuit 3 was shown in connection with FIG. 1. The use of pressure preset values always requires a corresponding prior conversion in the devices that issue these preset values. The effort involved in the exchange of information between the program modules of the control circuit can be simplified by the measures described below.

Figure 18:
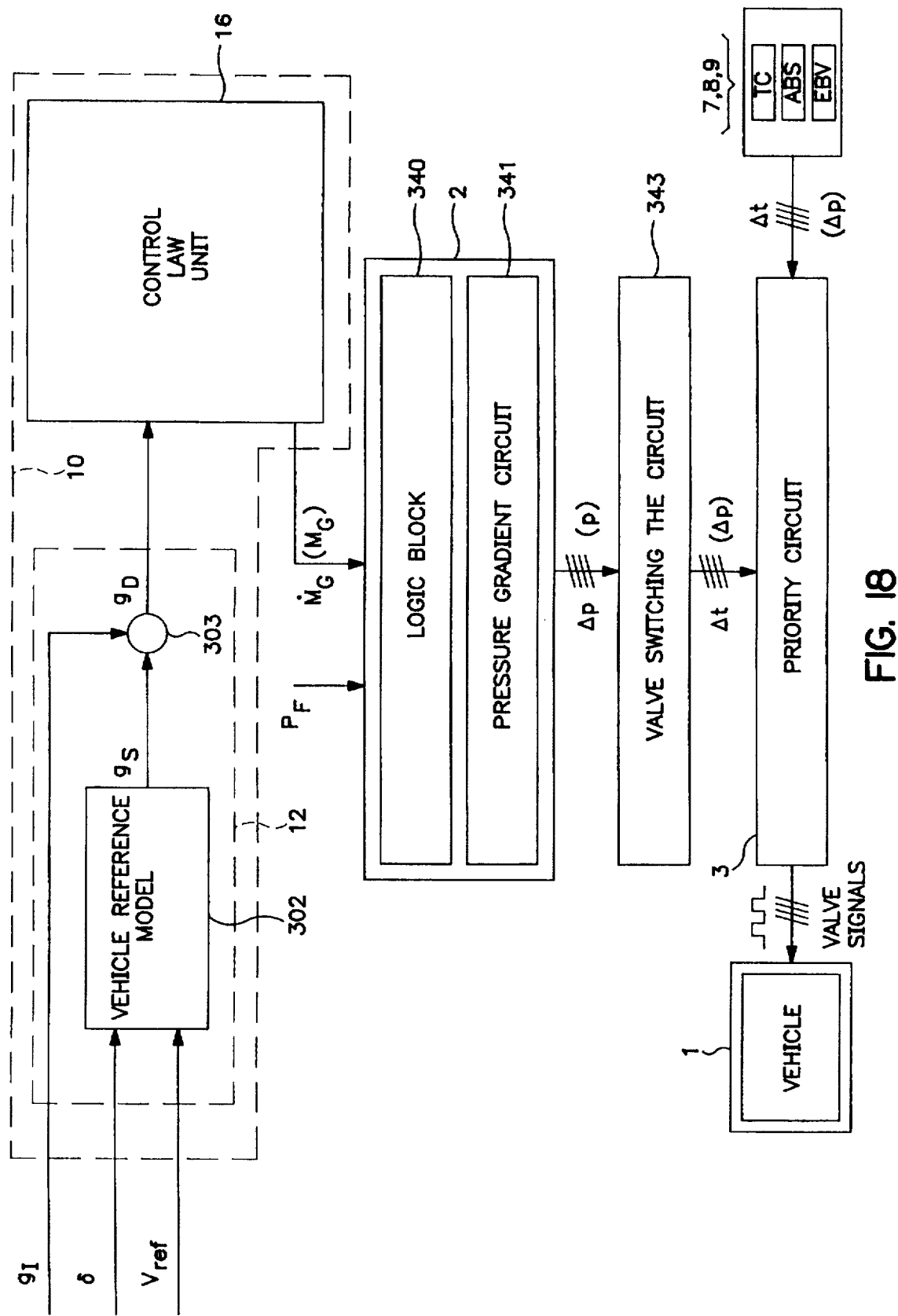
FIG. 18 shows a control circuit for determining the driving stability, in which the pressure gradient and/or the valve-closing time of the vehicle brake is used as the controlled variable.

The control circuit for controlling the driving stability according to FIGS. 9 and 14 is shown in an even more simplified form in FIG. 18; the designations introduced there are maintained.

The YMC controller 10 according to FIG. 1 is modified here inasmuch as the change Ṁ in the additional yawing moment $M_G$, which is sent to the distribution logic unit 2 together with the pressure distribution on the brakes desired by the driver (desire to brake), is present at the output. FIG. 14 is referred to for the calculation of Ṁ.

The distribution logic unit 2 has a logic block 340 and a pressure gradient circuit 341. The essential task of the logic block 340 is to ensure that despite the intervention of the driving stability control, the vehicle as a whole is not braked more strongly than is desired by the driver by presetting a pressure signal at the input of the distribution logic unit 2. This is to prevent instabilities from being additionally introduced by the driving stability control system. Consequently, when a brake pressure is provided on a wheel based on the driver's desire to brake, and, on the other hand, a pressure build-up on one or two wheels is required via the DSC controller and a reduction in pressure on the opposite wheels is required in order to reach the additional yawing moment, there may be mutually contradictory requirements with respect to the individual wheels, namely, a pressure build-up with a simultaneous reduction in pressure. Regarding other wheels, it may be required to increase the pressure not only based on the driver's desire to brake, but at the same time also based on the stability control. The logic block ensures that the brake pressure is first reduced in the corresponding wheels, after which an increase in brake pressure beyond the driver's desire up to a certain limit value can take place. It is thus ensured that the average brake force will not become greater, considering all wheels and taking the additional torque brought about by the DSC control into account, than that desired by the driver.

As was explained in Section 3.2., a specific increase in the longitudinal slip λ on one wheel can be used to reduce the lateral forces, while the brake force is preserved in the longitudinal direction. Consequently, a yawing moment can thus be generated without the deceleration of the vehicle decreasing.

The changes in pressure $\Delta P_{xx}$ on the individual wheels xx are calculated in the pressure gradient circuit 341 of the distribution logic unit 2 on the basis of predetermined constants $c_{xx}$ and the change in moment Ṁ, and the difference between the brake pressure desired by the driver, $P_{Brake}$, and the brake pressure actually measured, $P_{xxist}$, is also included in the calculation. Thus, the following equation applies $$\Delta p_{xx} = \pm \frac{c_{xx} * \dot{M}}{\Sigma c_{xx}^2} + g_l * (p_{Brake} - p_{xxist}) \qquad \text{F 7.6}$$

and $$xx \in [vr, vl, hr, hl]$$

and $g_l$=proportionality factor.

The actual brake pressure Pxxist is determined either by a pressure gauge at the corresponding wheel, or it is calculated via a brake model, which follows the changes in pressure specified for the wheel and is therefore an image of the pressure occurring on the wheel (Section 6). The pressure requirements calculated are sent to a priority circuit 3 and they are evaluated there (See section 4, above).

The above description presupposes that pressure gradients were directly processed in the priority circuit. However, this is not necessary. It is also possible to process valve switching times Δt in the priority circuit 3 (Section 5). However, a valve switching time circuit 343 must be inserted in this case between the distribution logic unit 2 and the priority circuit 3, and valve switching times Δt will be sent by the other controllers 7, 8, 9 as well. The priority circuit now processes the valve switching times Δt entered according to a corresponding scheme, as was described in Section 4 for the brake pressures. The output variables of the priority circuit are valve switching times. The required changes in pressure $\Delta t_{xx}$ of the individual wheels xx are converted into valve switching times Δp according to the equation $$S_{xx} = Kr_{p_{xxist}} \cdot \Delta p_{xx} \qquad \text{F 7.7}$$

Here, $Kr_{xx}$ is a gain factor that depends on the actual pressure of the individual wheels and is calculated during pressure build-up according to the following rule:

$$Kr_{xx}(P_{xxist}) = \frac{1}{Dv_{up} * T_0 * \sqrt{a^2 + 4 * b * p_{xxist}} * \sqrt{160 - p_{xxist}}} \qquad \text{F 7.8}$$

while $$Kr_{xx}(P_{xxist}) = \frac{1}{Dv_{down} * T_0 * \sqrt{a^2 + 4 * b * p_{xxist}} * \sqrt{p_{xxist}}} \qquad \text{F 7.9}$$

applies to a reduction in pressure. Here, xx is again a subscript indicating the position of the individual wheels.

Although the invention has been described in terms of exemplary embodiments, it is not limited thereto. Rather, the appended claims should be construed to include other variants and embodiments of the invention which may be made by those skilled in the art without departing from the true spirit and scope of the present invention.

What is claimed:

1. A method for controlling driving stability of a vehicle having front and rear axles, each of the axles having wheels, comprising the steps of:
    (a) forming a variable which characterizes the driving stability of the vehicle, the variable being a difference between a front kingpin inclination value and a rear kingpin inclination value for the wheels of the front and rear axles, respectively;
    (b) performing a comparison between the variable and a predetermined desired value; and
    (c) controlling the vehicle based on the comparison, so that the variable approaches a desired value.

2. A method according to claim 1, wherein the vehicle has a steering angle, a yaw rate and a velocity, and step (a) includes:
    determining the steering angle, the yaw rate and the velocity, and
    calculating the difference based on the steering angle, the yaw rate and the velocity.

3. A method according to claim 2, wherein the difference is determined by the equation:

$$a_v - a_h = \delta - \frac{l * \dot{\Psi}}{v}$$

where $\alpha_v$ is the front kingpin inclination value, $\alpha_h$ is the rear kingpin inclination value, $\alpha_v - \alpha_h$ is the difference, $\delta$ is the steering angle, l is a distance between the front and rear axles, $\dot{\Psi}$ is the yaw rate, and v is the velocity.

4. A method according to claim 1, wherein step (c) is only executed if the absolute value of the difference is greater than or equal to a threshold value.

5. A method according to claim 4, wherein step (c) is only executed if the difference is:
    greater than a positive threshold value, or
    less than a negative threshold value which differs in absolute value from the positive threshold value.

6. A method according to claim 5, wherein the absolute value of the positive threshold value is greater than the absolute value of the negative threshold value.

7. A method according to claim 1, wherein the vehicle has an engine and a plurality of brakes, and step (c) includes controlling one of the group consisting of the engine and the brakes, so that the variable approaches the desired value.

8. A method for controlling driving stability of a vehicle having a steering angle, a velocity, and front and rear axles, each of the axles having wheels, comprising the steps of:
    (a) determining:
        (1) a maximum allowable positive difference between a front kingpin inclination value for the wheels of the front axle and a rear kingpin inclination value for the wheels of the rear axle, and
        (2) a maximum allowable negative difference between the front kingpin inclination value and the rear kingpin inclination value;
    (b) determining first and second yaw rate values which correspond to the maximum allowable positive and negative differences, respectively;
    (c) calculating a yaw rate based on the steering angle and the velocity;
    (d) performing comparisons, individually, between the calculated yaw rate and each of the first and second yaw rate values; and
    (e) controlling the vehicle based on the comparisons, so that the yaw rate is maintained between the first and second yaw rate values.

9. A method according to claim 8, wherein the first and second yaw rate values are calculated according to the equations:

$$\dot{\Psi}_{Desired1} = \frac{(\delta - K1) * v}{l}$$

and $$\dot{\Psi}_{Desired2} = \frac{(\delta - K2) * v}{l}$$

where $\dot{\Psi}_{Desired1}$ and $\dot{\Psi}_{Desired2}$ are the first and second yaw rate values, respectively, $\delta$ is the steering angle, v is the velocity, l is a distance between the front and rear axles, and K1 and K2 are the maximum allowable positive and negative differences, respectively.

10. A method according to claim 8, wherein the vehicle has an engine and a plurality of brakes, and step (e) includes controlling one of the group consisting of the engine and the brakes, so as to maintain the yaw rate between the first and second yaw rate values.

11. Process for controlling a vehicle to improve travel behavior, comprising:
    determining a characteristic variable characterizing the current actual travel condition of the vehicle, the characteristic variable being a difference between the king pin inclination on the front wheels and the kingpin inclination on the rear wheels, the characteristic variable being compared with an adequate desired value,
    generating control signals as a function of the result of the comparison, and
    correcting the control of the vehicle behavior on the basis of said control signals.

12. Process in accordance with claim 11, wherein the step of determining the difference of the king pin inclinations includes determining and using the steering angle, the yaw rate and the velocity of the vehicle.

13. Process in accordance with claim 12, wherein the step of determining the characteristic variable includes determining the difference of the king pin inclinations, by relating the steering angle, the yaw rate and the velocity of the vehicle to one another in a calculation circuit as follows:

$$a_v - a_h = \delta - \frac{l * \dot{\Psi}}{v}$$

in which $\alpha_v$ is the front kingpin inclination value, $\alpha_h$ is the rear kingpin inclination value, $\alpha_v - \alpha_h$ is the difference, $\delta$ is the steering angle, l is a distance between the front and rear axles, $\dot{\Psi}$ is the yaw rate, and v is the velocity.

14. Process in accordance with claim 11, wherein the step of generating control signals is executed only when the calculated difference of the king pin inclinations $(\alpha_v - \alpha_h)$ is outside a range of tolerance of the desired value.

15. Process in accordance with claim 14, wherein the range of tolerance is arranged asymmetrically to the 0 value of the difference of the king pin inclinations $(\alpha_v - \alpha_h)$ in the sense that the higher permissible desired values are in the range characterizing the understeering of the vehicle.

16. Process in accordance with claim 11, wherein the yaw rate is calculated as the determined value, and the yaw rate is compared with a range of tolerance of the desired value, which is calculated as follows:

understeering: $\dot{\Psi}_{Desired1} = \frac{(\delta - K1) \cdot v}{l}$ oversteering: $\dot{\Psi}_{Desired2} = \frac{(\delta - K2) \cdot v}{l}$ in which $\dot{\Psi}_{Desired1}$ and $\dot{\Psi}_{Desired2}$ are the desired yaw rates for understeering and oversteering, respectively, $\delta$ is the steering angle, v is the velocity of the center of gravity of the vehicle, and l is the distance between the wheel axles, and K1 and K2 are the permissible differences of the king pin inclinations between the front wheels and the rear wheels wherein the step of correcting the control of the vehicle behavior includes controlling one of the group consisting of the engine and the individual brakes of the vehicle, so that the yaw rate is maintained between $\dot{\Psi}_{Desired1}$ and $\dot{\Psi}_{Desired2}$.

* * * * *